United States Patent
Tarr

(10) Patent No.: US 6,191,796 B1
(45) Date of Patent: Feb. 20, 2001

(54) METHOD AND APPARATUS FOR GENERATING AND INTERFACING WITH RIGID AND DEFORMABLE SURFACES IN A HAPTIC VIRTUAL REALITY ENVIRONMENT

(75) Inventor: Christopher Tarr, Cambridge, MA (US)

(73) Assignee: SensAble Technologies, Inc., Woburn, MA (US)

(*) Notice: Under 35 U.S.C. 154(b), the term of this patent shall be extended for 0 days.

(21) Appl. No.: 09/010,295

(22) Filed: Jan. 21, 1998

(51) Int. Cl.$^7$ ..................................... G06F 15/00
(52) U.S. Cl. ............................................. 345/433
(58) Field of Search .................... 345/430, 419, 345/431, 433, 427, 439, 127, 136

(56) References Cited

U.S. PATENT DOCUMENTS

| | | | |
|---|---|---|---|
| 3,531,868 | 10/1970 | Stevenson | 33/174 |
| 3,920,972 | 11/1975 | Corwin et al. | 235/151.11 |
| 3,944,798 | 3/1976 | Eaton | 235/161.3 |
| 4,150,803 | 4/1979 | Fernandez | 244/135 A |
| 4,216,467 | 8/1980 | Colston | 340/365 L |

(List continued on next page.)

FOREIGN PATENT DOCUMENTS

| | | |
|---|---|---|
| WO 95/02801 | 1/1995 | (WO) . |
| WO 96/16397 | 5/1996 | (WO) . |
| WO 96/22591 | 7/1996 | (WO) . |
| WO 96/42078 | 12/1996 | (WO) . |
| WO 97/06410 | 2/1997 | (WO) . |

(List continued on next page.)

OTHER PUBLICATIONS

Adachi, Y., "Touch and Trace on the Free–Form Surface of Virtual Object," Proceedings of IEEE Virtual Reality Annual International Symposium (Seattle, WA), pp. 162–168 (Sep. 18–22, 1993).

Agrawala, M. et al., "3D Painting on Scanned Surfaces," Proceedings of the 1995 Symposium on Interactive 3d Graphics, pp. 145–150 (Apr. 1995).

Avila, R.S. et al., "A Haptic Interaction Method for Volume Visualization," *GE Corporate Research & Development*, Schenectady, NY, pp. 1–9 (1996).

Barr, Alan H.; "Global and Local Deformations of Solid Primitives"; *Computer Graphics*, vol. 18, No. 3, (Proc. SIGGRAPH) pp. 21–30 (Jul., 1984).

Blinn, J.F., "Simulation of Wrinkled Surfaces," *Computer Graphics*, vol. 12, No. 3, (SIGGRAPH—ACM) pp. 286–292 (Aug. 1978).

Brooks, F. P. et al., "Project GROPE—Haptic Displays for Scientific Visualization," *Computer Graphics*, vol. 24, No. 4, (SIGGRAPH '90 Conference Proceedings, Dallas, Texas), pp. 177–185 (Aug. 1990).

(List continued on next page.)

Primary Examiner—Phu K. Nguyen
(74) Attorney, Agent, or Firm—Testa, Hurwitz & Thibeault, LLP

(57) ABSTRACT

A method for haptically deforming a virtual surface within a haptic virtual environment is used to plastically deform the virtual surface of a virtual object by sensing a user's position in real space, determining a haptic interface location in the haptic environment based thereon, and determining whether the virtual surface collides with the haptic interface location. Upon detection of a collision above a threshold force, a visual representation of the virtual surface is plastically deformed and a corresponding force is calculated and fed back to the user. The virtual surface can be visco-elastically deformed.

63 Claims, 44 Drawing Sheets

U.S. PATENT DOCUMENTS

| | | | |
|---|---|---|---|
| 4,367,532 | 1/1983 | Crum et al. | 364/513 |
| 4,420,808 | 12/1983 | Diamond et al. | 364/434 |
| 4,521,685 | 6/1985 | Rebman | 250/229 |
| 4,632,341 | 12/1986 | Repperger et al. | 244/230 |
| 4,638,798 | 1/1987 | Shelden et al. | 128/303 B |
| 4,653,011 | 3/1987 | Iwano | 364/513 |
| 4,670,851 | 6/1987 | Murakami et al. | 364/518 |
| 4,680,519 | 7/1987 | Chand et al. | 318/568 |
| 4,703,443 | 10/1987 | Moriyasu | 364/559 |
| 4,769,763 | 9/1988 | Trieb et al. | 364/559 |
| 4,791,934 | 12/1988 | Brunnett | 128/653 |
| 4,800,721 | 1/1989 | Cemenska et al. | 60/393 |
| 4,819,195 | 4/1989 | Bell et al. | 364/571.05 |
| 4,837,734 | 6/1989 | Ichikawa et al. | 364/513 |
| 4,853,874 | 8/1989 | Iwamoto et al. | 364/513 |
| 4,888,538 | 12/1989 | Dimitrov et al. | 318/675 |
| 4,893,981 | 1/1990 | Yoshinada et al. | 414/5 |
| 4,907,973 | 3/1990 | Hon | 434/262 |
| 4,942,538 | 7/1990 | Yuan et al. | 364/513 |
| 4,945,305 | 7/1990 | Blood | 324/207.17 |
| 4,945,501 | 7/1990 | Bell et al. | 364/571.05 |
| 4,961,138 | 10/1990 | Gorniak | 364/200 |
| 4,973,215 | 11/1990 | Karlen et al. | 414/729 |
| 4,982,504 | 1/1991 | Söderberg et al. | 33/502 |
| 5,019,761 | 5/1991 | Kraft | 318/568.11 |
| 5,040,306 | 8/1991 | McMurtry et al. | 33/556 |
| 5,053,975 | 10/1991 | Tsuchihashi et al. | 364/513 |
| 5,072,361 | 12/1991 | Davis et al. | 364/167.01 |
| 5,088,046 | 2/1992 | McMurtry | 364/474.03 |
| 5,088,055 | 2/1992 | Oyama | 364/560 |
| 5,103,404 | 4/1992 | McIntosh | 318/568.22 |
| 5,105,367 | 4/1992 | Tsuchihashi et al. | 395/99 |
| 5,128,870 * | 7/1992 | Erdman et al. | 345/419 |
| 5,130,632 | 7/1992 | Ezawa et al. | 318/568.11 |
| 5,131,844 | 7/1992 | Marinaccio et al. | 433/72 |
| 5,184,319 | 2/1993 | Kramer | 364/806 |
| 5,189,806 | 3/1993 | McMurtry et al. | 33/503 |
| 5,204,824 | 4/1993 | Fujimaki | 364/474.03 |
| 5,223,776 | 6/1993 | Radke et al. | 318/568.1 |
| 5,239,246 | 8/1993 | Kim | 318/568.11 |
| 5,389,865 | 2/1995 | Jacobus et al. | 318/568.11 |
| 5,396,265 | 3/1995 | Ulrich et al. | 345/158 |
| 5,412,770 * | 5/1995 | Yamashita et al. | 345/442 |
| 5,414,337 | 5/1995 | Schuler | 318/561 |
| 5,429,140 | 7/1995 | Burdea et al. | 128/774 |
| 5,438,529 | 8/1995 | Rosenberg et al. | 364/709.1 |
| 5,459,382 | 10/1995 | Jacobus et al. | 318/568.11 |
| 5,497,452 | 3/1996 | Shimizu et al. | 395/120 |
| 5,550,960 * | 8/1996 | Shirman et al. | 345/430 |
| 5,555,894 | 9/1996 | Doyama et al. | 128/782 |
| 5,559,412 | 9/1996 | Schuler | 318/561 |
| 5,576,727 | 11/1996 | Rosenberg et al. | 345/179 |
| 5,587,937 | 12/1996 | Massie et al. | 364/578 |
| 5,619,625 * | 4/1997 | Konno et al. | 345/419 |
| 5,623,582 | 4/1997 | Rosenberg | 395/99 |
| 5,625,576 | 4/1997 | Massie et al. | 364/578 |
| 5,629,594 | 5/1997 | Jacobus et al. | 318/568.11 |
| 5,691,898 | 11/1997 | Rosenberg et al. | 364/190 |
| 5,694,013 | 12/1997 | Stewart et al. | 318/561 |
| 5,701,140 | 12/1997 | Rosenberg et al. | 345/156 |
| 5,721,566 | 2/1998 | Rosenberg et al. | 345/161 |
| 5,724,264 | 3/1998 | Rosenberg et al. | 364/559 |
| 5,731,804 | 3/1998 | Rosenberg | 345/156 |
| 5,734,373 | 3/1998 | Rosenberg et al. | 345/161 |
| 5,737,505 | 4/1998 | Shaw et al. | 395/119 |
| 5,739,811 | 4/1998 | Rosenberg et al. | 345/161 |
| 5,742,278 | 4/1998 | Chen et al. | 345/156 |
| 5,751,289 | 5/1998 | Myers | 345/419 |
| 5,767,839 | 6/1998 | Rosenberg | 345/161 |
| 5,769,640 | 6/1998 | Jacobus et al. | 434/262 |
| 5,796,400 * | 8/1998 | Atkinson et al. | 345/420 |
| 5,800,177 | 9/1998 | Gillio | 434/262 |
| 5,800,178 | 9/1998 | Gillio | 434/262 |
| 5,800,179 | 9/1998 | Bailey | 434/262 |
| 5,802,353 | 9/1998 | Avila et al. | 395/500 |
| 5,805,140 | 9/1998 | Rosenberg et al. | 345/161 |
| 5,821,920 | 10/1998 | Rosenberg et al. | 345/156 |
| 5,825,308 | 10/1998 | Rosenberg | 341/20 |
| 5,828,197 | 10/1998 | Martin et al. | 318/567 |
| 5,831,408 | 11/1998 | Jacobus et al. | 318/568.11 |

FOREIGN PATENT DOCUMENTS

| | | |
|---|---|---|
| WO 97/12337 | 4/1997 | (WO) . |
| WO 97/12357 | 4/1997 | (WO) . |
| WO 97/19440 | 5/1997 | (WO) . |
| WO 97/21160 | 6/1997 | (WO) . |
| WO 97/44775 | 11/1997 | (WO) . |
| WO 98/06024 | 2/1998 | (WO) . |
| WO 98/26342 | 6/1998 | (WO) . |

OTHER PUBLICATIONS

Burdea, G.C., "Force And Touch Feedback For Virtual Reality," John Wiley & Sons, Inc., New York, New York, pp. 190–193 (1996).

Colgate, J. E. et al., "Factors Affecting the Z–Width of a Haptic Display," Proceedings: 1994 IEEE International Conference on Robotics and Automation (San Diego, California), vol. 4, pp. 3205–3210. (May 8–13, 1994).

Colgate, J. E. et al., "Issues in the Haptic Display of Tool Use," Proceedings: 1995 IEEE/RSJ International Conference On Intelligent Robots And Systems—Human Robot Interaction and Cooperative Robots (Pittsburgh, Pennsylvania), vol. 3, pp. 140–145 (Aug. 5–9, 1995).

Decaudin, P., "Geometric Deformation by Merging a 3D–Object with a Simple Shape," Graphics Interface '96 Proceedings (Toronto, Canada), 6 pgs. (May 21–24, 1996).

Dworkin, Paul, et al., "A New Model for Efficient Dynamic," Fourth Eurographics Animation and Simulation Workshop Proceedings (Eurographics Technical Report Series, ISSN 1017–4656), pp. 135–147 (Sep. 4–5, 1993).

Galyean, T.A., "Sculpting: An Interactive Volumetric Modeling Technique," *Computer Graphics* (SIGGRAPH '91 Las Vegas), vol. 25, No. 4, pp. 267–274 (Jul. 1991).

Hashimoto et al., "Dynamic Force Simulator for Force Feedback Human–Machine Interaction", IEEE Virtual Reality Annual International Symposium (Seattle, WA), pp. 209–215 (Sep. 18–22, 1993).

Hirata, Yukihiro et al., "3–Dimensional Interface Device for Virtual Work Space," Proceedings of the 1992 IEEE/RSJ International Conference on Intelligent Robots and Systems (Raleigh, NC), pp. 889–896 (Jul. 7–10, 1992).

Hiroto, K. et al., "Providing Force Feedback in Virtual Environments", *IEEE Computer Graphics and Applications*, vol. 15, No. 5, pp. 22–30 (Sep. 1995).

Howe, Robert D. et al., "Task Performance with a Dextrous Teleoperated Hand System," *Telemanipulator Technology*, Proceedings of SPIE, vol. 1833, pp. 1–9 (Nov. 1992).

Immersion Corp., "The Impulse Engine™," Immersion Corp. Brochure, 2 pgs. (1996).

Immersion Corp., "Impulse Engine 2000," http://www.immerse.com/WWWpages/IE2000pg.htm, 2 pgs. (1997).

Immersion Corp., "Laparoscopic Impulse Engine™: A New Force Feedback Surgical Simulation Tool," Immersion Corporation Brochure, 1 pg. (1995).

Immersion Corp., "Virtual Laparoscopic Interface," Immersion Corp. Brochure, 1 pg. (1994–95).

Inoue, H. et al., "Parallel Manipulator," Proceedings of 3rd Robotics Research: The Third International Symposium, pp. 321–327 (1986).

Ishii, M. et al., "A 3D Interface Device with Force Feedback: A Virtual Work Space for Pick–and–Place Tasks," IEEE Virtual Reality Annual International Symposium (Seattle, WA), pp. 331–335 (Sep. 18–22, 1993).

Iwata, H., "Artificial Reality with Force–feedback: Development of Desktop Virtual Space with Compact Master Manipulator," Computer Graphics (SIGGRAPH '90 Dallas), vol. 24, No. 4, pp. 165–170 (Aug. 1990).

Iwata, H., "Pen–based Haptic Virtual Environment," Proceedings of IEEE Virtual Reality Annual International Symposium (Seattle, WA), pp. 287–292 (Sep. 18–22, 1993).

Kotoku, T. et al., "A Force Display Algorithm for Virtual Environments," SICE, pp. 347–355 (1992) (English language abstract only).

Lewis, P.H., "Electronic Pen With Its Own Eraser", Personal Computers, p. C8 (Jul. 25, 1995).

Massie, T. H., "Design of a Three Degree of Freedom Force–Reflecting Haptic Interface", SB Thesis, Massachusetts Institute of Technology Electrical Engineering and Computer Science Dept., (May 1993).

Massie, T. H., "Initial Haptic Explorations with the Phantom: Virtual Touch Through Point Interaction", MS Thesis, Massachusetts Institute of Technology Mechanical Engineering Dept., (Feb. 1996).

Millman, P. et al., "A System for the Implementation and Kinesthetic Display of Virtual Environments," Telemanipulator Technology, Proceedings of 1992 SPIE, vol. 1833, pp. 49–56 (1992).

Minsky, M. D. R., "Computational Haptics: The Sandpaper System for Synthesizing Texture for a Force–Feedback Display," Ph.D. Thesis, Media Lab, Massachusetts Institute of Technology, (Jun., 1995).

Minsky, M. et al., "Feeling and Seeing: Issues in Force Display," Computer Graphics (1990) Symposium on Interactive 3D Graphics), vol. 24, No. 2, pp. 235–270 (Mar. 1990).

Morgenbesser, H. B., "Force Shading for Shape Perception in Haptic Virtual Environments," SB Thesis, Massachusetts Institute of Technology Electrical Engineering and Computer Science Dept., (Sep. 1995).

Payne, B.A. et al., "Distance Field Manipulation of Surface Models," IEEE Computer Graphics & Applications, pp. 65–71 (Jan. 1992).

SensAble™ Devices, Inc., "PHANToM Haptic Interface," Brochure from SensAble™ Devices, Inc., 4 pgs. (1995).

SensAble™ Devices, Inc., "PHANToM Haptic Interface Brochure," SensAble™ Devices, Inc., 6 pgs. (1995).

Salcudean S. E. et al., "On the Emulation of Stiff Walls and Static Friction with a Magnetically Levitated Input/Output Device," DSC—vol. 55–1, Dynamic Systems and Control (ASME), vol. 1, pp. 303–309 (1994).

Salisbury, K. et al., "Haptic Rendering: Programming Touch Interaction with Virtual Objects," Proceedings: 1995 Symposium on Interactive 3D Graphics (Monterey, CA),, pp. 123–130. (Apr. 9–12, 1995).

Shimoga, K. B., "A Survey of Perceptual Feedback Issues in Dextrous Telemanipulation: Part I. Finger Force Feedback," IEEE Virtual Reality Annual International Symposium (Seattle, WA), pp. 263–270 (Sep. 18–22, 1993).

Sutter, P.H. et al., "Response to Reflected–Force Feedback to Fingers in Teleoperations," Proceedings of the NASA Conference on Space Telerobotics, JPL Publication 89–7, vol. IV, pp. 65–74, (Jan. 31, 1989).

Swarup, Nitish, "Haptic Interaction with Deformable Objects Using Real–Time Dynamic Simulation," MS Thesis Massachusetts Institute of Technology Mechanical Engineering Dept. (Sep., 1995).

Tanie, K., et al., "Force Display Algorithms," 1993 IEEE International Conference on Robotics and Automation (Atlanta GA), pp. 60–78 (May 2–7, 1993).

Terzopoulos, D. et al.; "Elastically Deformable Models," Computer Graphics, vol. 21, No. 4, pp. 205–214 (Jul., 1987).

Wang, S. W. et al., "Volume Sculpting," 1995 Symposium on Interactive 3D Graphics (Monterey, CA), pp. 151–156 (1995).

Yoshikawa, T. et al., "Construction of Virtual World Using Dynamics Modules and Interaction Modules," Proceedings of the 1996 IEEE International Conference on Robotics and Automation (Minneapolis, MN), pp. 2358–2364 (Apr. 1996).

Zilles, C. B. et al., "A Constraint–based God–object Method for Haptic Display," Proceedings of the 1995 IEEE/RSJ International Conference on Intelligent Robots and Systems—Human Robot Interaction and Cooperative Robots (Pittsburgh, PA), pp. 146–151 (Aug. 5–9, 1995).

Zilles, C. B., "Haptic Rendering with the Toolhandle Haptic Interface," SB Thesis, Mechanical Engineering Dept., Massachusetts Institute of Technology, (May, 1995).

Colgate, J.E. et al., "Implementation of Stiff Virtual Walls in Force Reflecting Interfaces," IEEE Virtual Reality Annual International Symposium (Seattle, WA), pp. 202–208 (Sep. 18–22, 1993).

Hirota, K., et al., "Development of Surface Display," IEEE Virtual Reality Annual International Symposium (Seattle, WA), pp. 256–262 (Sep. 18–22, 1993).

* cited by examiner

```
Triangle Classifications:

GOLDEN_RATIO = 2
if ( (squaredLength2/squaredLength1 > GOLDEN_RATIO) &&
     (squaredLength3/squaredLength1 > GOLDEN_RATIO) ) {
    // poly is tall with edge1 short edge
} else if ( (squaredLength1/squaredLength2 > GOLDEN_RATIO) &&
            (squaredLength3/squaredLength2 > GOLDEN_RATIO) ) {
    // poly is tall with edge2 short edge
} else if ( (squaredLength1/squaredLength3 > GOLDEN_RATIO) &&
            (squaredLength2/squaredLength3 > GOLDEN_RATIO) ) {
    // poly is tall with edge3 short edge
} else if ( (squaredLength1/squaredLength2 > GOLDEN_RATIO) &&
            (squaredLength1/squaredLength3 > GOLDEN_RATIO) ) {
    // poly is skinny with edge1 long edge
} else if ( (squaredLength2/squaredLength1 > GOLDEN_RATIO) &&
            (squaredLength2/squaredLength3 > GOLDEN_RATIO) ) {
    // poly is skinny with edge2 long edge
} else if ( (squaredLength3/squaredLength1 > GOLDEN_RATIO) &&
            (squaredLength3/squaredLength2 > GOLDEN_RATIO) ) {
    // poly is skinny with edge3 long edge
} else {
    // poly is equilateral
}
```

FIG. 13B

```
remove P1;
V4eqV5 = FALSE;
if E2 has no children {
    v4 = (v2 + v3)/2;
    if ( |v4 - v5| < epsilon and
         |v2 - v5| < |v2 - v3| and
         |v3 - v5| < |v2 - v3| ) }
        v4 = v5;
        E2a = E6;
        E2b = e7;
        remove P2;
        V4eqV5 = TRUE;
    } else {
        mark P2 for remesh;
        add E2a(v2,v4, parent = e2);
        add E2b(v3,v4, parent = e2);
    }

} else {
    remove E2;
    set E2a's parent = none;
    set E2b's parent = none;
} add E4(v1,v4);
add P1a((v1,v2,v4)  ,  (E1,E2a,E4));
add P1b((v1,v4,v3)  ,  (E4,E2b,E3));

if any edges of P1a have children {
    mark P1a to be remeshed
}
if any edges of P1b have children {
    mark P1b to be remeshed
}
```

FIG. 14A

```
remove P1
V4eqV7 = FALSE;
if E1 has no children {
    v4 = (v1 + v2)/2;
    if ( |v4 - v7| < epsilon and
         |v1 - v7| < |v1 - v2| and
         |v2 - v7| < |v1 - v2| ) {
        v4 = v7;
        E1a = e10;
        E1b = e11;
        remove P2;
        V4eqV7 = TRUE;
    } else {
        mark P2 for remesh;
        add E1a(v1,v4, parent = e1);
        add E1b(v2,v4, parent = e1);
    }
} else {
    remove E1;
    set E1a's parent = none;
    set E1b's parent = none;
}

V5eqV8 = FALSE;
if E2 has no children {
    v5 = (v2 + v3)/2;
    if ( |v2 - v8| < epsilon and
         |v2 - v8| < |v2-v3| and
         |v3 - v8| < |v2-v3| ) {
        v5 = v8;
        E2a = e12;
        E2b = e13;
        remove P3;
        V5eqV8 = TRUE;
    } else {
        mark P3 for ramesh;
        add E2a(v2,v5, parent = e2);
        add E2b(v3,v5, parent = e2);
    }
} else {
    remove E2;
    set E2a's parent = none;
    set E2b's parent = none;
}

V6eqV9 = FALSE;
if E3 has no children {
    v6 = (v3 + v1)/2;
    if ( |v6 - v9| < epsilon and
         |v3 - v9| < |v3 - v1| and
         |v1 - v9| < |v3 - v1| ) {
        v6 = v9;
        E3a = e14;
        E3b = e15;
        remove P4;
        V6eqV9 = TRUE;
    } else {
        mark P4 for remesh;
        add E3a(v3,v6, parent = e3);
        add E3b(v1,v6, parent = e3);
    }
} else {
    remove E3;
    set E3a's parent = none;
    set E3b's parent = none;
} add E4(v4,v6);
add E5(v4,v5);
add E6(v5,v6);

add P1a((v1,v4,v6),(E1a,E4,E3b));
add P1b((v4.v2,v5),(E1b,E2a,E5));
add P1c((v4.v5,v6),(E5,E6,E4);
add P1d((v6,v5,v3),(E6,E2b,E3a));

if any edges of P1a have children {
    mark P1a to be remeshed
}
if any edges of P1b have children {
    mark P1b to be remeshed
}
if any edges of P1c have children {
    mark P1c to be remeshed
}
if any edges of P1d have children {
    mark P1d to be remeshed
}
```

FIG. 15A

METHOD AND APPARATUS FOR GENERATING AND INTERFACING WITH RIGID AND DEFORMABLE SURFACES IN A HAPTIC VIRTUAL REALITY ENVIRONMENT

FIELD OF THE INVENTION

The invention relates generally to a method and apparatus for defining rigid, plastically deformable, and visco-elastically deformable surfaces in a haptic virtual realty environment and more specifically to a method and apparatus for haptically manipulating these surfaces within a virtual reality environment.

BACKGROUND OF THE INVENTION

Virtual Realty (VR) is an artificial environment constructed by a computer which permits the user to interact with that environment as if the user were actually immersed in the environment. Early VR devices permitted the user to see three dimensional (3D) depictions of an artificial environment and to move within that environment. Thus, a VR flight simulator incorporating such a device would allow a user to see a 3D view of the ground, which changed both as the virtual aircraft passed over the virtual ground and as the user's eyes looked in different directions. What the user saw in such a simulator is what a pilot would see when actually flying an aircraft.

The reality of the VR environment was enhanced by the ability of a user to manipulate virtual objects within the virtual environment using hand motions and gestures. Special gloves and devices were developed which permitted the user to interact with the virtual objects within the virtual environment. In such a system, the user typically saw an image of his or her hand within the virtual environment and was able to determine where in the virtual environment the user's hand was relative to the virtual object to be manipulated. Moving the glove or device resulted in a corresponding movement of the hand image in the virtual environment. Thus a user wearing the special gloves or using the special device would cause virtual objects to move, simply by moving the glove in such a way that the virtual object is touched by the image of the hand in the virtual environment.

The addition of force generators to the gloves or devices further enhanced the reality of VR by providing the user with a tactile response to interacting with virtual objects within the virtual environment. For example, a user moving such a force generation enhanced device in a direction such that the image of the device moved toward a virtual wall in the virtual environment, would experience a stopping force when the image of the device in the virtual environment collided with the virtual wall. Such tactile sensation creating systems, or haptic systems, thus provided a stimulus to another of the user's senses.

Although the early VR systems were oriented to providing realistic graphical interfaces, the progress in haptic VR systems has made it possible to define a haptic VR environment which may be completely independent of the graphical VR environment. As such, haptic VR environments may now be constructed which respond to manipulation by the user in the way that the early graphical VR environments responded to the visual actions of a user.

This ability to define a haptic VR space independently of a graphical, or other space, provides a greater degree of flexibility in the design and creation of such VR environments. The present invention seeks to further add to this flexibility.

SUMMARY OF THE INVENTION

Disclosed are methods for haptically deforming a virtual surface within a haptic virtual environment According to one embodiment of the invention, a haptic interactive representation including a virtual deformable surface is generated in a haptic interaction space. The virtual deformable surface may be represented by a mesh of polygons such as triangles. A position of a user in real space is sensed, for example using a haptic interface device. Next a haptic interface location is determined in the haptic interaction space in response to the position of the user in real space and a determination is made whether the virtual surface collides with the haptic interface location In the event the virtual surface does not collide with the haptic interface location, a first force is calculated and applied to the user in real space in response to this haptic interface location. The force may be nominally zero. Alternatively, if the virtual surface is determined to collide with the haptic interface location, an interaction force between the virtual surface and the user is calculated. In the event the calculated interaction force exceed a predetermined threshold force, the virtual surface is deformed and a force is calculated and applied to the user in real space in response to the interaction force.

In alternative embodiments, the step of generating a haptic interactive representation includes a virtual plastically deformable surface or a virtual visco-elastically deformable surface. According to the former method, the invention may be used to model permanently deformable surfaces in the development of industrial designs such as automobile body panels. According to the latter method, the invention may be used to model resilient compliant surfaces such as human body parts in the training of physicians and surgeons.

BRIEF DESCRIPTION OF THE DRAWINGS

This invention is pointed out with particularity in the appended claims. The above and further advantages of this invention may be better understood by referring to the following description taken in conjunction with the accompanying drawings, in which:

FIG. 13B is a listing of pseudocode for one embodiment of a method for classifying the triangles depicted in FIG. 13A;

FIG. 14A is a listing of pseudocode for one embodiment of a method for subdividing a triangle one way;

FIG. 15A is a listing of pseudocode for one embodiment of a method for subdividing a triangle three ways;

Like reference characters in the respective drawn figures indicate corresponding elements.

DETAILED DESCRIPTION OF THE INVENTION

Figure 1A:
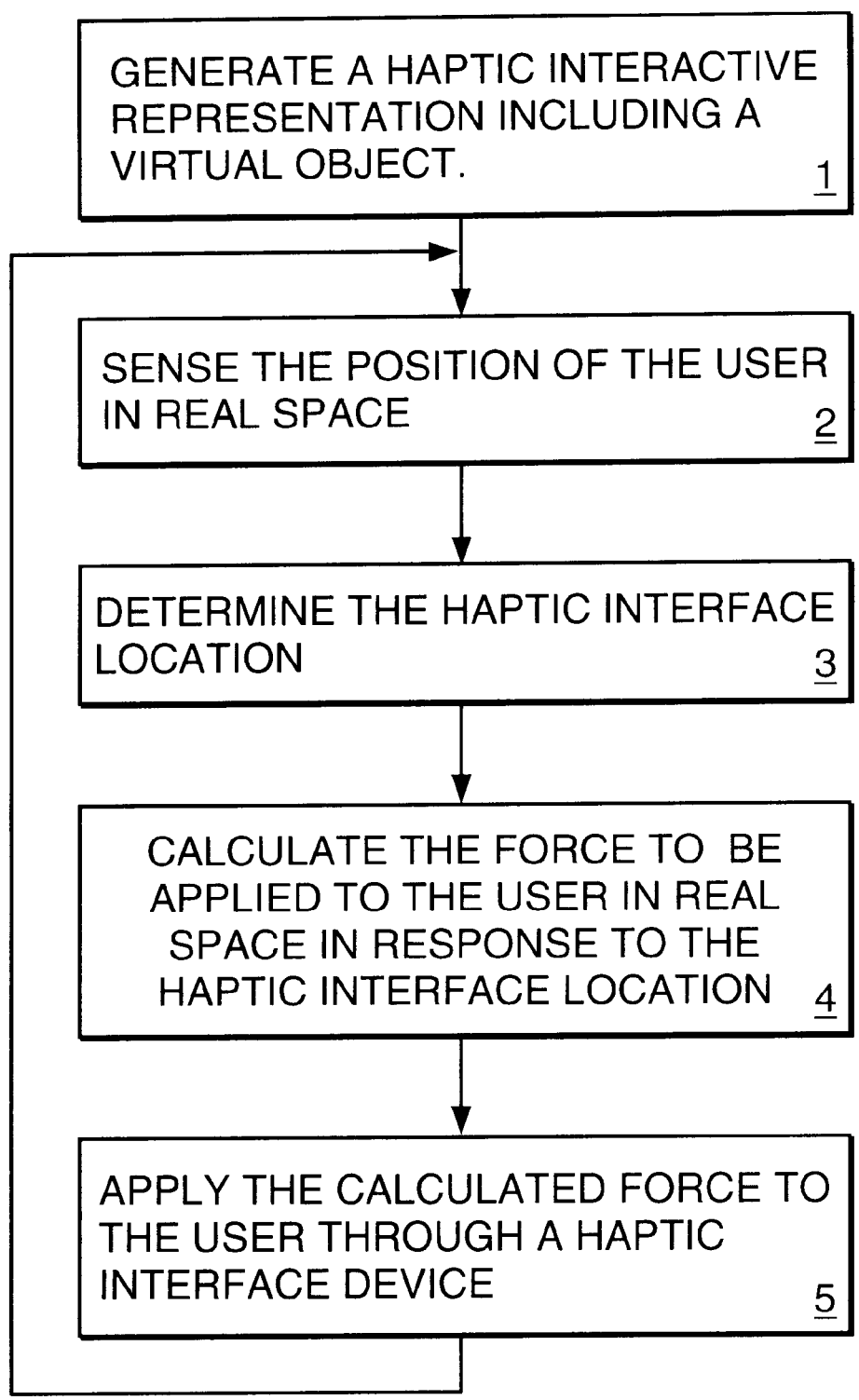
FIG. 1A is a top level flowchart representation of one embodiment of a method for determining forces to be applied to a user through a haptic interface system.

In brief overview, the flowchart of FIG. 1A shows the general steps performed by one embodiment of the method of the present invention for determining the forces to be applied to a user through a haptic interface system. Haptic interface systems include a haptic interface device and a haptic rendering process which generates a model of the environment to be "touched" and determines the forces to be applied to the user. A haptic interface device is a tactile or force-feedback device which provides the touch sensations of interacting with virtual objects. Known haptic interface devices consist of an electromechanical linkage which can exert a controllable force on a user's hand. As used herein, "haptic rendering" is defined as the creation of a virtual environment with which a user can interact through the sense of touch. "Haptic rendering process" refers to the computer application which generates the virtual environment and determines the forces to be applied to a user through a haptic interface. The haptic rendering process generates representations of real world objects in the virtual environment. The model of the environment is a computer generated representation of the real world environment. The haptic rendering process determines the forces to be applied to the user based on the model environment.

In step 1, the haptic rendering process generates a haptic interactive representation which includes a representation of a real world object. As used herein, a "haptic interactive representation" is defined as a computer generated virtual environment which can be explored by a user through the sense of touch. As used herein, "virtual object" is defined as the representation of a real world object in the haptic interactive representation. In the embodiment illustrated by the flowchart in FIG. 1A, the haptic interactive representation contains only one virtual object. The haptic interactive representation may contain more than one object.

In step 2, sensors of the haptic interface system sense the position of the user in real space. As used herein, "real space" is defined as the real world environment. In step 3, the haptic rendering application utilizes the information obtained by the sensors to determine the haptic interface in the virtual environment. As used herein, "haptic interaction space" is defined as the region in the computer generated virtual environment with which the user can interact through the sense of touch. The haptic interaction space defines the boundaries of the haptic interactive representation with which the user can interact. The location of the haptic interface describes the position of the user in the haptic interaction space. In step 4 the haptic rendering application calculates the force to be applied to the user in real space in response to the haptic interface location. In this step, the haptic rendering application determines whether the virtual object collides with the haptic interface location. A virtual object "collides" with the haptic interface location if the surface of the virtual object is in contact with the haptic interface location or if the virtual object encompasses the haptic interface location. If the haptic interface location collides with the virtual object, the properties of the virtual object along with the ambient properties of the haptic interaction space affect the force calculation. If the haptic interface location does not collide with the virtual object, the ambient properties of the haptic interaction space affect the force calculation. After the haptic rendering application has calculated the force to be applied to the user, in step 5 this force may be generated and applied to a user in real space through a haptic interface device. After the force has been applied to the user, the haptic rendering application repeats steps 2, 3, 4, and 5 for the duration of time that the user interacts with the haptic interactive representation.

Figure 1B:
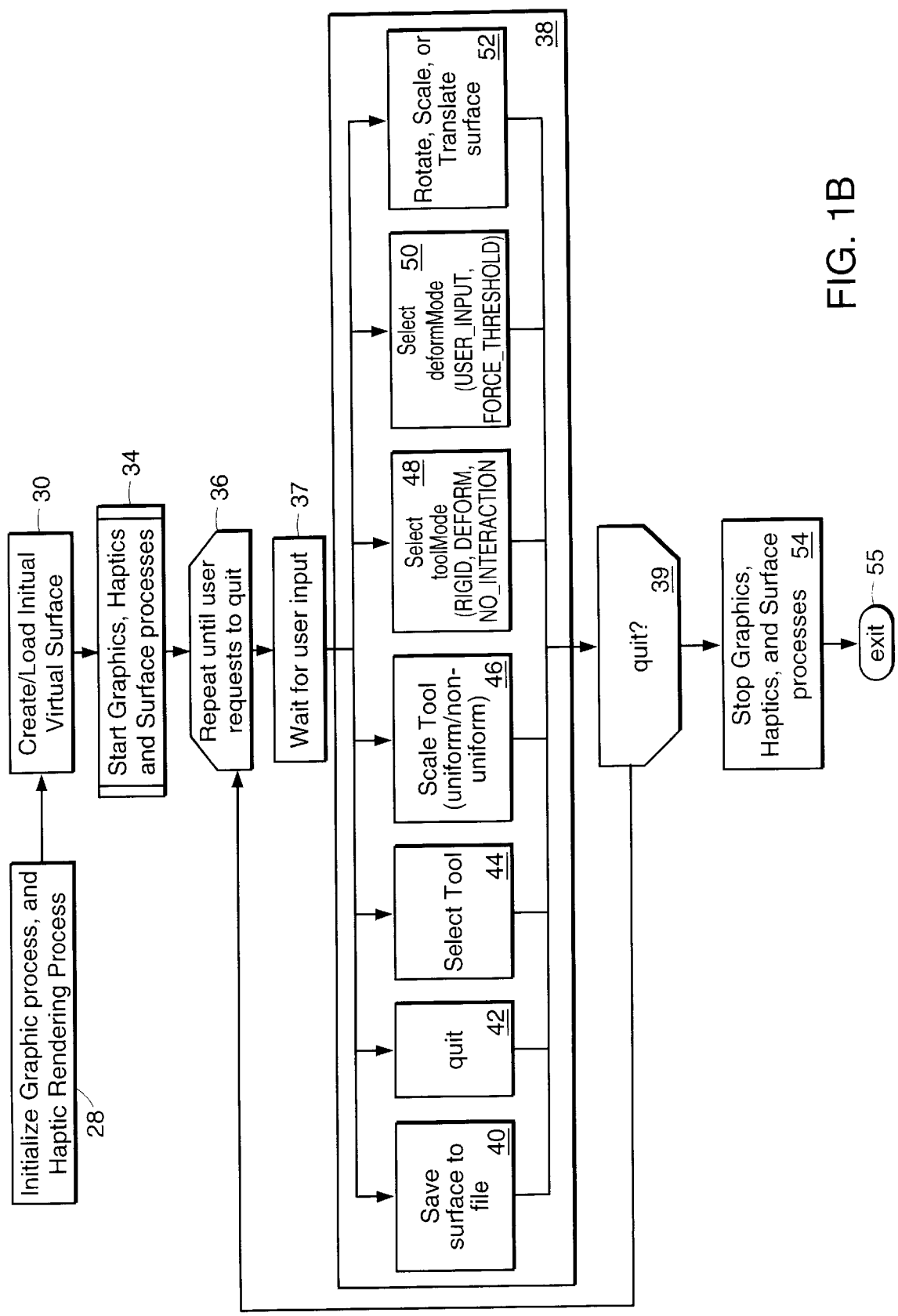
FIG. 1B is a flowchart of one embodiment of a method for generating a haptic interactive representation including a plastically deformable surface.

The flowchart of FIG. 1B shows the steps performed by one embodiment of the method of the present invention for generating a haptic interactive representation including a deformable surface and enabling a user to haptically interact with and deform the deformable surface. As described above, virtual reality (VR) environments may include both a graphical VR environment and a haptic VR environment. The VR environment created by the embodiment illustrated by the flowchart in FIG. 1B provides both graphical and haptic feedback to a user. In other embodiments, the method may only provide haptic feedback to the user.

Classifications of deformable surfaces include plastically deformable surfaces and visco-elastically deformable surfaces. A plastically deformable surface retains the deformed shape after being deformed. A visco-elastically deformable surface may return partially or entirely to its original shape after being deformed. Additionally, a type of visco-elastically deformable surface termed an elastically deformable surface exhibits the resilience of a visco-elastically deformable surface but none of the damping thereof. In the embodiments described below, the viral plastically-deformable surfaces and the virtual visco-elastically deformable surfaces are composed of a triangular mesh. In other embodiments, the virtual surfaces may be composed of other polygonal meshes or may be defined by algebraic equations. In general, the virtual surfaces may be combines to form a virtual object having a volume. Also, in the embodiments described below, the user interacts with the virtual surfaces in the virtual environment through a volume referred to as a tool. The user may select any volume shape for the tool. The shape of the volume or tool determines how the virtual surface is deformed. The tool may be represented as a series of discrete points in vial space which form the volumetric shape of the tool. FIG. 1D shows an example of a virtual surface 32 and a "tool" 56. The tool represents the user in the virtual world.

In the embodiment illustrated by the flowchart in FIG. 1B, the steps are performed by application software running on a computer. The application software includes a haptic rendering process, a graphics process and a surface interaction process. These three processes run simultaneously on the computer. The graphics process generates a visual display of the VR environment to the user and updates the locations of the virtual objects on a display. In one embodiment, the haptic rendering process is a computer application which generates the virtual environment and determines the forces to be applied to a user through a haptic interface. The haptic rendering process generates representations of real world objects in the virtual environment. The surface interaction process determines if the user collides with a deformable surface within the haptic interactive representation and determines how the surface should be deformed, if at all.

Figure 1C:
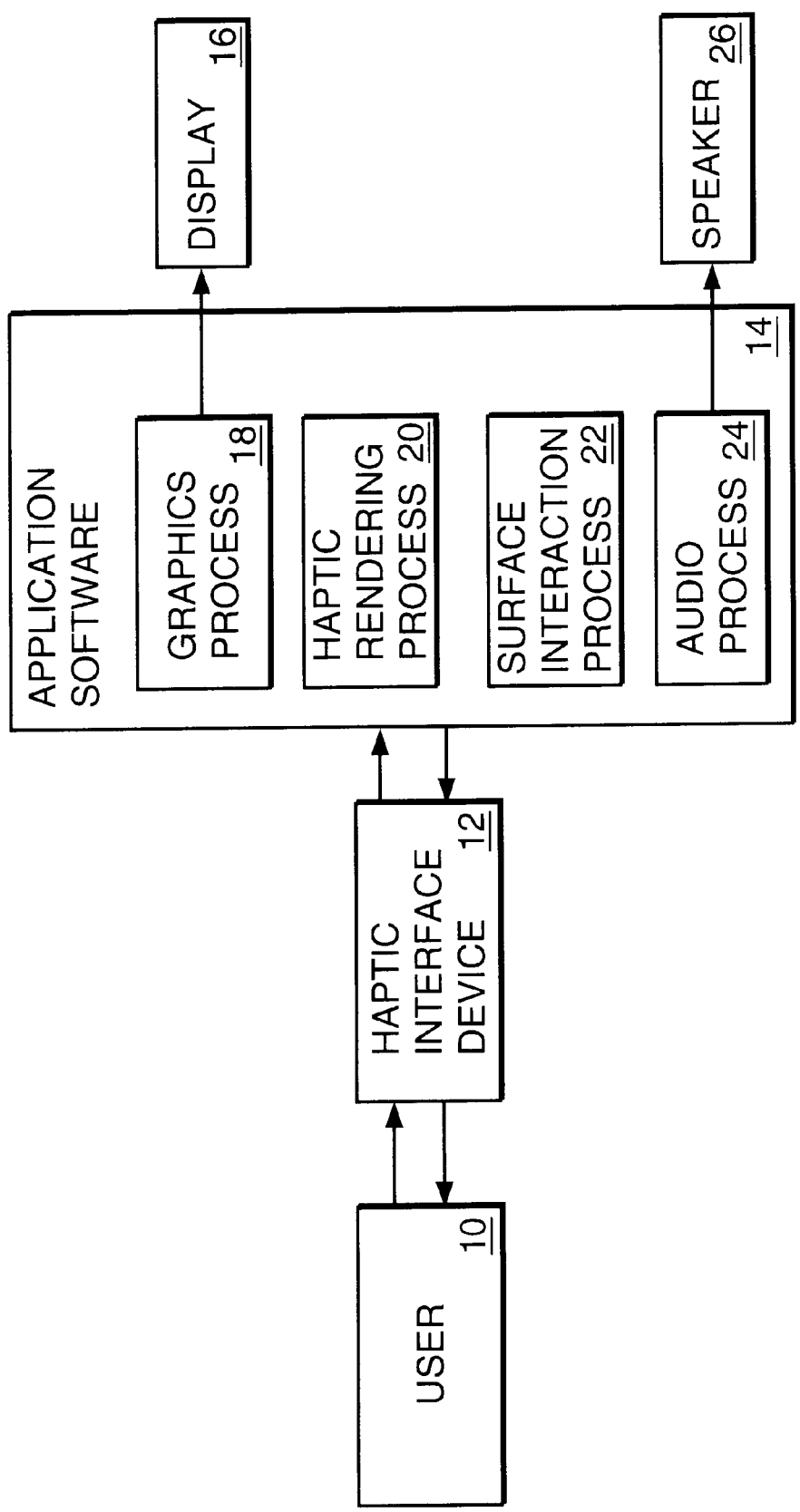
FIG. 1C is an embodiment of a haptic interface system for enabling a user to generate and interface with a deformable surface in a haptic virtual reality environment.
Figure 1D:
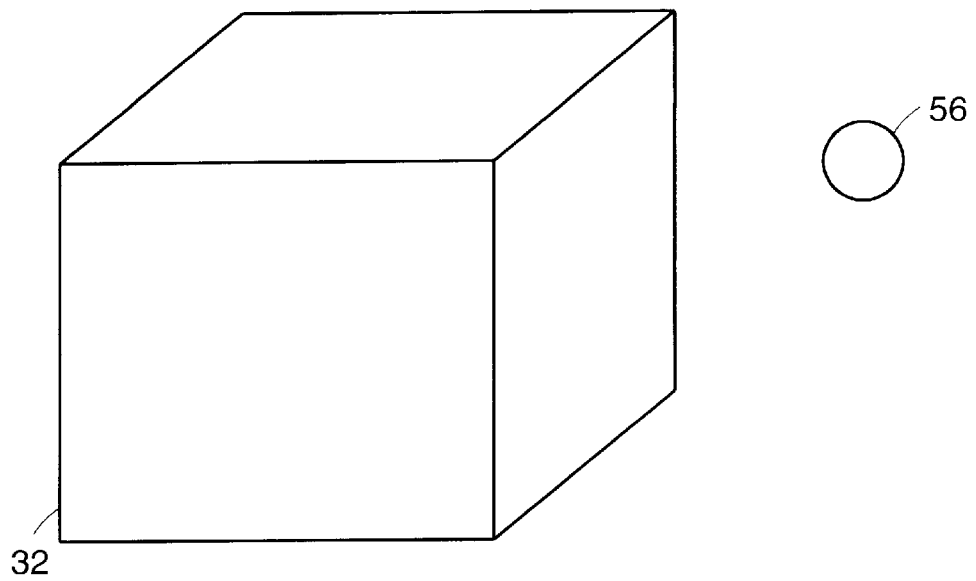
FIG. 1D is a schematic representation of a virtual object composed of a group of virtual surfaces for interaction with a user tool through a haptic interface.

FIG. 1C shows an embodiment of a haptic interface system for enabling a user 10 to generate and interface with a deformable surface in a haptic virtual reality environment. The apparatus includes a haptic interface device 12, application software 14 running on a computer and a display 16. As described above, a haptic interface device is a tactile or force-feedback device used by a user which provides the touch sensations of interacting with virtual objects. Known haptic interface devices consist of an electro-mechanical linkage which can exert a controllable force on a user's hand. One haptic interface device which may be used with the method of the present invention is the haptic interface device described in U.S. Pat. Nos. 5,587,937 and 5,625,576, which are incorporated herein by reference. The application software 14 includes a graphics process 18, a haptic rendering process 20 and a surface interaction process 22 described above. The application software 14 may also include an audio process 24 for driving a speaker 26. The haptic interface device 12 includes a sensor for sensing the position of the user 10 in real space and a force actuator for applying forces to the user 10 in real space. In other embodiments, the graphics process, the haptic rendering process, the surface interaction process, and the audio process are executed by different processors executing algorithms representing these processes.

The haptic rendering process 20 is in communication with the haptic interface device 12. The haptic rendering process 20 executes an algorithm to generate a haptic interactive representation and determine the forces to be applied to the user 10 in real space. In one embodiment, the algorithm includes a module generating a haptic interactive representation, a module determining the user's haptic interface location in haptic interaction space, and a module calculating a force to be applied to the user in real space. The module determining the user's haptic interface in haptic interaction space translates the position of the user in real space into a position in haptic interaction space. The module calculating a force to be applied to the user determines whether the user's haptic interface location collides with any of the virtual objects. If the user's haptic interface location does not collide with any virtual objects, then this module calculates a force to be applied to the user in response to the user's haptic interface location. If the user's haptic interface location does collide with at least one virtual object then this module calculates a force to be applied to the user in response to the collision with the virtual objects. The haptic interface device 12 produces the force calculated by the haptic rendering process 20 and applies the calculated force to the user 10.

The graphics process 18 is in communication with the haptic rendering process 20 and the surface interaction process 22. The graphics process 18 displays the representation of the virtual object created by the haptic rendering process on a display 16. The display 16 may be a computer screen, television screen, or any other device known in the art for displaying images of objects. In one embodiment, the apparatus also includes the audio process 24 and the speaker 26. The audio process 24 is in communication with the haptic rendering process 20. The audio process 24 produces audio sounds in response to the interactions of the virtual objects and the user in the virtual environment. The speaker 26 is in electrical communication with the audio process 24. The speaker 26 outputs the sounds produced by the audio process 24.

In one embodiment, the haptic rendering process 20, the surface interaction process 22, the graphics process 18 and the audio process 24 are executed by different processors. In another embodiment, the haptic rendering processor 20, the display processor 18 and the audio processor 24 are executed by the same processor. In yet another embodiment, the module generating a haptic interactive representation, the module determining the user's haptic interface location in haptic interaction space, and the module calculating a force to be applied to the user in real space are separate devices.

Referring again to FIG. 1B, in step 28, the application software initializes the graphics process and the haptic rendering process. In step 30, the application software either creates a new virtual surface or loads a virtual surface for interaction with a user. As used herein, "virtual surface" is defined as the representation of a real world surface in the haptic interactive representation. The haptic interactive representation may contain only one virtual surface or a plurality of virtual surfaces. The virtual surfaces may be combined to form virtual objects. A "virtual object" is defined as the representation of a real world object in the haptic interactive representation. FIG. 1D shows an example of a virtual object 32 composed of a group of virtual surfaces for interaction with a user through a haptic interface. The virtual object 32 is a cube. In other embodiments, other virtual objects or virtual surfaces may be used.

After the initial virtual surface, i.e. virtual object 32, is loaded, the application software initiates the graphics process, haptic rendering process and surface interaction process (step 34). The graphics process, haptic rendering process and surface interaction process will be described in more detail below. Next, the application software proceeds to step 36. The application software repeats steps 36, 37, 38 and 39 until the user requests to quit the application. In step 37, the application software waits for an input by the user. Once the application software receives an input from the user, the application software proceeds to step 38 and performs the appropriate action based on the type of operation the user selected. Step 38 illustrates certain operations that the user may select. In other embodiments, the user may have less or more options from which to select. The operations the user may select in the embodiment illustrated in FIG. 1B include: save the existing surface to a file (step 40), quit the application (step 42), select a tool for interacting with the virtual surface (step 44), scale the size of the selected tool (step 46), select the mode of the tool (step 48), select the deform mode of the virtual surface (step 50), and rotate, scale or translate the virtual surface (step 52). Each of these options will be described in more detail below.

One of the options the user may select is to save the surface to a file (step 40). In this step, the application software saves the current shape of the virtual object 32 to a file. A second option the user may select is to quit the application (step 42). If the user selects this option, the application software proceeds through step 39 to step 54 and stops the graphics process, haptic rendering process and surface interaction process. Another option the user may select is to select the tool for interacting with the virtual surface (step 44). A user selects this option to determine the shape of the virtual object that will represent the user in the haptic interactive representation. For example, in the embodiment shown in FIG. 1D, the user is represented by a virtual sphere 56. The user's motions in real space will be followed by the sphere's motions in virtual space. The user can select any shape to interact with the virtual surface. For example, the user may select that the tool be represented by a virtual cube or a virtual toroid. The user may change the tool which represents the user at any time while the application software is running.

The user may also select to scale the size of the selected tool (step 46). The user may scale the tool uniformly so that all the dimensions of the tool scale at the same rate. The user may also scale the tool non-uniformly such that different dimensions scale at different rates. For example, in the embodiment shown in FIG. 1D, the user may select to scale the virtual sphere 56 uniformly such that the virtual sphere 56 increases in diameter. Alternatively, the user may select to scale the virtual sphere 56 non-uniformly such that the virtual sphere 56 increases only in the x-direction and becomes oblong-shaped or ellipsoidal. The user may scale the size of the selected tool (step 46) at any time while the software application is running.

The user may further select the mode of the tool (step 48). Each virtual tool 56 has three modes: rigid, deform, and no interaction. If the user selects rigid mode, the virtual tool 56 will interact with the virtual object 32 as a solid surface and will not deform any of the surfaces of the virtual object 32. If the user selects deform mode, the virtual tool 56 may be able to deform surfaces of the virtual object 32, depending on the characteristics of the surfaces of the virtual object 32. Finally, if the user selects the no interaction mode, the virtual tool 56 will not interact with the virtual object 32, but will simply pass through the virtual object 32 upon collision with the virtual object 32.

In addition the user may select the deform mode of the virtual surface (step 50). Each virtual surface has two deform modes: user input mode and force threshold mode. If the user selects the user input mode, the deformability of the virtual surface is determined by a user input. In this mode, the user must make an explicit action to change the state of the surface from non-deformable to deformable. For example, the user may press a switch on the haptic interface device, press a predetermined key on a keyboard which interfaces with the application software, input a voice command or perform any other explicit input action to change the state of a surface from non-deformable to deformable. If the user selects the force threshold mode, the virtual surface will not deform until the force that the user is applying to the virtual surface through the haptic interface device exceeds a predetermined threshold.

Finally, the user may select to rotate, scale or translate the virtual surface (step 52). For example, the user may select to rotate, translate or scale the size of the virtual cube 32. As described above in other embodiments, the user may have more, less or different options.

The application software repeats steps 36, 37, 38 and 39 until the user selects the quit option (step 42). As described above, once the user selects the quit option (step 42), the application software proceed through step 39 to step 54 and stops the graphics process, the haptic rendering process and the surface interaction process. The application software then proceeds to step 55 and exits.

Figure 2:
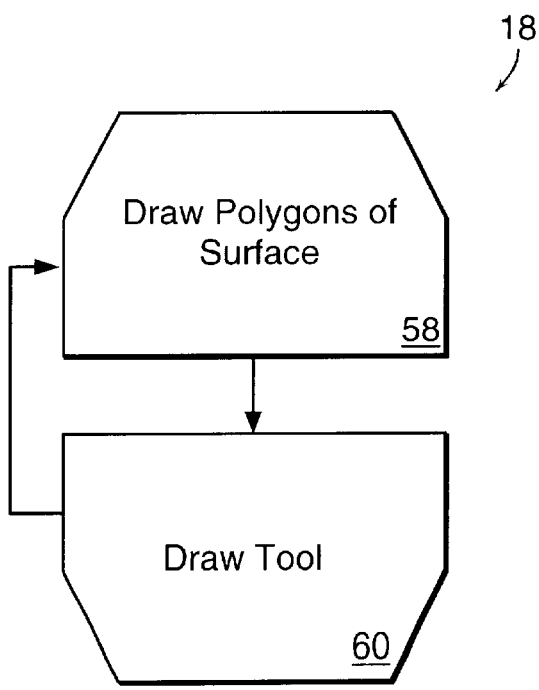
FIG. 2 is a flowchart of one embodiment of a graphics process.

In more detail and referring to FIG. 2, a flowchart illustrates a more detailed sequence of steps performed by the graphics process 18 in one embodiment of the present invention to display to the user the interaction of the user with virtual objects in the haptic interactive representation. The graphics process 18 draws a representation of the virtual surface (step 58) and a representation of the tool representing the user (step 60). For example, the graphics process repeatedly draws a representation of the virtual cube 32 and virtual sphere 56 and displays these representations to a user on a display. To draw the representations of the virtual surface and virtual tool, the graphics process determines the current position, orientation, and shape of the virtual surface and virtual tool. Implicit surfaces may be used, for example, a sphere primitive from a conventional graphics library as known by those skilled in the art The graphics process repeats these steps until the application software stops the graphics process (step 54 above). In one embodiment, the graphics process repeats these steps at a rate of 30 Hz. In other embodiments, the graphics process may repeat these steps at faster or slower rates.

Figure 3A:
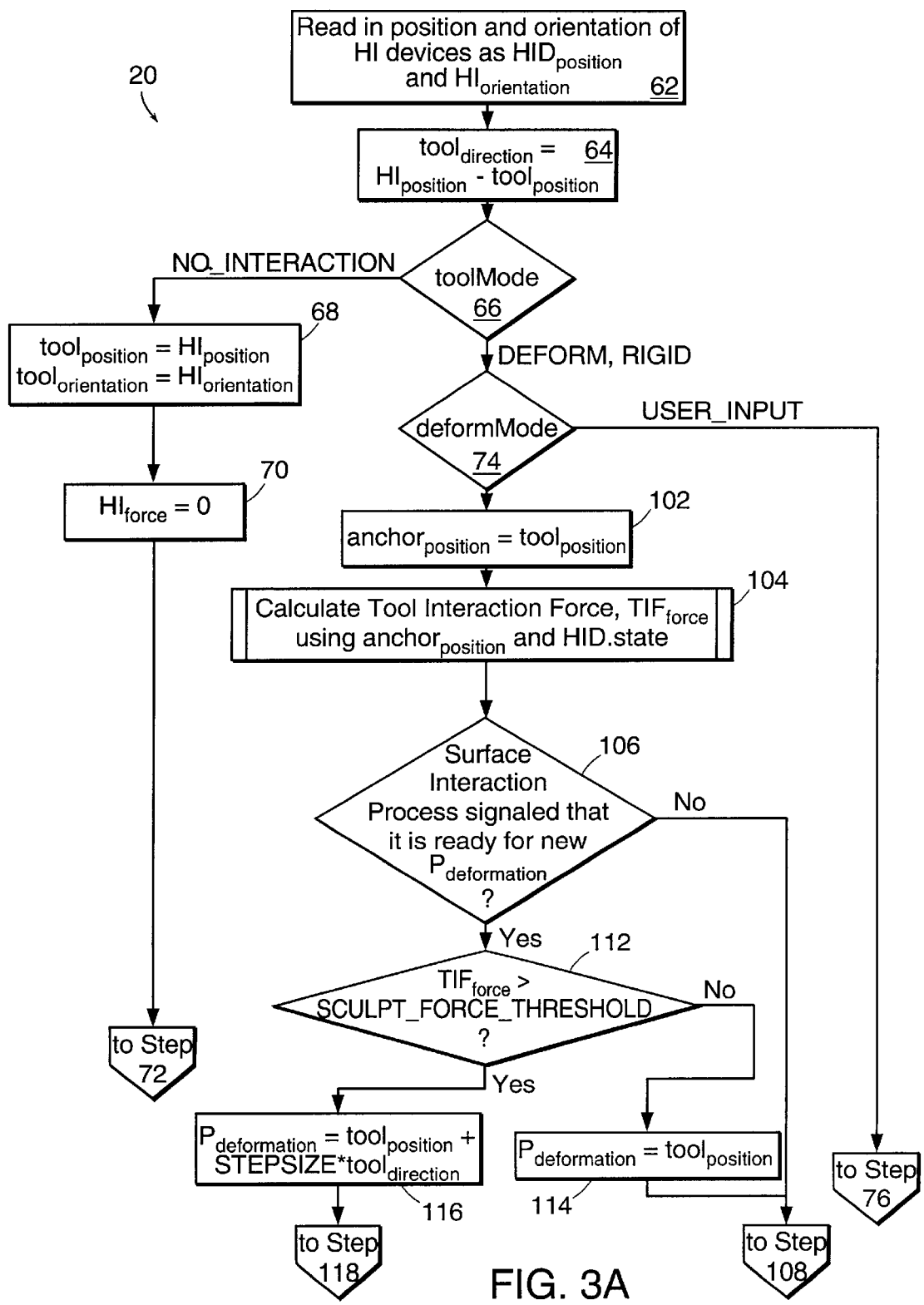
FIGS. 3A–3C are a flowchart of one embodiment of a haptic rendering process.
Figure 3B:
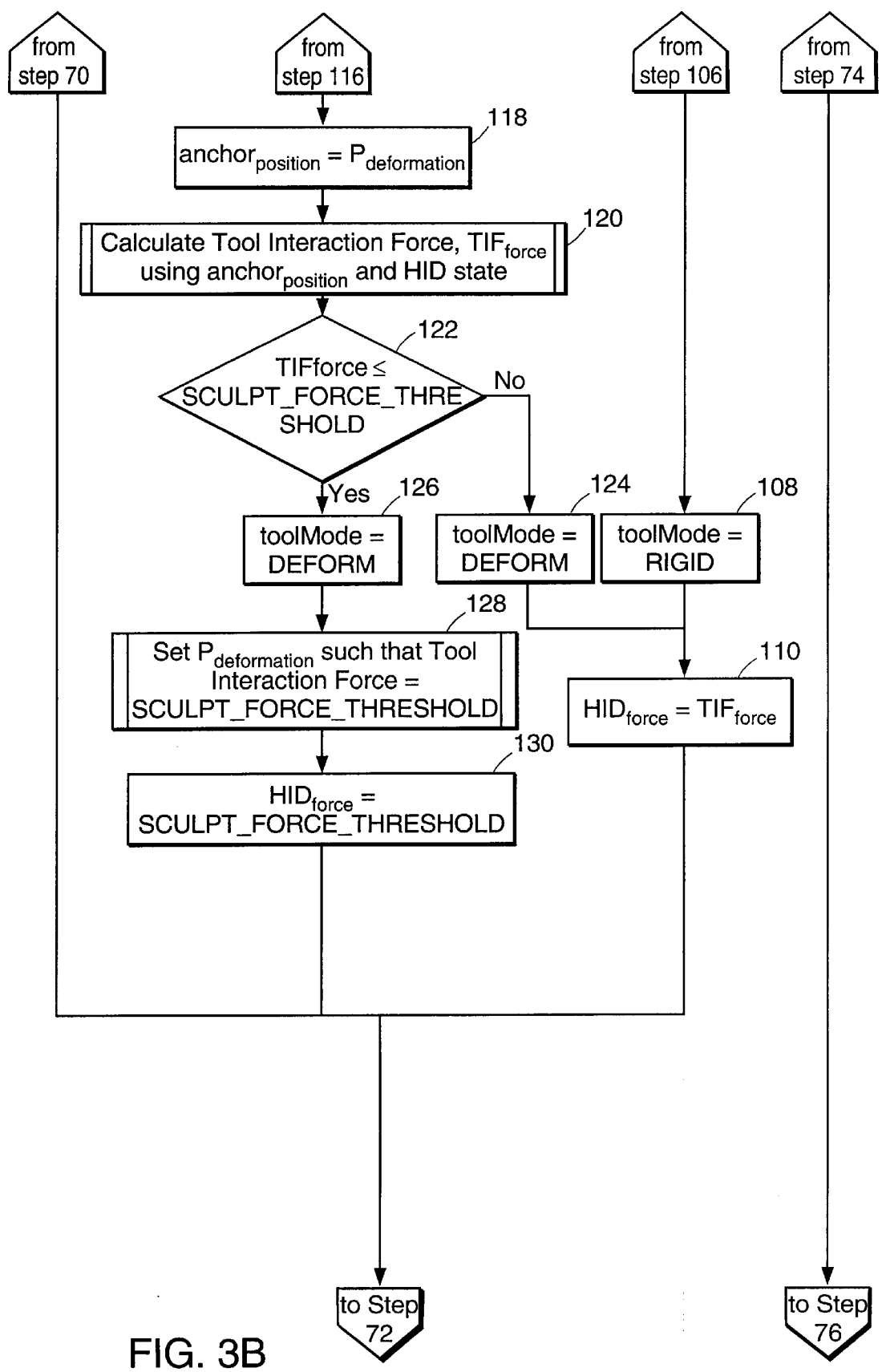
Figure 3C:
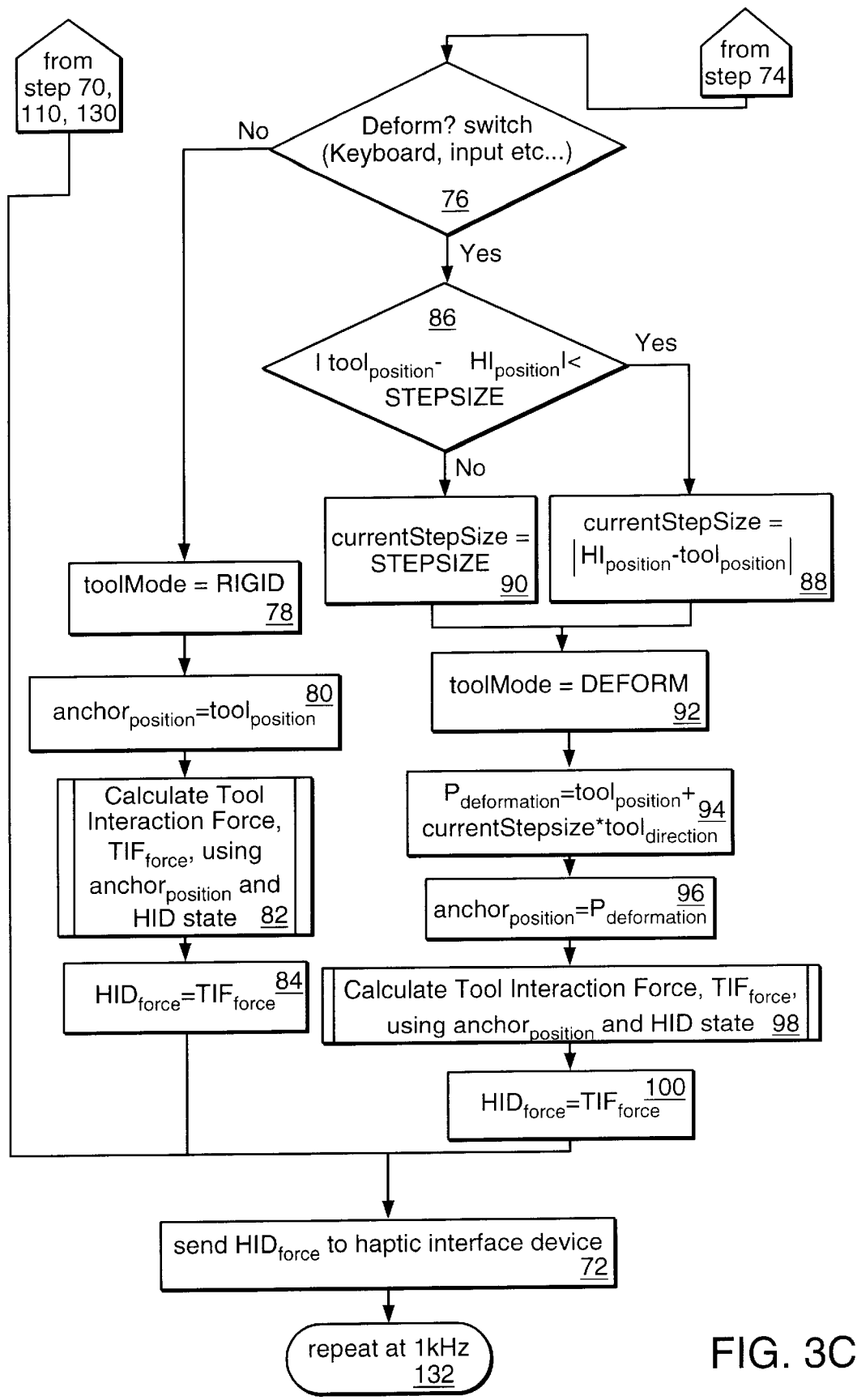

In more detail and referring to FIGS. 3A, 3B and 3C, a flowchart illustrates a more detailed sequence of steps performed by the haptic rendering process 20 in one embodiment of the present invention to determine the force to be applied to the user through a haptic interface device 12. In step 62, sensors of the haptic interface system sense the position of the user in real space. As used herein, "real space" is defined as the real world environment. The haptic rendering application utilizes the information obtained by the sensors to determine the haptic interface in haptic interaction space. As used herein, "haptic interaction space" is defined as the region in the computer generated virtual environment with which the user can interact through the sense of touch. The haptic interaction space defines the boundaries of the haptic interactive representation with which the user can interact. As used herein, a "haptic interface" (HI) is defined as the location and orientation of the physical haptic interface device as sensed by the encoders of the VR system translated into the haptic interaction space. The location of the haptic interface describes the position of the user in the haptic interaction space.

Next, in step 64, the haptic rendering process sets the direction of the virtual tool ($tool_{direction}$), i.e. virtual sphere 56, equal to the displacement between the position of the haptic interface ($HI_{position}$) and the current tool position ($tool_{position}$). The vector tool direction is a vector which points in the direction that the virtual tool needs to move in order to correspond with the current position of the haptic interface. In step 66, the haptic rendering application determines the mode the user has selected for the tool. As described above, the tool has three possible modes: rigid, deform, and no interaction. If the user has selected the no interaction mode, the haptic process proceeds to step 68. As described above, when the user selects the no interaction mode, the virtual tool does not interact with the vital surface. If the virtual tool "collides" with the virtual surface, the virtual tool simply passes through the vial surface. In step 68, the haptic process sets the position of the virtual tool ($tool_{position}$) equal to the position of the haptic interface ($HI_{position}$) and the orientation of the virtual tool ($tool_{orientation}$) equal to the orientation of the haptic interface ($HI_{orientation}$). As the virtual tool will not interact with the virtual surface, the force ($HI_{force}$) applied to the user through the haptic interface device will be set to a default value (step 70). In one embodiment, the default value is zero Newtons. In other embodiments, the default value may be set to another value to simulate a force being applied to the user by the virtual environment such as gravity or another ambient condition. Once the haptic process has calculated the force to be applied to the user, the haptic process sends the calculated force ($HI_{force}$) to the haptic interface device (step 72). The haptic interface device then applies the calculated force to the user.

If the user has selected the deform or rigid mode, the haptic process proceeds to step 74. As described above, if the user selects rigid mode, the virtual tool will interact with the virtual object as a solid surface and will not deform any of the surfaces of the virtual object. If the user selects deform mode, the virtual tool may be able to deform surfaces of the virtual object, depending on the characteristics of the surfaces of the virtual object. In step 74 the haptic process determines the deform mode of the virtual surface. As described above, each virtual surface has two deform modes: user input mode and force threshold mode. If the user selects the user input mode, the deformability of the virtual surface is determined by a user input. In this mode, the user makes an explicit action to change the state of the surface from non-deformable to deformable. For example, the user may press a switch on the haptic interface device, press a predetermined key on a keyboard which interfaces with the application software, input a voice command or perform any other explicit input action to change the state of a surface from nondeformable to deformable. If the user selects the force threshold mode, the virtual surface will not deform until the force that the user is applying to the virtual surface through the haptic interface device exceeds a predetermined threshold.

If the user has selected the user input mode, the haptic process proceeds to step 76. In step 76, the haptic process determines if the user has input the appropriate command that specifies that the tool is to deform the surface. For example, if the command is a key sequence on the keyboard, the haptic process determines if the user has input the key sequence; if the input is to press a switch on the haptic interface device, the haptic process determines if the user has pressed the switch. If the user has not input the appropriate command, the haptic process sets the mode of the virtual tool to rigid and the virtual tool will not deform the virtual surface, but will interact with the virtual surface as though the virtual surface is solid (step 78). In step 80, the haptic process sets the anchor position ($anchor_{position}$) equal to the position of the virtual tool ($tool_{position}$). The anchor position is used by the haptic process to calculate the force applied to the tool due to a collision with the virtual object. The anchor position may be defined as any fixed point from which a change in position may be used to calculate a spring force and from which a velocity may be used to calculate a damping force, as will be discussed in greater detail below. In step 82, the haptic process calculates the tool interaction force ($TIF_{force}$) using the anchor position ($anchor_{position}$) and the state of the haptic interface device. In one embodiment, the haptic rendering process uses Hooke's law to calculate the tool interaction force as illustrated by equation (1) below, in which SPRING_CONSTANT is the stiffness of the virtual surface and $HI_{position}$ is the position of the haptic interface.

$$TIF_{force} = SPRING\_CONSTANT(anchor_{position} - HI_{position}) \quad (1)$$

Once the tool interaction force ($TIF_{force}$) has been calculated, the haptic process sets the force to be applied by the user by the haptic interface device ($HID_{force}$) equal to the tool interaction force ($TIF_{force}$) (step 84). Finally, the force to be applied to the user by the haptic interface device ($HID_{force}$) is sent to the haptic interface device and is applied to the user (step 72).

Referring again to step 76, if the user has selected the user input mode as the tool mode, and has also input the appropriate command to cause the virtual tool to be in deform mode, the haptic process proceeds to step 86. In step 86, the haptic process determines if the amount that the virtual tool must move to intersect with the position of the haptic interface is greater than a predetermined stepsize (STEPSIZE) according to equation (2) below.

$$|tool_{position} - HI_{position}| < STEPSIZE \quad (2)$$

In one embodiment, the predetermined stepsize is about 0.25 mm. The stepsize may be selected to have a value small enough that it is not haptically perceivable and there will be no change in force detected for minor errors in calculation.

If the magnitude of the difference in position between the tool position tool$_{position}$) and the haptic interface position (HI$_{position}$) is less than the predetermined stepsize, the haptic process sets the current step size equal to the magnitude of the difference in position between the tool position (tool$_{position}$) and the haptic interface position (HI$_{position}$) (step 88). If the magnitude is greater than the predetermined stepsize, the haptic process sets the current step size equal to the predetermined step size (step 90). The purpose of steps 86, 88, and 90 is to ensure that the tool does not move more than a predetermined amount during any cycle to ensure that substantially all collisions are detected.

Once the size of the step that the virtual tool may take is set (currentStepSize) either in step 88 or step 90, the haptic process sets the mode of the virtual tool to deform and allows the tool to deform the virtual surface when the tool collides with the virtual surface (step 92). As the haptic process interacts with the surface process communicating where the virtual tool is being directed, the surface process checks for any collisions with the virtual surface and communicates with the haptic process in the event of a collision. Next the haptic process calculates the next position (P$_{deformation}$) that the tool will move to according to equation (3) below in which tool$_{position}$ represents the current tool position, currentStepSize represents the magnitude of the distance the virtual tool may move, and tool$_{direction}$ represents a unit vector in the direction that the virtual tool must move to intersect the haptic interface (step 94). The calculation of the vector tool$_{direction}$ was described above in the discussion of step 64.

$$P_{deformation} = tool_{position} + currentStepSize * tool_{direction} \quad (3)$$

In steps 96 and 98, the haptic process sets the anchor position equal to the next position that the virtual tool will move to (P$_{deformation}$) and calculates the tool interaction force using the anchor position and the state of the haptic interface device according to equation (1) above. Once the tool interaction force (TIF$_{force}$) has been calculated, the haptic process sets the force to be applied by the user by the haptic interface device (HID$_{force}$) equal to the tool interaction force (TIF$_{force}$) (step 100). Finally, the force to be applied to the user by the haptic interface device (HID$_{force}$) is sent to the haptic interface device and is applied to the user (step 72).

Referring again to step 74 in FIG. 3A, if the user selects the tool mode to be the force threshold mode, the haptic process proceeds to steps 102 and 104. As described above, if the user selects the force threshold mode, the virtual surface will not deform until the force that the user is applying to the virtual surface through the haptic interface device exceeds a predetermined threshold. In steps 102 and 104, the haptic process sets the anchor position equal to the position of the virtual tool (tool$_{position}$) and calculates the tool interaction force using the anchor position and the state of the haptic interface device according to equation (1) above.

In step 106 the haptic process determines if the surface interaction process has signaled that it is ready to receive a new position for the tool to move to and deform the virtual surface. If the surface interaction process is not ready, the mode of the virtual tool is set to rigid (step 108) and the haptic process sets the force to be applied by the user by the haptic interface device (HID$_{force}$) equal to the tool interaction force (TIF$_{force}$) previously calculated (step 110). In step 110, the tool interaction force (TIF$_{force}$) is based on the previous position the virtual tool was to move to. Finally, the force to be applied to the user by the haptic interface device (HID$_{force}$) is sent to the haptic interface device and is applied to the user (step 72).

If the surface interaction process is ready to receive a new position for the tool (P$_{deformation}$) in step 106, the haptic process determines if the forces applied by the haptic interface device is greater than the predetermined threshold force for deforming the virtual object (step 112). In one embodiment, the predetermined threshold force may be set at about two Newtons; however, the threshold force may be set as low as zero or as high as six Newtons or higher, as desired. If the haptic interface device has not exceeded the threshold force, the virtual surface remains rigid and the haptic process sets the next position for the virtual tool to be in (P$_{deformation}$) equal to the current position of the tool (tool$_{position}$) (step 114) and proceeds through steps 108, 110 and 72 as described above.

If the haptic interface device has exceed the threshold force, the virtual surface may be deformed and the haptic process calculates the next position (P$_{deformation}$) in step 116 that the tool will move to according to equation (3) described above. In steps 118 and 120, the haptic process sets the anchor position equal to the next position that the virtual tool will move to (P$_{deformation}$) and calculates the tool interaction force using the anchor position and the state of the haptic interface device according to equation (1) above. The haptic process next checks if the tool interaction force is less than the force threshold for deforming the virtual surface (step 122). If the tool interaction force is greater than the force threshold, the haptic process sets the tool mode to deform and allows the virtual tool to deform the virtual surface further (step 124). The haptic process also sets the force to be applied to the user through the haptic interface device equal to the tool interaction force (step 110) and sends this force to the haptic interface device to be applied to the user (step 72).

If the tool interaction force (TIF$_{force}$) is greater than the force threshold for deforming the virtual surface in step 122, the haptic process sets the mode of the virtual tool to deform and allows the virtual surface to be deformed further (step 126). The haptic process also determines the next position (P$_{deformation}$) toward which the virtual tool will move. P$_{deformation}$ is set such that the tool interaction force to be applied to the user is equal to the force threshold for deforming the virtual surface (step 128). In one embodiment, the haptic process calculates P$_{deformation}$ according to equation (4) below in which P$_{deformation}$ represents the next position to which the tool will move, HI$_{position}$ represents the position of the haptic interface, DEFORM$_{force\_threshold}$ represents the threshold force for the virtual surface to deform, tool$_{spring\_constant}$ represents the stiffness of the virtual tool and tool$_{position}$ represents the position of the virtual tool.

$$P_{deformation} = HI_{position} - (DEFORM_{force\_threshold}/tool_{spring\_constant}) * (HI_{position} - tool_{position}) \quad (4)$$

Next, the haptic process sets the force to be applied to the user (HID$_{force}$) equal to the threshold force for deforming the virtual surface (step 130) and sends this force to the haptic interface device to be applied to the user (step 72).

After the force to be applied to the user (HID$_{force}$) has been sent to the haptic interface device, the haptic process proceeds to step 132 and repeats the entire process outlined by the flowchart in FIGS. 3A, 3B and 3C. In one embodiment, the haptic process repeats the process at a rate of 1 KHz.

Figure 4:
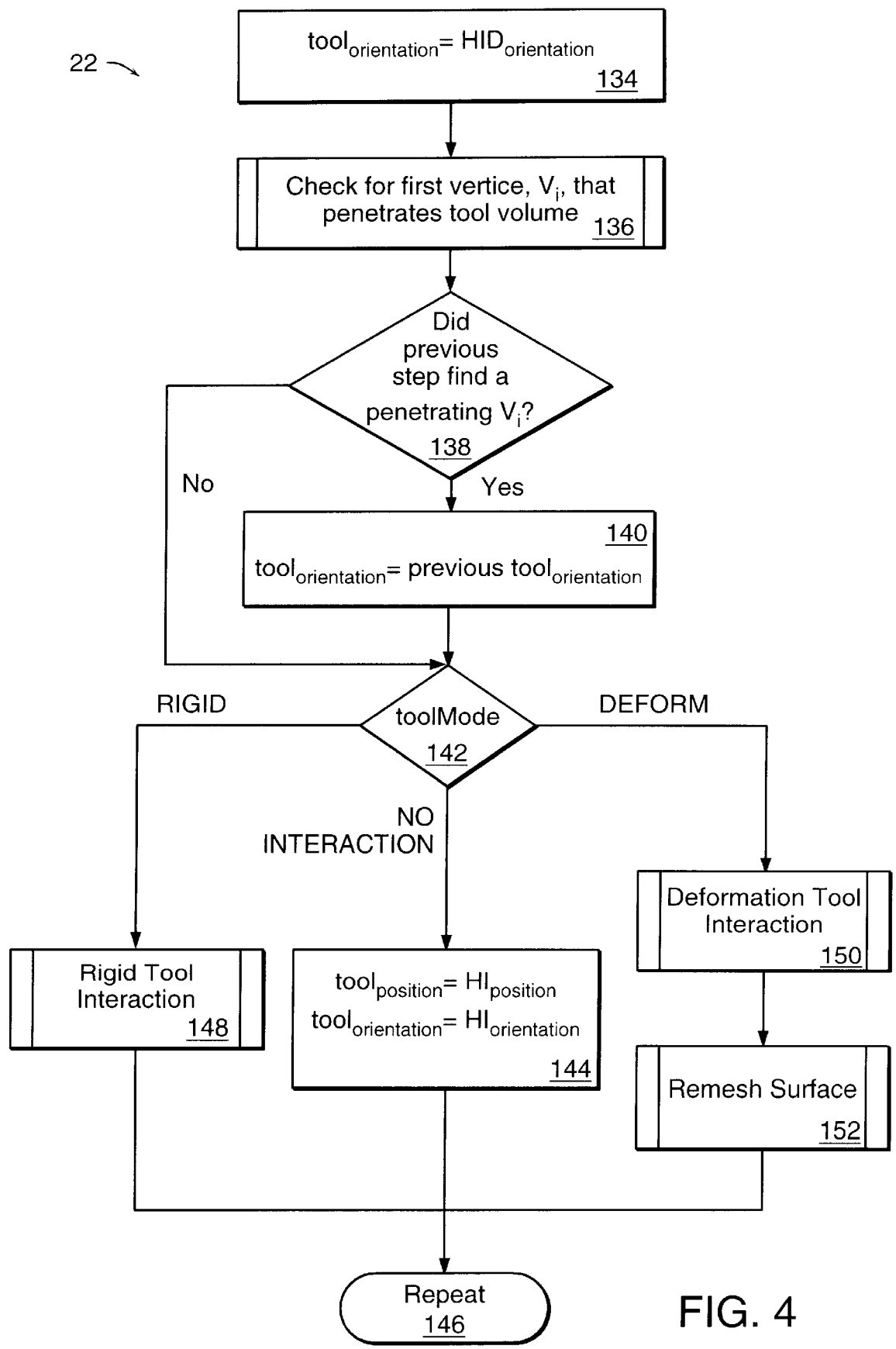
FIG. 4 is a flowchart of one embodiment of a surface interaction process.

In more detail and referring to FIG. 4, a flowchart illustrates a more detailed sequence of steps performed by the surface interaction process 22 in one embodiment of the present invention to deform the virtual surface in response to interactions with the virtual tool. Before the surface interaction process attempts to move the position of virtual tool, the surface interaction process will obtain the current orientation of the haptic interface device from the haptic process described above and will attempt to orient the virtual tool toward the same orientation as the haptic interface device (step 134). After orienting the virtual tool in the same orientation as the haptic interface device, the surface interaction process searches for the first vertex ($V_i$) of the virtual surface that penetrates the volume of the virtual tool (step 136). An embodiment of a method for determining the first vertex which penetrates the volume of the virtual tool will be described in detail below in the discussion of FIG. 5. The surface interaction process will check the vertices of the virtual surface until a penetrating vertex is found. Once a single penetrating vertex is found, the surface interaction process will proceed to step 138 and will not check all of the vertices composing the virtual surface. The surface interaction process will also proceed to step 138 once it checks all the vertices of the virtual surface and does not locate a penetrating vertex.

In step 138 the surface interaction process determines if a penetrating vertex $V_i$ was located. If the surface interaction process locates a penetrating vertex $V_i$, the surface interaction process sets the current orientation of the virtual tool ($tool_{orientation}$) to the orientation of the tool during the previous cycle (step 140). The surface interaction process then determines the mode of the virtual tool which was set by the haptics process 20 described above in the discussion of FIGS. 3A, 3B, and 3C (step 142). If the mode of the virtual tool is set to no interaction, the surface interaction process sets the position of the virtual tool ($tool_{position}$) equal to the position of the haptic interface ($HI_{position}$) and the orientation of the virtual tool ($tool_{orientation}$) equal to the orientation of the haptic interface device (($HI_{orientation}$) (step 144). The surface interaction process then repeats steps 134, 136, 140, and 142.

If the mode of the virtual tool is set to rigid, the surface interaction process proceeds to step 148 and determines the interaction of the virtual tool with a rigid surface. The rigid interaction will be discussed below in the discussion of FIGS. 6A, 6B, and 6C. After the surface interaction process determines the rigid interaction, it repeats steps 134, 136, 140, and 142.

If the mode of the virtual tool is set to deform, the surface interaction process proceeds to step 150 and determines the deformation tool interaction. In this step, the surface interaction process determines how the virtual tool interacts with and deforms the virtual surface. An embodiment of a method for determining the interaction and deformation of the virtual surface will be described below in the discussion of FIG. 9. Next, in step 152, the surface interaction software remeshes the virtual surface as necessary. An embodiment of a method for remeshing the virtual surface will be described below in the discussion of FIGS. 12A, 12B, 12C, and 12D. After the surface interaction process has remeshed the virtual surface, it repeats steps 134, 136, 140 and 142 (step 146).

Figure 5:
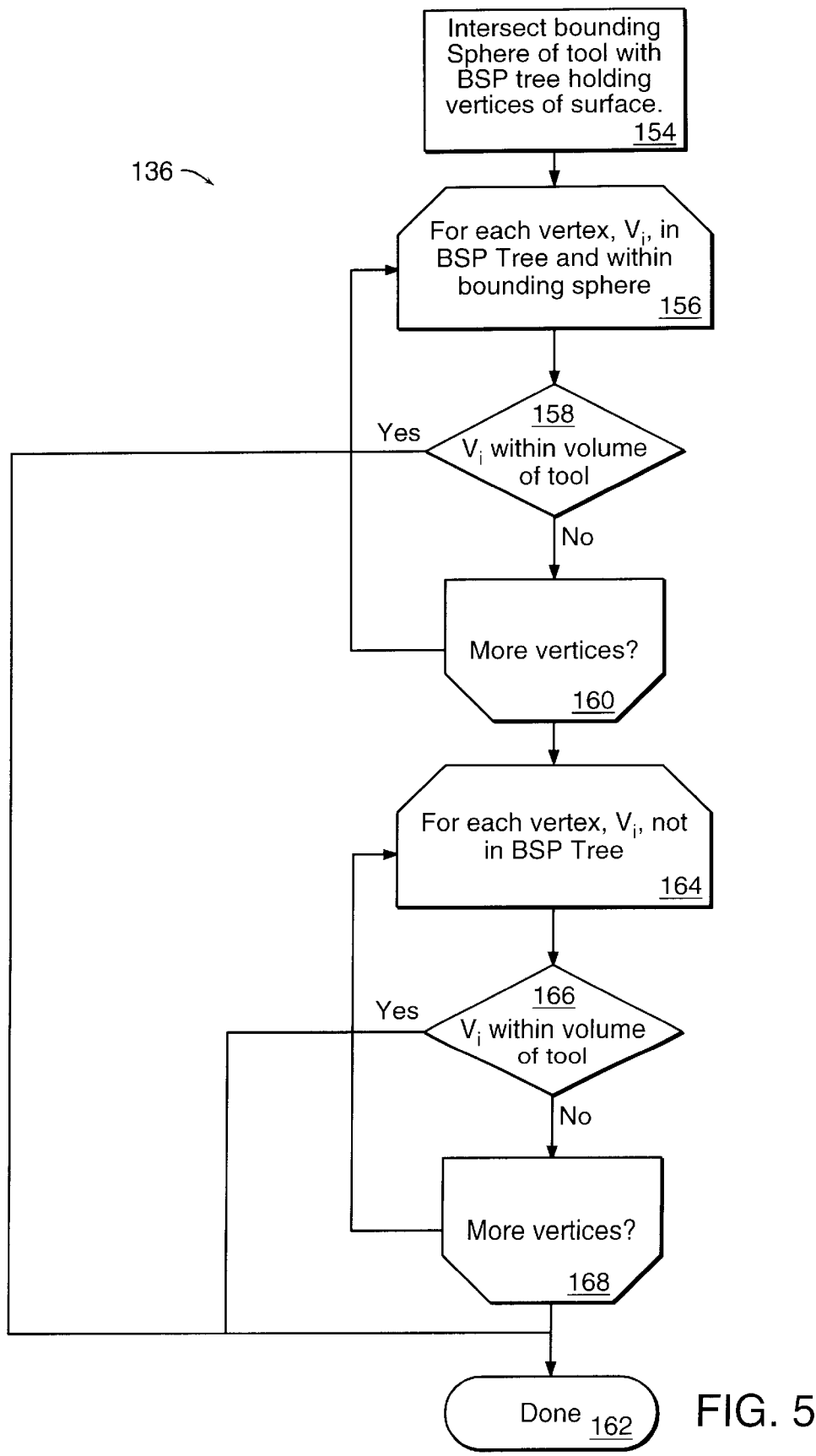
FIG. 5 is a flowchart of one embodiment of a method for finding a first penetrating vertex of a triangular mesh forming a virtual surface upon collision with a virtual tool.

In more detail and referring to FIG. 5, a flowchart illustrates a more detailed sequence of steps performed by the surface interaction process in one embodiment of the present invention to find the first vertex of a triangular mesh forming the virtual surface. In one embodiment, the surface interaction process creates a binary spatial partitioning (BSP) tree which holds the vertices of the triangular mesh forming the virtual surface. Other spatial partitionings may be used to hold the vertices such as an octree or quadtree as known by those skilled in the art.

The surface interaction process also creates a bounding sphere around the virtual tool. The bounding sphere is the smallest sphere in which the virtual tool may be disposed. In step 154, the surface interaction process interacts the bounding sphere surrounding the tool the with BSP tree. The surface interaction process then checks each vertex of the virtual surface which is in the BSP tree and within the bounding sphere to determine if the vertex is also within the volume of the virtual tool (repeat loop including steps 156, 158, 160). In one embodiment of the method of the present invention, the volume of the virtual tool is defined by an implicit equation. In an alternative embodiment, the virtual surfaces or the virtual object may be defined by one or more implicit equations and the virtual tool may be defined as a polygonal mesh.

To determine if the vertex of the virtual surface is within the volume of the virtual tool, the implicit equation is evaluated for the coordinate of the vertex. If the solution to the equation is less than zero, the vertex is within the tool volume. If the solution to the equation is greater than zero, the vertex is outside the tool volume. Other embodiments may use a voxel approach. Once the surface interaction process finds a vertex $V_i$ within the volume of the tool, the surface interaction process exits the repeat loop and proceeds to step 162 and is done. The surface interaction process saves the penetrating vertex as $V_i$. The surface interaction process then uses the $V_i$ penetrating the volume of the virtual tool as described above in the discussion of FIG. 4.

If the surface interaction process checks all of the vertices within the bounding sphere and within the BSP tree and does not locate a vertex within the volume of the tool, the surface interaction process begins checking the vertices not located in the BSP tree to determine if they are located within the volume of the virtual tool (steps 164, 166, 168). The surface interaction process continues checking vertices until it finds a vertex located within the volume of the tool. Once the surface interaction process locates a vertex within the volume of the tool, it proceeds to step 162. The surface interaction process then uses the $V_i$ penetrating the volume of the virtual tool as described above in the discussion of FIG. 4.

Figure 6A:
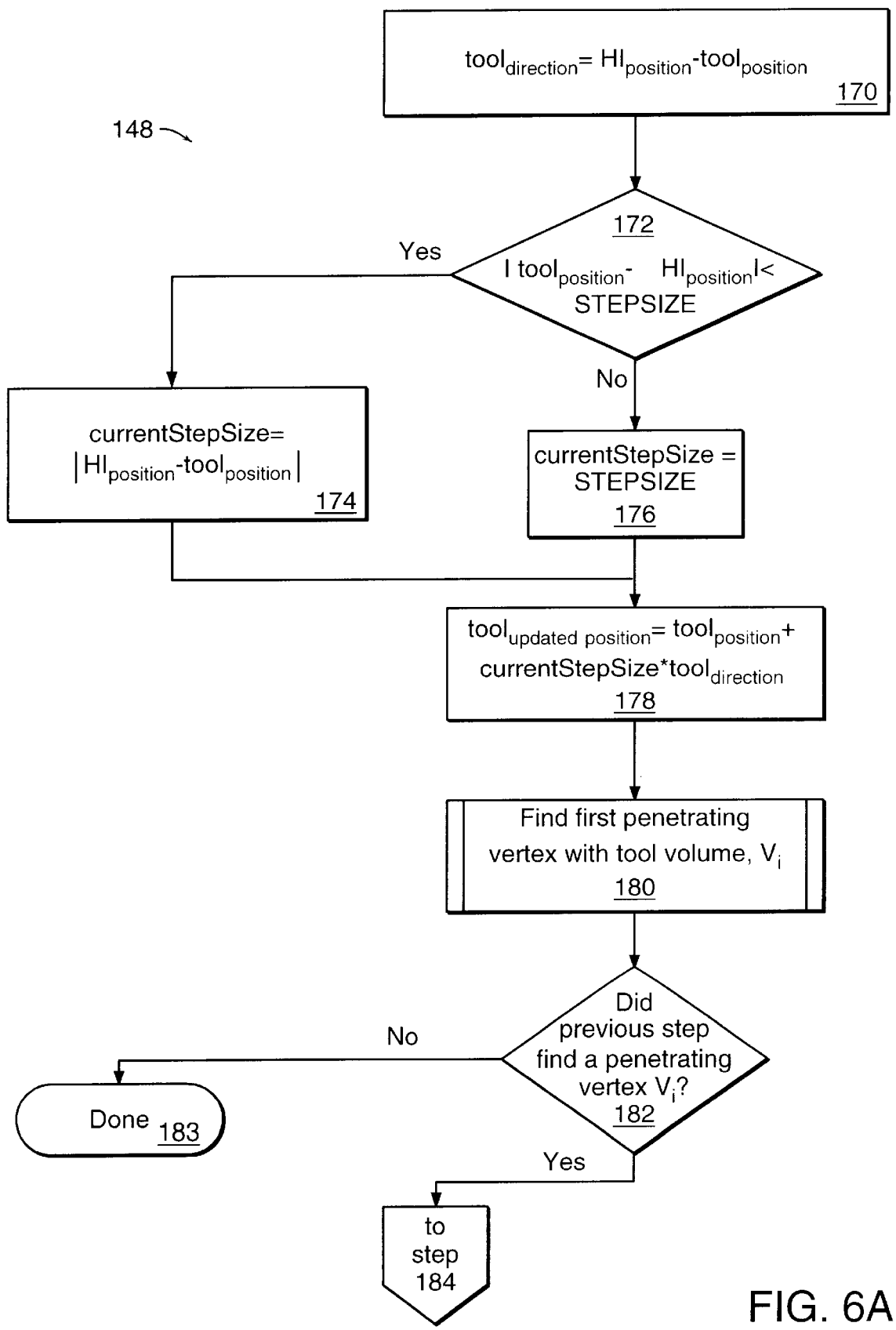
FIGS. 6A–6C are a flowchart of one embodiment of a method for determining the interaction of the virtual tool with the virtual surface when the tool mode is set to rigid interaction.
Figure 6B:
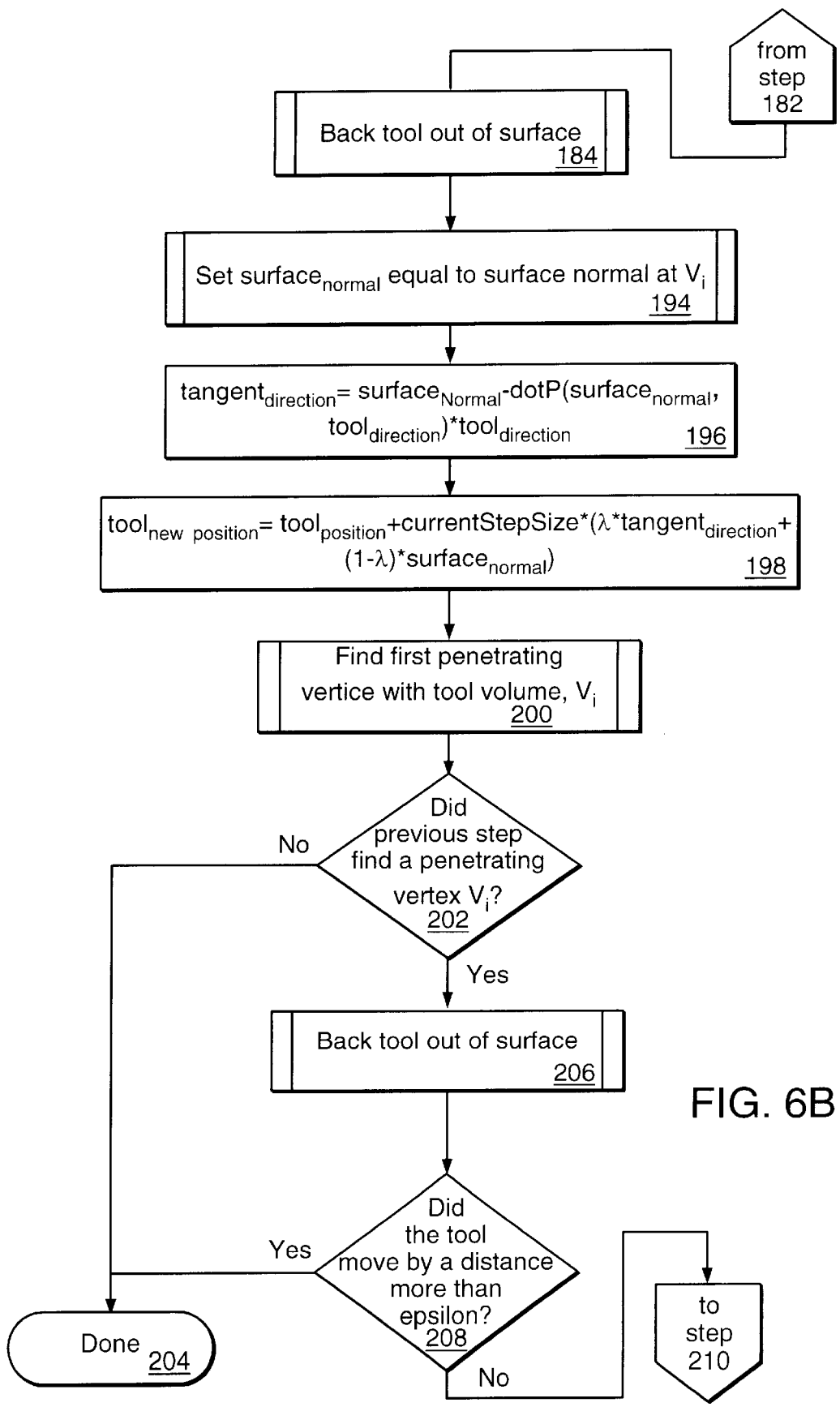
Figure 6C:
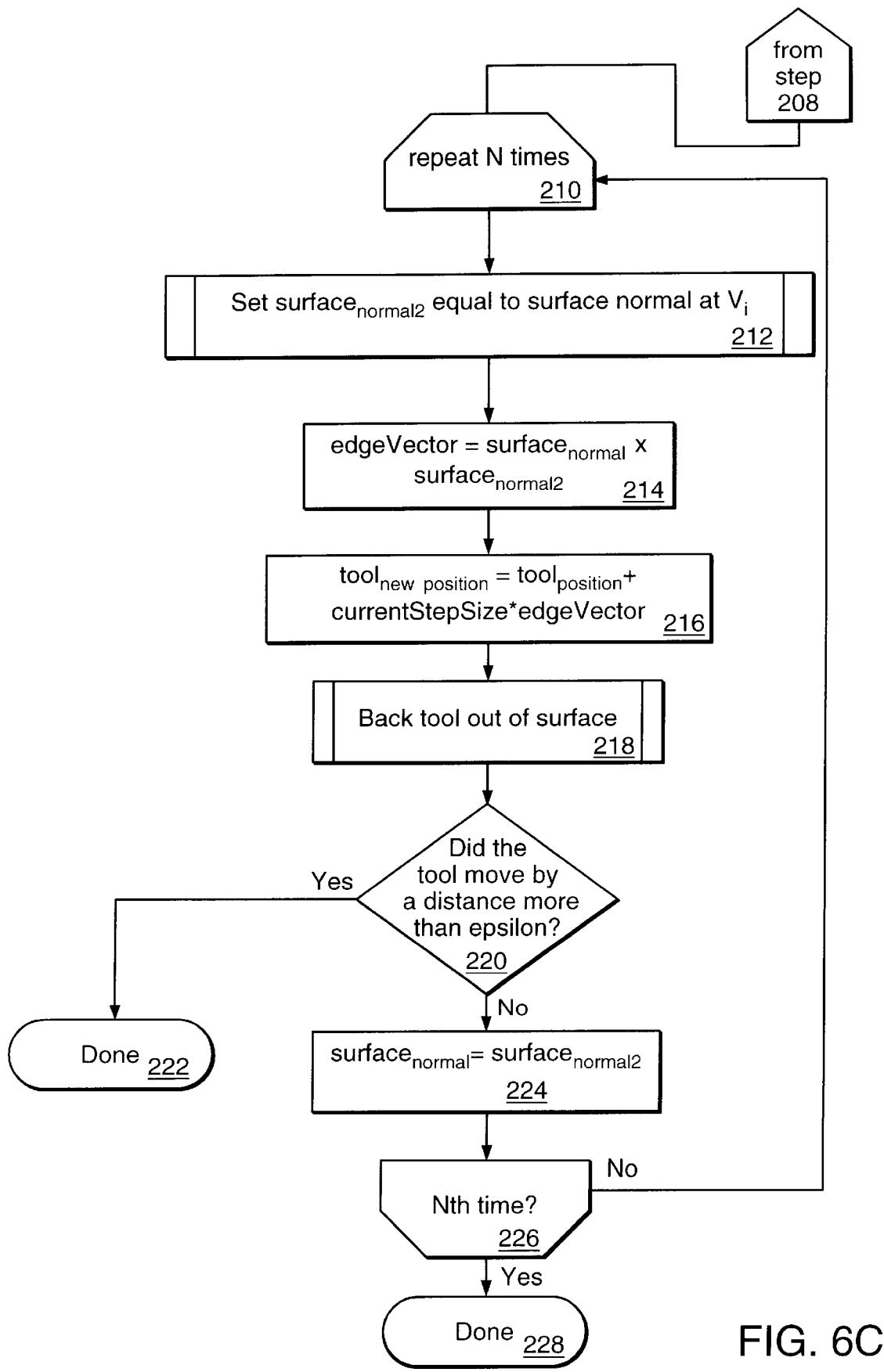

FIGS. 6A, 6B, and 6C illustrate one embodiment of a method of the present invention for determining the interaction of the virtual tool with the virtual surface when the tool mode is set to rigid interaction as in step 148 of FIG. 4 described above. In this embodiment, when the virtual tool collides with the virtual surface, the tool is not allowed to penetrate or deform the virtual surface. The virtual tool is only allowed to slide across the surface. In step 170, the surface interaction process sets the direction of the virtual tool ($tool_{direction}$), i.e. virtual sphere 56, equal to the displacement between the position of the haptic interface ($HI_{position}$) and the current tool position $tool_{position}$). In step 172, the haptic process determines if the amount that the virtual tool must move to intersect with the position of the haptic interface is greater than a predetermined stepsize (STEPSIZE) according to equation (5) below.

$$|tool_{position} - HI_{position}| < STEPSIZE \qquad (5)$$

In one embodiment, the predetermined stepsize is 0.25 mm. If the magnitude of the difference in position between the tool position ($tool_{position}$) and the haptic interface position ($HI_{position}$) is less than the predetermined stepsize, the haptic process sets the current step size equal to the magnitude of the difference in position between the tool position (tool$_{position}$) and the haptic interface position (HI$_{position}$) (step 174). If the magnitude is greater than the predetermined stepsize, the haptic process sets the current step size equal to the predetermined step size (step 176). The purpose of steps 172, 174, 176 is to ensure that the tool does not move more than a predetermined amount during any cycle.

Next the surface interaction process determines the updated position of the virtual tool (tool$_{updated\_position}$) according to equation (6) below in which tool$_{position}$ represents the current tool position, currentStepSize represents the magnitude of the distance the virtual tool may move, and tool$_{direction}$ represents a unit vector in the direction that the virtual tool must move to intersect the haptic interface (step 178). The calculation of the vector tool$_{direction}$ was described above in the discussion of step 170.

$$tool_{updated\_position} = tool_{position} + currentStepSize * tool_{direction} \quad (6)$$

Next, in step 180, the surface interaction process attempts to find a vertex (V$_i$) of the triangular mesh forming the virtual surface which penetrates the volume of the virtual tool. In one embodiment, the surface interaction process uses the method illustrated in FIG. 5 and described above to find the first penetrating vertex V$_i$. In step 182 the surface interaction process determines if a penetrating vertex was located. If a penetrating vertex was not found, the surface interaction process is complete for that cycle (step 183). The virtual tool does not need to be moved out of the virtual surface as none of the vertices of the virtual surface are located within the virtual object.

Figure 7:
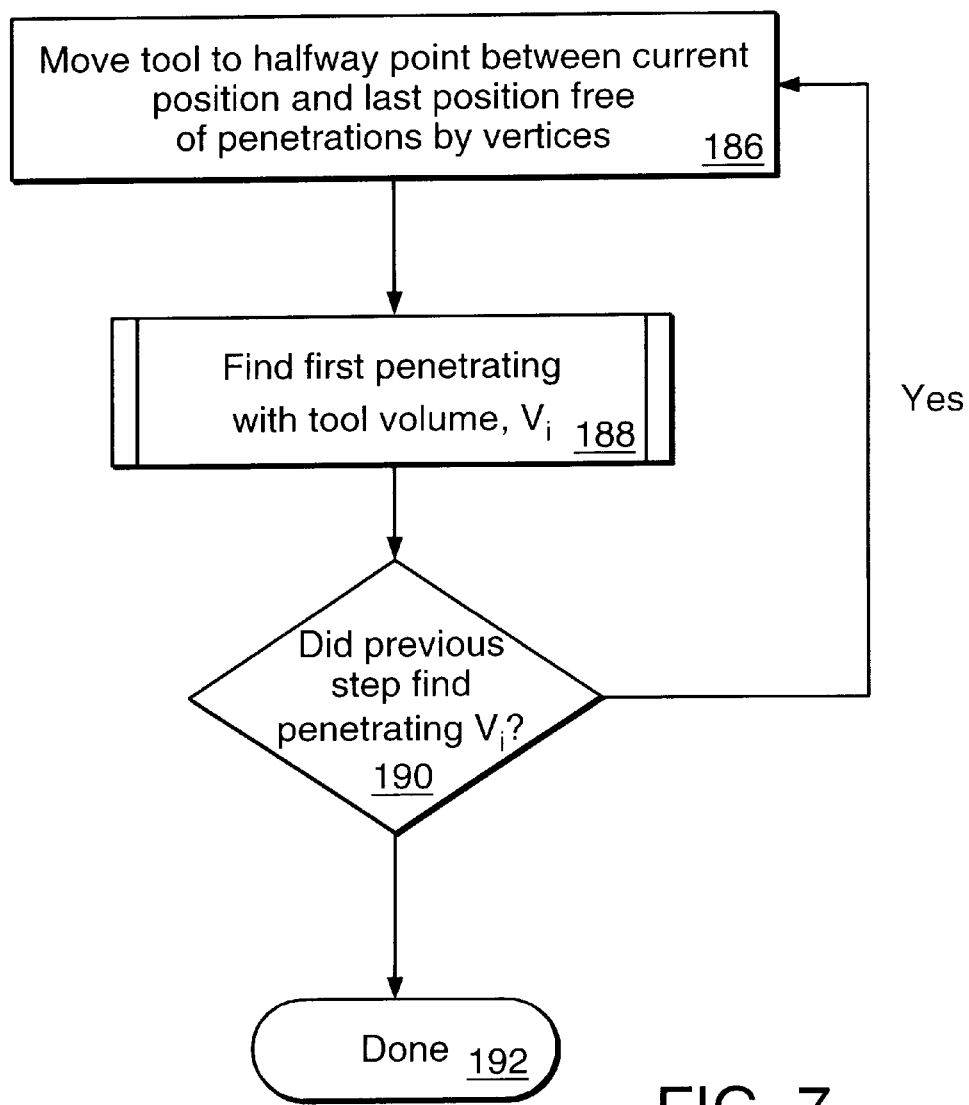
FIG. 7 is a flowchart of one embodiment of a process for backing the virtual tool out of the virtual surface.

If a penetrating vertex is found, the surface interaction process moves the virtual tool outside of the virtual surface (step 184). FIG. 7 shows one embodiment of a process for backing the virtual tool out of the virtual surface. In step 186, the surface interaction application moves the via tool to a position halfway between the current position of the virtual tool and the last position of the virtual tool in which none of the vertices of the virtual surface penetrated the volume of the virtual tool. Next in step 188, the surface interaction application attempts to find a vertex of the triangular mesh forming the virtual surface which penetrates the virtual tool. In one embodiment, the surface interaction process uses the steps illustrated in the flowchart of FIG. 5 and described above to locate a penetrating vertex. In step 190, the surf interaction process determines if a penetrating vertex was found. If a penetrating vertex was not found, the surface interaction process is done and does not need to move the virtual tool any further from the virtual surface because the virtual tool no longer intersects with the virtual surface. In another embodiment, the surface interaction process may iteratively move the virtual tool back closer to the virtual surface to find the position closest to the virtual surface at which none of the vertices of the virtual surface penetrate the volume of the virtual tool. If the surface interaction process locates a penetrating vertex, the surface interaction process again moves the tool to a point halfway between the point to which the tool had just been moved and the last position of the virtual tool in which none of the vertices of the virtual surface penetrated the volume of the virtual tool. The surface interaction process then again checks for penetrating vertices. The haptic interaction process repeats steps 186, 188 and 190 until none of the vertices of the virtual surface penetrate the virtual tool.

After the tool has been backed out of the surface, the surface interaction process slides the virtual tool in a direction substantially tangent to the surface. To prevent the virtual tool from prematurely penetrating the virtual surface due to any error in calculating the normal vector to the virtual surface, the surface interaction process moves the virtual tool across and away from the surface. The extra movement away the surface is resolved in the next iteration of this process when the virtual tool is brought down directly toward the position of the haptic interface. To determine the direction to move the virtual tool, in step 194 the surface interaction process first sets the surface normal to the virtual surface equal to the surface normal at the penetrating vertex (V$_i$) located in step 180.

The surface normal of the penetrating vertex may be determined according to several methods. As mentioned above, in one embodiment, the virtual surface is defined as a mesh and the virtual tool as the volume. The volumetric representation is used to capture penetrations of the surface mesh vertices and compel the penetrating vertices toward the surface of the tool volume. Given a point in Cartesian coordinate space, this method determines whether or not the point is inside of or outside of the tool volume.

Assuming a point in Cartesian coordinate space guaranteed to be close to the surface of the tool volume, the method generates an approximation to the surface normal at the closest point to the surface. Accordingly, the closer to the tool surface the point is, the less error in the surface normal approximation. While it may not always be possible to calculate an exact point on the surface, there will typically be known certain positions that are guaranteed to be within a known distance above or below the surface.

Virtual tools may be implemented as a sphere, a cuboid, a toroid, or other volumetric representations. An implicit function (e.g. S(P)=0) may be used to represent these tool volumes. Implicit functions have the property that S(P) equals zero if the point P lies on the surface, S(P) is less than zero if the point P is internal to the volume, and S(P) is greater than zero if the point P is external to the volume. The first derivative of S(P) with respect to Cartesian coordinates x, y, and z returns a vector pointing toward the surface of S when P is close to the surface, as long as the distance from P to the surface is relatively small with respect to the local curvature of the surface near this point. Accordingly, the first derivative may be used to generate a vector as an approximation to the surface normal. For values of S(P) less than zero, the negative of the first derivative is used as the surface normal approximation. By way of example, for a sphere, S(P) is equal to the sum of the squares of x, y, and z, plus one and the first derivative is two times the sum of x, y, and z. For a cuboid, S(P) is equal to the sum of each of x, y, and z to the eighth power, plus one and the first derivative is eight times the sum of each of x, y, and z to the seventh power.

In another embodiment for generating the surface normal, a voxel representation may be used. According to this method, a volumetric or voxel object is represented by dividing space into discrete areas known as voxels. This division of space encodes every possible point in the space as being enclosed in a voxel. For each voxel, a value is used to specify the occupancy of material through an integer or decimal point value. The surface of this volume is then defined as an isosurface of these values. Values below the isosurface value are then defined as being internal to the volume and values above the isosurface value are considered external to the volume. Voxelized volumes are known to those skilled in computer graphics and can be used readily to represent arbitrary volumes such as virtual tools with intricate shapes.

By specifying any point enclosed in a voxel having a value less than the isosurface value as inside the volume and any point enclosed in a voxel having a value greater than the isosurface value as outside the volume, an efficient algorithm may be developed. Further, using a method known to those skilled in the art as trilinear interpolation, a gradient vector similar to the vector given by the first derivative of an implicit function S(P) can be calculated. If the vector is calculated at a point exterior to the isosurface then the negative of the vector gives the normal approximation.

Once the surface interaction process has determined the surface normal at $V_i$, in step 196 the surface interaction process determines the tangent direction (tangent$_{direction}$) to the virtual surface at $V_i$ according to the dot product vector calculation of equation (7) below in which surface normal represents the surface normal calculated in step 194 and tool$_{direction}$ represents the unit vector pointing in the direction in which the virtual tool must move to intersect with the haptic interface location (determined above in step 170).

$$\text{tangent}_{direction} = \text{surface}_{Normal} - (\text{surface}_{Normal} * \text{tool}_{direction}) * \text{tool}_{direction} \quad (7)$$

Figure 8:
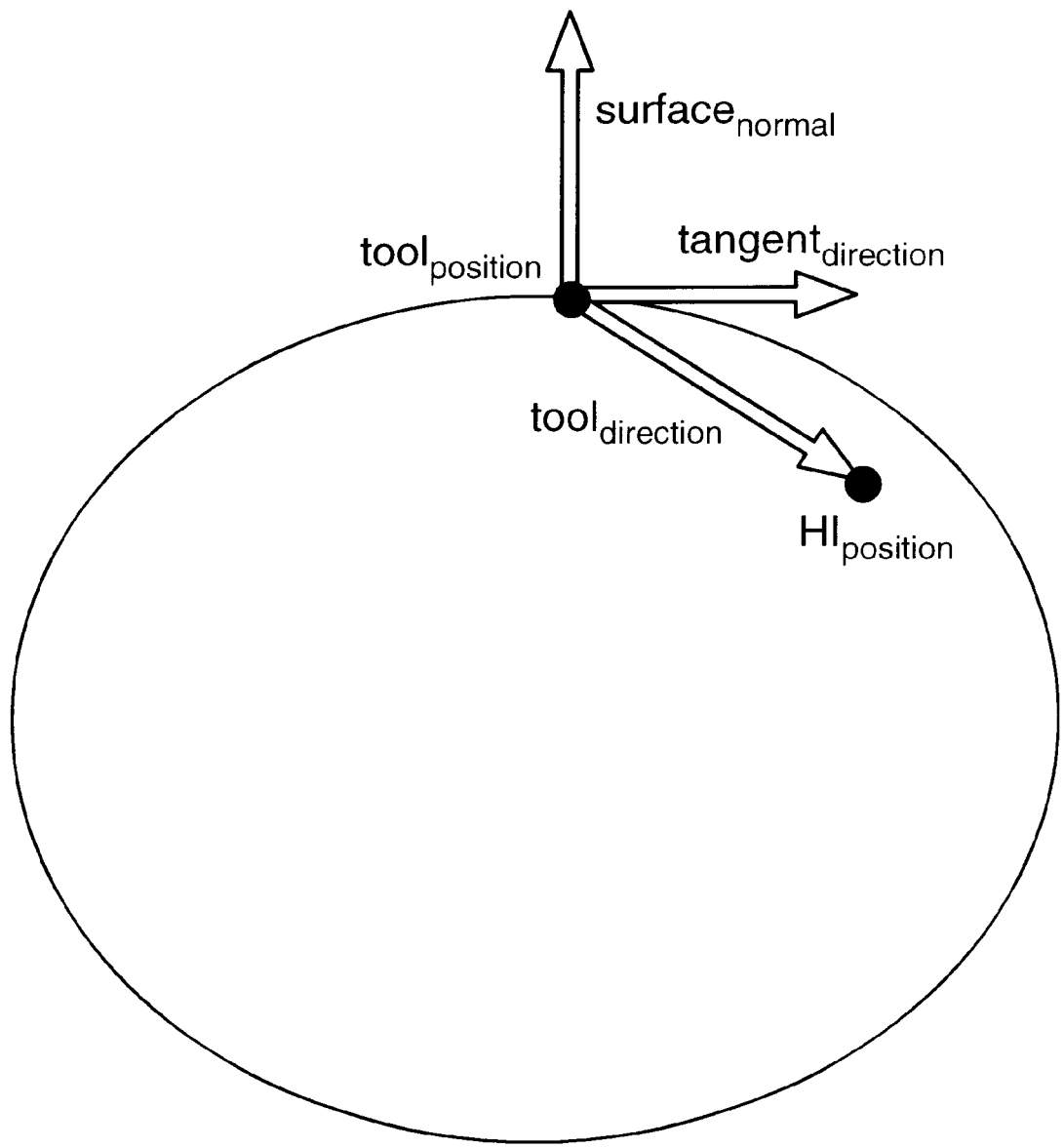
FIG. 8 is a schematic representation of vectors calculated in the surface interaction process.

See FIG. 8 for a schematic representation of the vector relationship.

The surface interaction process then calculates the new position of the virtual tool by adding a portion of the surface normal to the virtual surface according to equation (8) below in which λ represents a predetermined value (step 198).

$$\text{tool}_{new\_position} = \text{tool}_{position} + \text{currentStepSize} * (\lambda * \text{tangent}_{direction} + (1-\lambda) * \text{surface}_{normal}) \quad (8)$$

In one embodiment, λ has a value of about 0.75.

After the virtual tool has been moved to tool$_{new\_position}$ calculated above in equation (8), the surface interaction process again attempts to find a vertex of the virtual surface which penetrates the virtual object (step 200). In one embodiment of the method of the present invention, the surface interaction process uses the steps illustrated in FIG. 5 and described above to locate a penetrating vertex. In step 202 the surface interaction process determines if a penetrating vertex was not found, the virtual tool does not need to be moved and the surface interaction process is complete for this cycle (step 204). If a penetrating vertex is found, the surface interaction process backs the virtual tool out of the virtual surface according to the steps illustrated by the flowchart of FIG. 7 and described above (step 206). Once the virtual tool is backed out of the virtual surface, the surface interaction process determines if the virtual tool was moved by a distance more than epsilon (step 208). Epsilon is some small number used for the approximation of zero. For example, epsilon may be about 0.001, or about two orders of magnitude smaller than the predetermined stepsize. A small value is chosen for epsilon so that there is no perceivable movement of the haptic interface. If the virtual tool was moved by a distance greater than epsilon, the virtual tool does not need to be moved and the surface interaction process is complete for this cycle (step 204).

If the virtual tool was moved by a distance less than epsilon, the virtual tool may be at an edge of the virtual surface. The surface interaction process then searches for an edge constraint to slide the virtual tool along. In step 210 the surface interaction process begins a series of steps that will be repeated N times. N is a predetermined integer. In one embodiment, N is equal to ten. In step 212, the surface interaction process sets a second surface normal (surface$_{normal2}$) equal to the surface normal at the most recently found penetrating vertex $V_i$. The surface interaction process then calculates a vector along the edge (edgeVector) that the virtual tool has collided with according to equation (9) below in which surface$_{normal}$ represents the surface normal at the first penetrating vertex that was located in step 200 and surface$_{normal2}$ represents the surface normal calculated in step 212.

$$\text{edgeVector} = \text{surface}_{normal} \times \text{surface}_{normal2} \quad (9)$$

The vector edgeVector calculated in equation (9) is a unit vector.

Next, in step 216, the surface interaction process calculates the new position of the virtual tool (tool$_{newposition}$) according to equation (10) below in which tool$_{position}$ represents the current position of the tool, currentStepSize represents the magnitude of the distance that the virtual tool may move, and edgeVector represents the unit vector calculated in equation (9) and which falls along the edge.

$$\text{tool}_{newposition} = \text{tool}_{position} + \text{currentStepSize} \cdot \text{edgeVector} \quad (10)$$

Next, in step 218, the surface interaction process steps the virtual tool out of the virtual surface according the steps illustrated in FIG. 7 and described above. The surface interaction process then again determines if the virtual tool was moved by a distance more than epsilon (step 220). If the virtual tool was moved by a distance greater than epsilon, the virtual tool does not need to be moved again and the surface interaction process is complete for this cycle (step 222). If the virtual tool was moved by a distance less than epsilon, the first surface normal ) is set equal to the second surface normal (surface$_{normal2}$) (step 224) and the surface interaction process proceeds to step 226. In step 226, the surface interaction process determines if steps 210, 212, 214, 216, 218, 220, and 224 have been repeated N times. As described above, in one embodiment N is equal to ten. If these steps have not been repeated N times, the surface interaction process returns to step 210 and repeats the series of steps. If these steps have been repeated N times the surface interaction process does not try any further to locate a direction to move the virtual tool (step 228).

In another embodiment, in order to find a direction to move the virtual tool so that none of the vertices of the virtual surface penetrate the virtual tool, the surface interaction process selects random vectors to determine the movement of the virtual tool. The surface interaction process continues to select a new random vector until the desired result is achieved, i.e., none of the vertices of the virtual surface penetrate the virtual tool.

Figure 9:
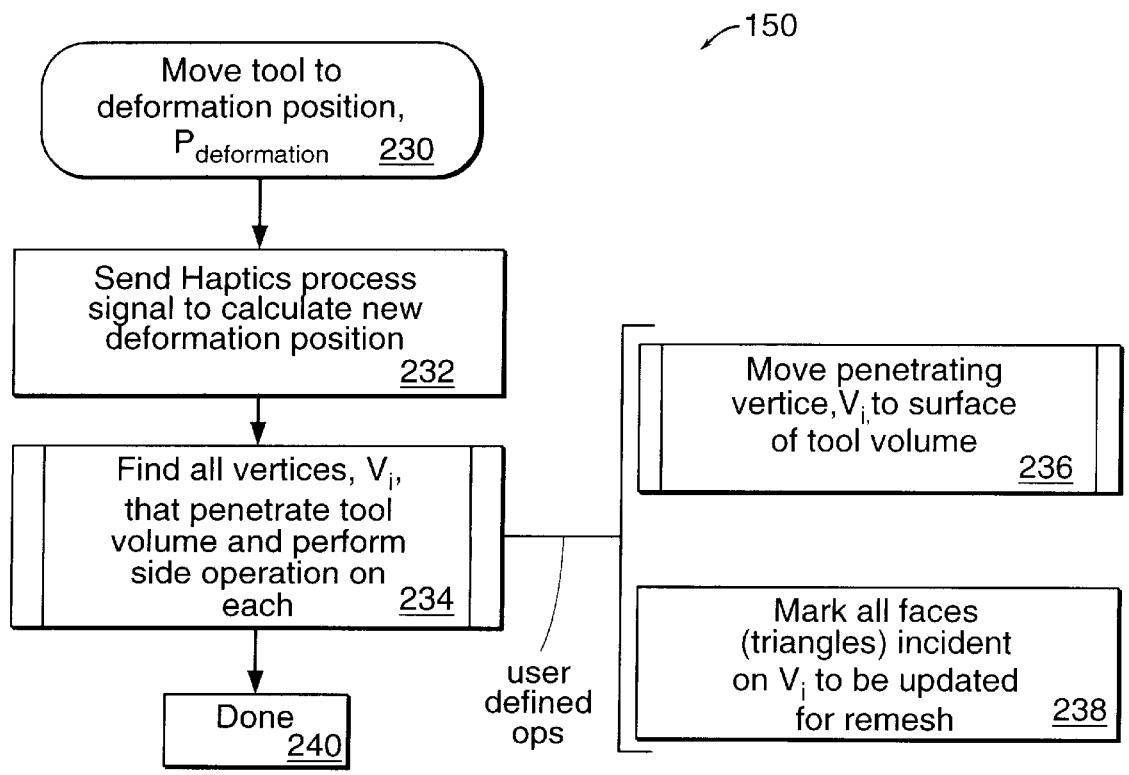
FIG. 9 is a flowchart of one embodiment of a method for determining the interaction of the virtual tool with the virtual surface when the tool mode is set to deform.

Referring again to FIG. 4, if the tool mode has been set to deform, the surface interaction process determines the deformation of the virtual surface in response to collisions with the virtual tool (step 150). FIG. 9 illustrates one embodiment of a method of the present invention for determining the interaction of the virtual tool with the virtual surface when the tool mode is set to deform. In step 230, the surface interaction process moves the virtual tool to the deformation position (P$_{deformation}$) which is determined by the haptics process illustrated in the flowchart of FIGS. 3A, 3B, and 3C and described above. As described above, P$_{deformation}$ is the position that the virtual tool must move to in order to correspond with the haptic interface location. In step 232 the surface interaction process sends a signal to the haptics process indicating the surface interaction process is ready to receive a new deformation position. This signal is used by the haptics process in step 106 of FIG. 3A. Net, the surface interaction process determines all the vertices of the virtual surface which penetrate the volume of the virtual tool and performs an operation on each of these vertices (step 234).

An embodiment of a method for determining all of the vertices of the virtual surface which penetrate the virtual tool will be described in detail below in the discussion of FIG. 10. The operations performed on the penetrating vertices include moving each penetrating vertex to the surface of the virtual tool (step 236) and marking all the triangles incident on the penetrating vertices to be updated for remeshing (step 238). Embodiments of methods for moving the penetrating vertices to the surface of the virtual tool will be described below in the discussion of FIGS. 11A and 11B. After the surface interaction process has determined all of the penetrating vertices and performed the appropriate operations on the penetrating vertices, the surface interaction process has completed the process of determining the deformation of the virtual surface in response to collisions with the virtual tool (step 240).

Figure 10:
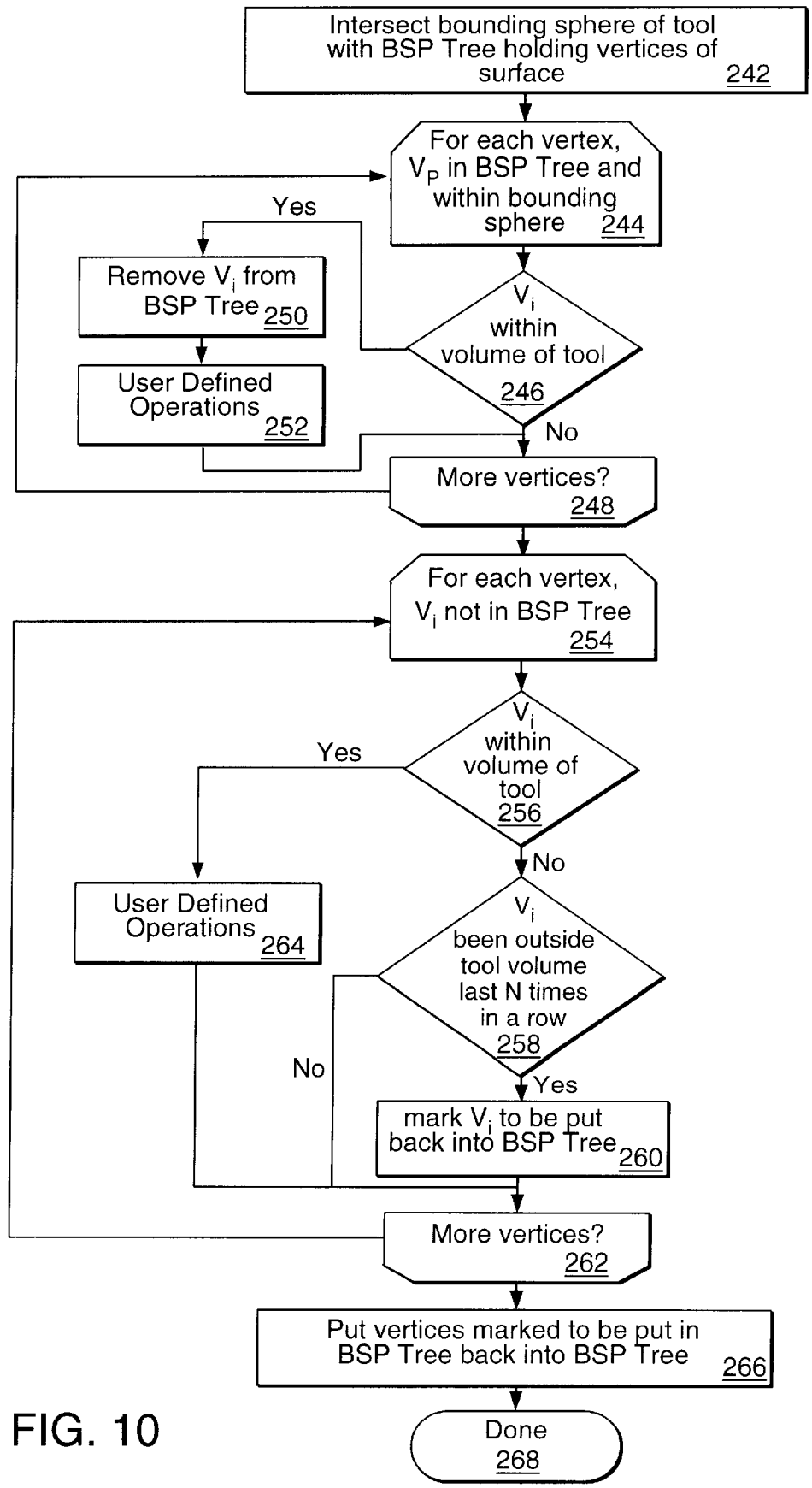
FIG. 10 is a flowchart of one embodiment of a method for determining all of the vertices of the virtual surface which penetrate the volume of the virtual tool.

FIG. 10 illustrates one embodiment of a method of the present invention for determining all of the vertices of the virtual surface which penetrate the volume of the virtual tool. Similar to the method illustrated by the flowchart of FIG. 5 for determining the first vertex of the virtual surface which penetrates the virtual tool, in one embodiment, the surface interaction process creates a binary spatial partitioning (BSP) tree which holds the vertices of the triangular mesh forming the virtual surface (step 242). The surface interaction process also creates a bounding sphere around the virtual tool. The bounding sphere is the smallest sphere in which the virtual tool may be disposed. In step 242, the surface interaction process interacts the bounding sphere surrounding the tool the with BSP tree. The surface interaction process then checks each vertex of the virtual surface which is in the BSP tree and within the bounding sphere to determine if the vertex is also within the volume of the virtual tool (repeat loop including steps 244, 246, 248). In one embodiment of the method of the present invention, the volume of the virtual tool is defined by an implicit equation. To determine if the vertex of the virtual surface is within the volume of the virtual tool, the implicit equation is evaluated for the coordinate of the vertex. If the solution to the equation is less than zero, the vertex is within the tool volume. If the solution to the equation is greater Man zero, the vertex is outside the tool volume. Other embodiments may use a voxel approach. Once the surface interaction process finds a vertex $V_i$ within the volume of the tool, the surface interaction process removes the vertex $V_i$ from the BSP tree (step 250) and performs the appropriate operations on the vertex $V_i$ (step 252). As described above, these operations include moving the penetrating vertex to the surface of the virtual tool and marking all the triangles incident on the penetrating vertex to be updated for remeshing. The surface interaction process repeats steps 244, 246, 248, 250 and 252 for each vertex within the BSP tree and within the bounding sphere.

Once the surface interaction process checks all of the vertices within the bounding sphere and within the BSP tree, the surface interaction process begins checking the vertices not located in the BSP tree to determine if they are located within the volume of the virtual tool (steps 254, 256, 258, 260, 262, and 264). If a vertex is found within the volume of the tool, the surface interaction process performs the appropriate operation on the vertex (step 264). As described above, these operations include moving the penetrating vertex to the surface of the virtual tool and marking all the triangles incident on the penetrating vertex to be updated for remeshing. If the vertex is not within the volume of the tool, the surface interaction process determines if the vertex has been outside the tool volume for the previous N cycles of the process. In one embodiment N is equal to ten. If the vertex has not been outside the volume of the virtual tool for the previous N cycles, the surface interaction process proceeds to check the next vertex. If the vertex has been outside of the tool volume for the previous N cycles, the vertex is marked to be put back into the BSP tree. The surface interaction process repeats steps 254, 256, 258, 260, 262, and 264 until each vertex not in the BSP tree is checked. The surface interaction process does not check vertices which were just removed from the BSP tree in step 250. Next, the surface interaction process places the vertices marked to be put into the BSP tree in step 260 into the BSP tree (step 266). The surface interaction process is then finished locating all of the penetrating vertices (step 268).

Figure 11A:
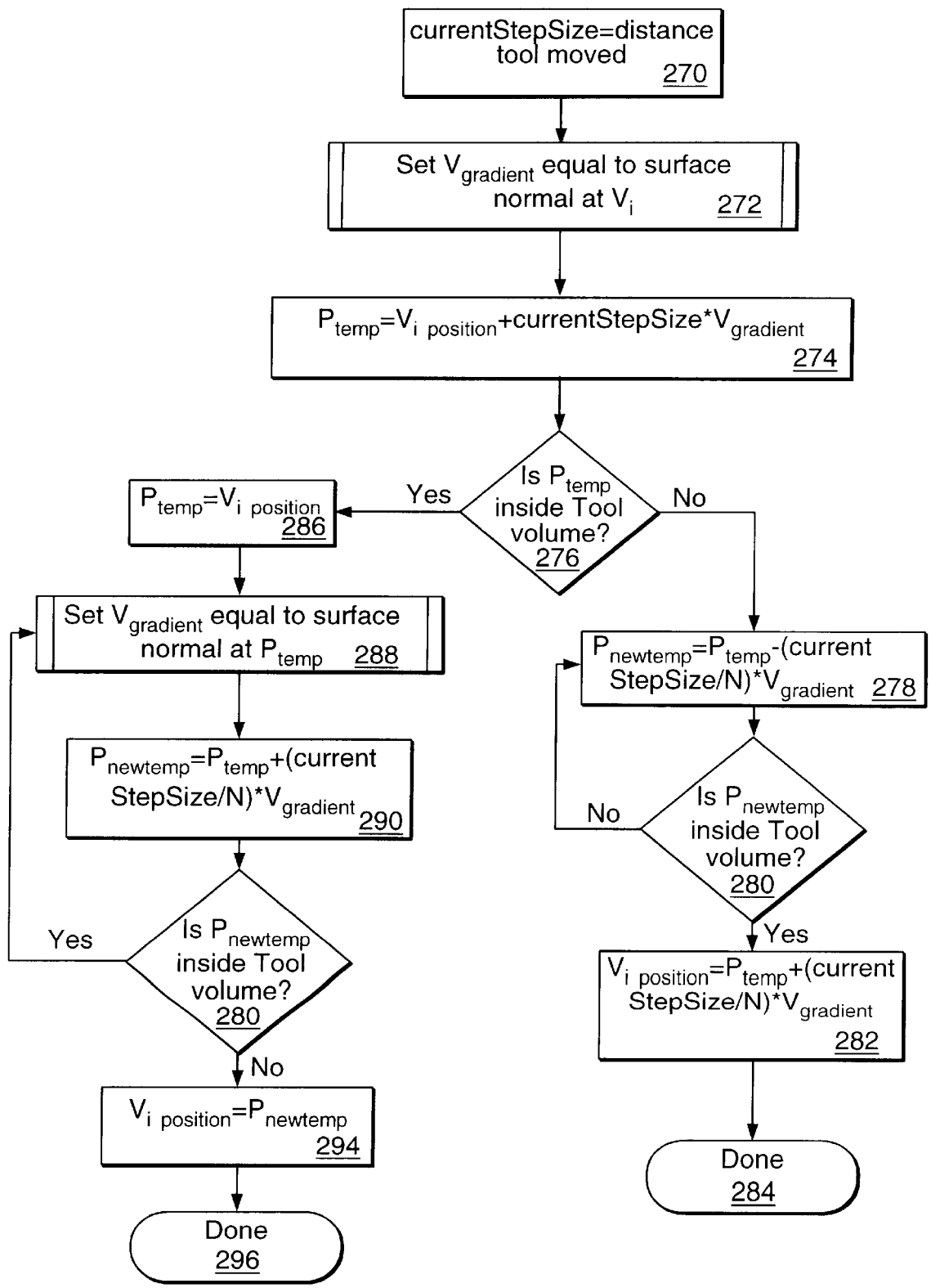
FIG. 11A is a flowchart of a method for moving a vertex of the virtual surface which penetrates the volume of the virtual tool to the surface of the virtual tool.

FIG. 11A illustrates one embodiment of a method of the present invention for moving a vertex of the virtual surface which penetrates the volume of the virtual tool to the surface of the virtual tool. In step 270, the surface interaction process sets the size of the step the vertex may move (currentStepSize) equal to the distance that the virtual tool moved during the last step the virtual tool took. Next, the surface interaction process determines the gradient vector of the virtual tool. In one embodiment, the surface interaction process sets the gradient vector ($V_{gradient}$) equal to the surface normal of the virtual surface at the penetrating vertex $V_i$ (step 272). In this embodiment $V_{gradient}$ is a unit vector in the direction of the gradient. An embodiment of a method for determining the surface normal was discussed above in the discussion of FIG. 8. The surface interaction process then determines a new temporary position ($P_{temp}$) of the penetrating vertex $V_i$ according to equation (11) below in which $V_{iposition}$ represents the current position of the vertex $V_i$ (step 274).

$$P_{temp}=V_{iposition}+\text{currentStepSize} \cdot V_{gradient} \qquad (11)$$

$P_{temp}$ is a position in virtual space which the surface interaction process presumes the vertex may be moved.

After calculating $P_{temp}$, the surface interaction process determines if $P_{temp}$ is within the volume of the virtual tool. If $P_{temp}$ is not within the volume of the virtual tool, it is outside the volume of the virtual tool, and in one embodiment, the surface interaction process move the vertex back toward the virtual tool in small steps (steps 278 and 280). In step 278, the surface interaction process determines a new temporary position of the vertex($P_{newtemp}$) which is a position back toward the virtual tool. In one embodiment, the surface interaction process calculates the new temporary position according to equation (12) below in which N is an integer. In one embodiment, N is equal to ten.

$$P_{newtemp}=P_{temp}-(\text{currentStepsize}/N) \cdot V_{gradient} \qquad (12)$$

The surface interaction process then determines if $P_{newtemp}$ is within the volume of the virtual tool (step 280). If $P_{newtemp}$ is not within the volume of the virtual tool, the surface interaction process returns to step 278 and calculates another $P_{newtemp}$ which is even closer to the virtual tool.

If $P_{newtemp}$ is within the volume of the virtual tool, the surface interaction process calculates the position to which the penetrating vertex is to be moved according to equation (13) below.

$$V_{iposition}=P_{temp}+(\text{currentStepSize}/N) \cdot V_{gradient} \qquad (13)$$

The purpose of step 282 is to find the last temporary position of the vertex in which the vertex was still outside the volume of the virtual tool. Once the surface interaction process has calculated the position to which the penetrating vertex is to be moved it proceeds to another operation to be performed on the vertex (step 284).

Returning to step 276, if the first calculated $P_{temp}$ is within the volume of the virtual tool, the surface interaction process sets the temporary position $P_{temp}$ equal to the current position of the vertex (step 286). The surface interaction process had tried to move the vertex out of the virtual tool by moving the vertex by the same amount that the virtual tool had moved. As this did not move the vertex outside of the volume of the virtual tool, in the embodiment illustrated by steps 288, 290, and 292, the surface interaction process is moving the vertex from the inside of the virtual tool to the outside of the virtual tool in small steps.

In step 288, the surface interaction process sets the gradient vector ($V_{gradient}$) equal to the surface normal of the virtual surface at $P_{temp}$. In this embodiment $V_{gradient}$ is a unit vector in the direction of the gradient. An embodiment of a method for determining the surface normal was discussed above in the discussion of FIG. 8. Next, in step 290, the surface interaction process determines a new temporary position of the vertex ($P_{newtemp}$) which is a position toward the outside of virtual tool. In one embodiment, the surface interaction process calculates the new temporary position according to equation (14) below in which N is an integer. In one embodiment, N is equal to ten.

$$P_{newtemp} = P_{temp} + (\text{currentStepSize}/N) \cdot V_{gradient} \qquad (14)$$

The surface interaction process then determines if $P_{newtemp}$ is within the volume of the virtual tool (step 292). If $P_{newtemp}$ is within the volume of the virtual tool, the surface interaction process returns to step 288 and calculates another $P_{newtemp}$ which is even closer to the outside of virtual tool. The surface interaction process repeats steps 288, 290 and 292 until a temporary position is found which is outside the volume of the virtual tool. If $P_{newtemp}$ is outside the volume of the virtual tool, the surface interaction process sets the position to which the penetrating vertex is to be moved ($V_{iposition}$) equal to $P_{newtemp}$ (step 294). Once the surface interaction process has calculated the position to which the penetrating vertex is to be moved it proceeds to another operation to be performed on the vertex (step 296).

Figure 11B:
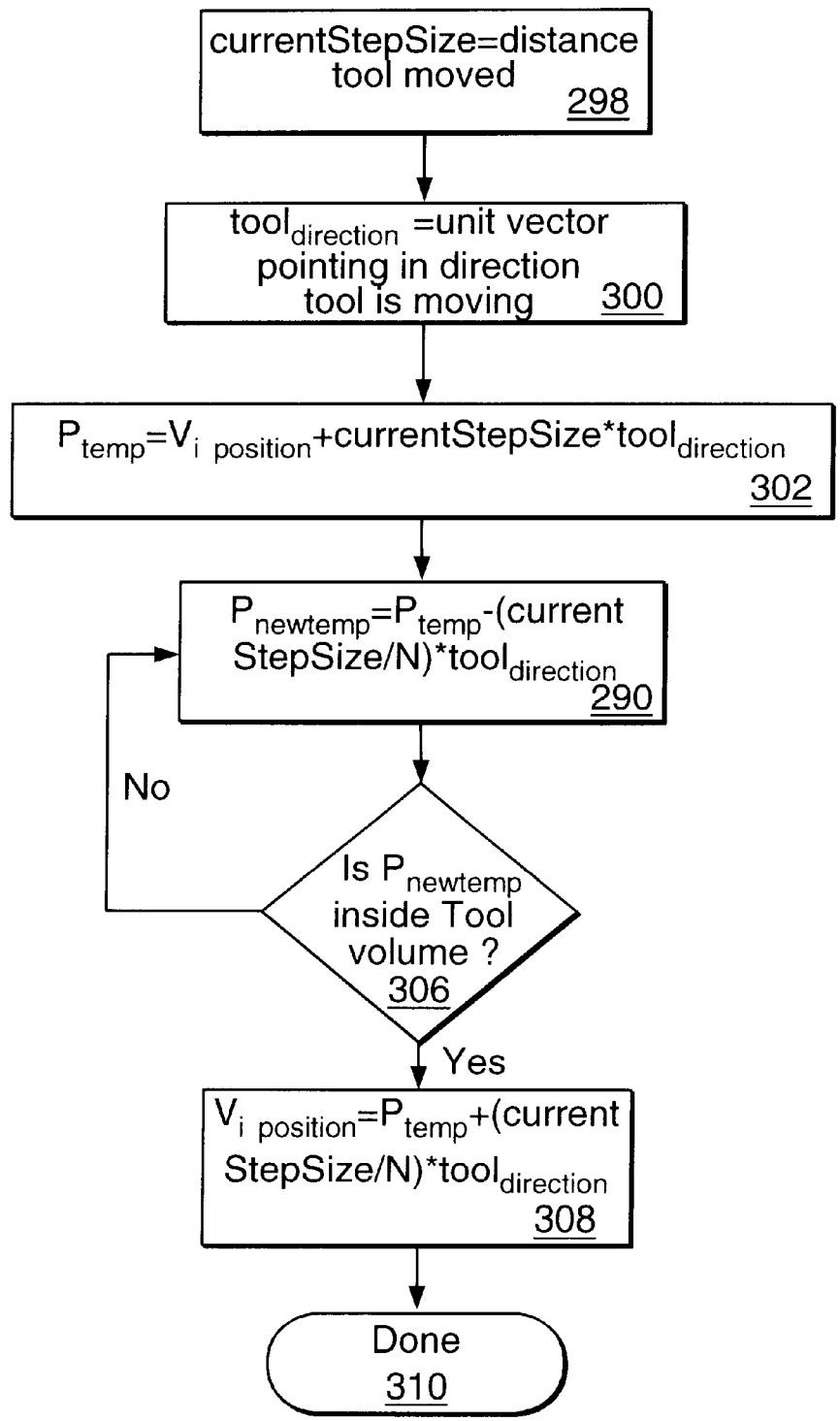
FIG. 11B is a flowchart of another method for moving a vertex of the virtual surface which penetrates the volume of the vial tool to the surface of the virtual tool.

FIG. 11B illustrates another embodiment of a method of the present invention for moving a vertex of the virtual surface which penetrates the volume of the virtual tool to the surface of the virtual tool. In this embodiment, the surface interaction process moves the penetrating vertex to the surface of the virtual tool by moving the penetrating vertex in the direction that the virtual tool is moving. In step 298, the surface interaction process sets the size of the step the vertex may move (currentStepSize) equal to the distance that the virtual tool moved during the last step the virtual tool took. Next, the surface interaction process determines a unit vector ($tool_{direction}$) pointing in the direction that the virtual tool is moving (step 300). In step 302, the surface interaction process determines a temporary position for the penetrating vertex to be moved to according to equation (15) below in which $V_{iposition}$ represents the current position of the penetrating vertex.

$$P_{temp} = V_{iposition} + \text{currentStepSize} \cdot tool_{direction} \qquad (15)$$

In equation (15) the surface interaction process is moving the position of the penetrating vertex $V_i$ in the direction that the virtual tool is moving by an amount equal to the current step size that the vertex is allowed to move.

Next, the surface interaction process moves the temporary position of the penetrating vertex back toward the virtual tool until the penetrating vertex is within the virtual tool and then sets the position of the penetrating vertex equal to the last temporary position in which the penetrating vertex did not penetrate the volume of the virtual tool. This process is accomplished by steps 304, 306 and 308. In step 304 the surface interaction process calculates a new temporary position for the penetrating vertex according to equation (16) below in which N is an integer. In one embodiment, N is equal to ten.

$$P_{newtemp} = P_{itemp} - (\text{currentStepSize}/N) \cdot tool_{direction} \qquad (16)$$

The surface interaction process then determines if $P_{newtemp}$ is within the volume of the virtual tool (step 306). If $P_{newtemp}$ is not within the volume of the virtual tool, the surface interaction process returns to step 304 and calculates another $P_{newtemp}$ which is even closer to the surface of the virtual tool.

If $P_{newtemp}$ is within the volume of the virtual tool, the surface interaction process calculates the position to which the penetrating vertex is to be moved according to equation (17) below.

$$V_{iposition} = P_{temp} + (\text{currentStepSize}/N) \cdot tool_{direction} \qquad (17)$$

The purpose of step 308 is to find the last temporary position of the vertex in which the vertex was still outside the volume of the virtual tool. Once the surface interaction process has calculated the position to which the penetrating vertex is to be moved, it proceeds to another operation to be performed on the vertex (step 310).

Referring again to FIG. 4, the surface interaction process has now completed the step of determining the deformation of the virtual surface in response to collision with the virtual tool (step 150). The surface interaction process next remeshes the virtual surface (step 152).

Figure 12A:
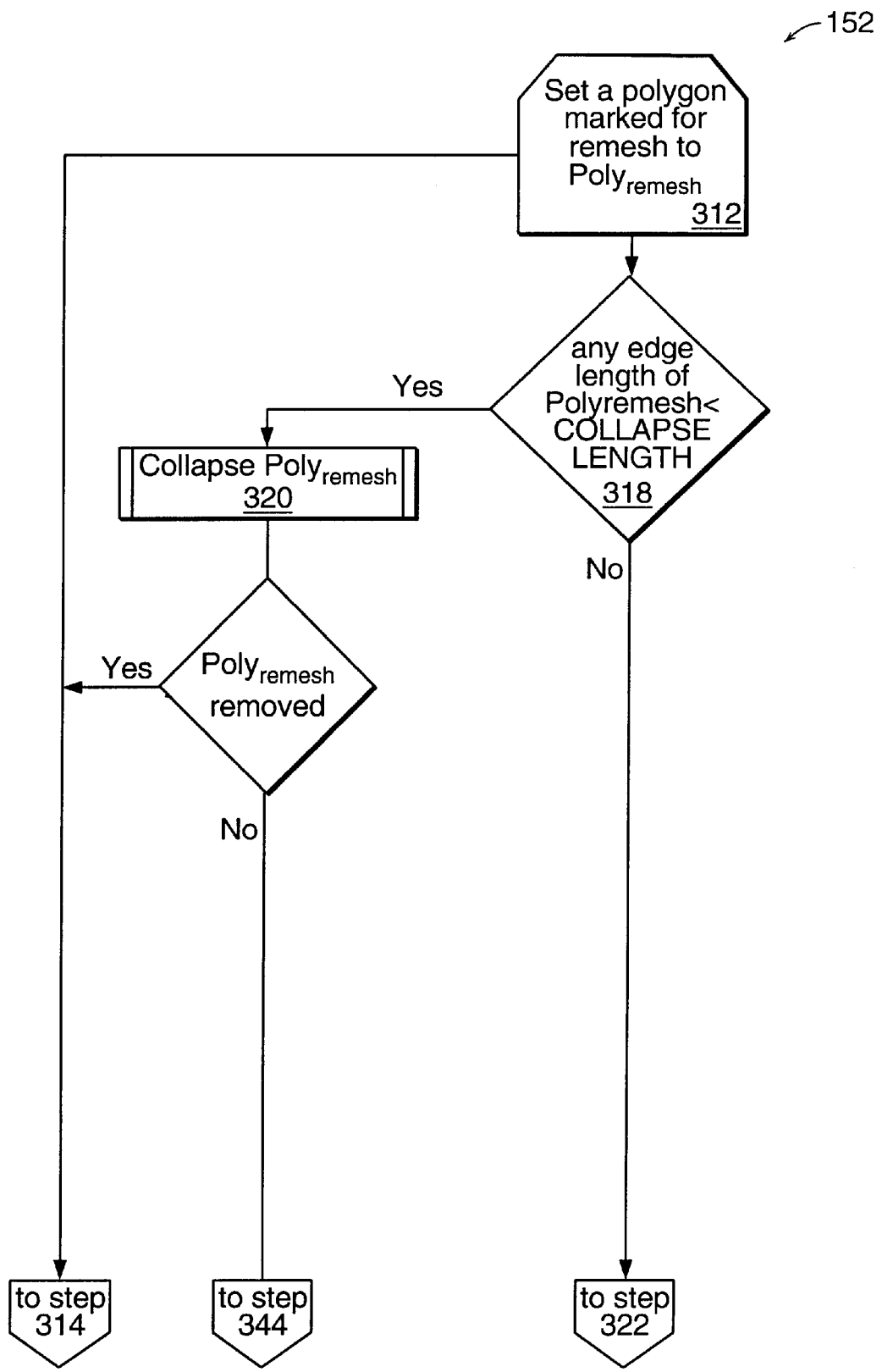
FIGS. 12A–12C are a flowchart of a method for remeshing the virtual surface.
Figure 12B:
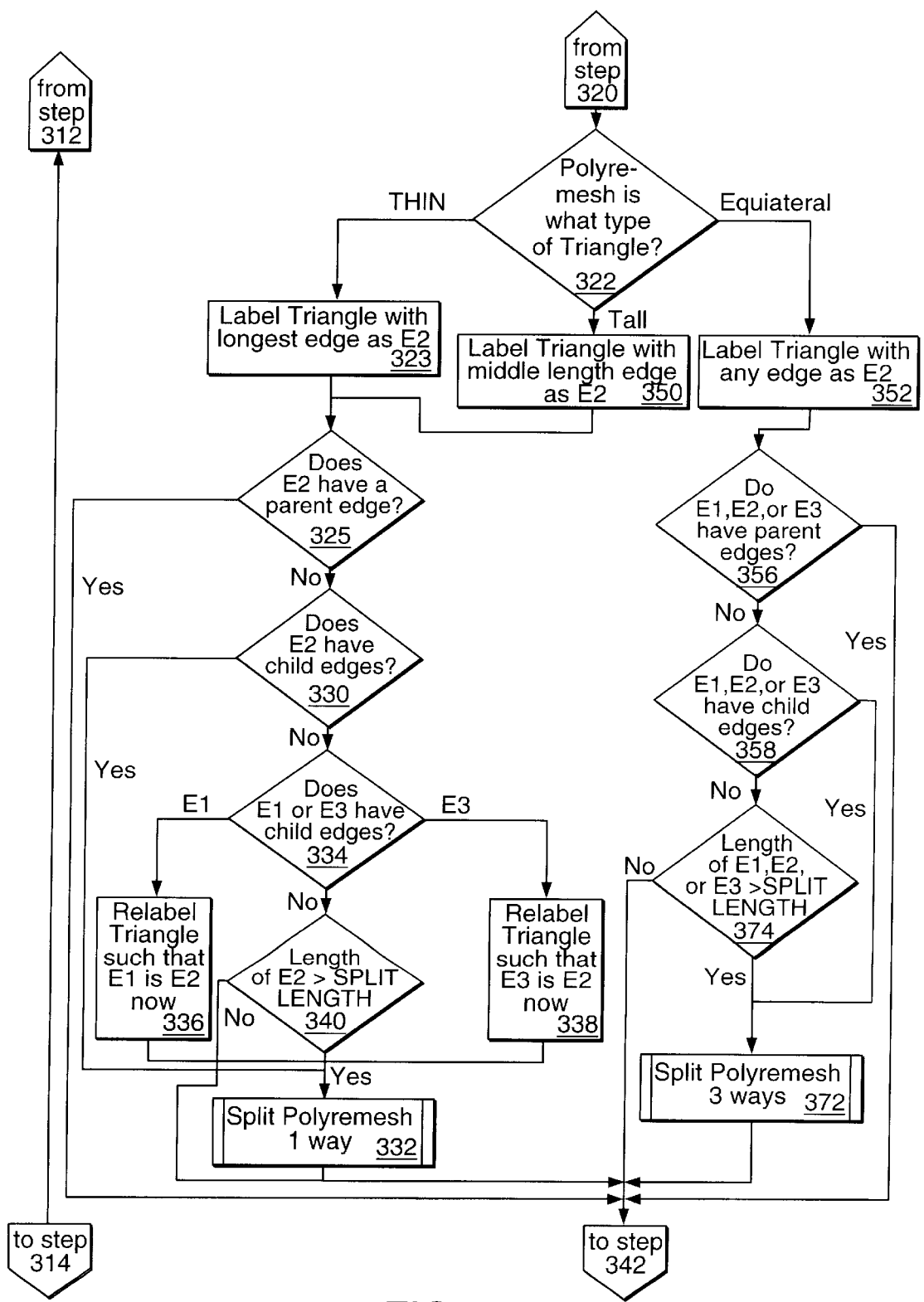
Figure 12C:
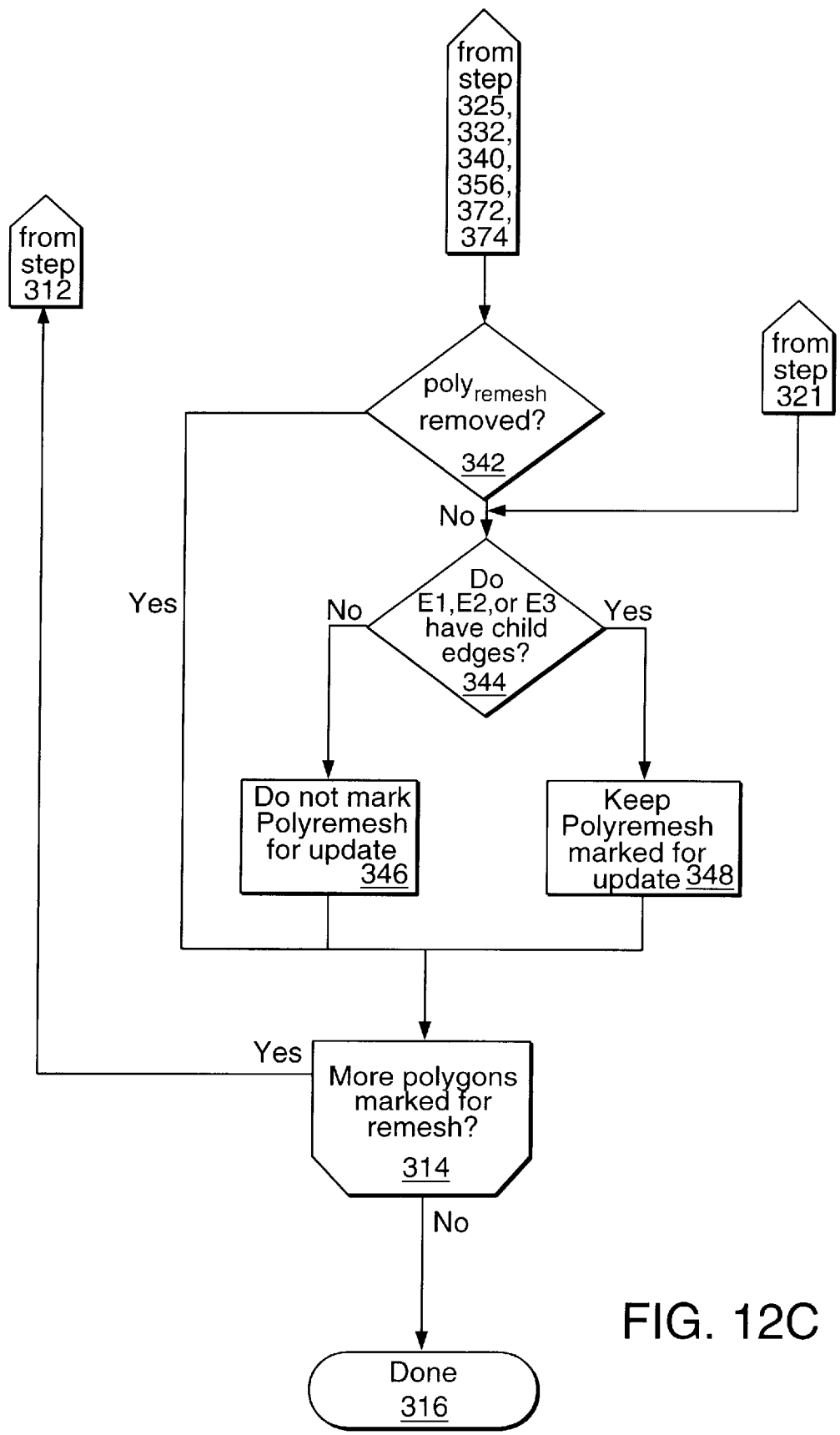

FIGS. 12A, 12B, and 12C illustrate one embodiment of a method of the present invention for remeshing the vital surface. The surface may be remeshed to optimize the spatial density of vertices. In the embodiment illustrated by the flowchart in FIGS. 12A, 12B, and 12C, the virtual surface is composed of a triangular mesh. In other embodiments, the virtual surface may be composed of polygons of other shapes. As described above in the discussion of FIG. 9, all of the triangles which are incident to a vertex that penetrated the virtual tool are marked for remeshing and in plastic deformation, triangles are added to the mesh. A triangle which is incident to a penetrating vertex is a triangle which has the penetrating vertex as one of its vertices. In step 312, the surface interaction process selects one of the triangles marked for remeshing and sets it to $Poly_{remesh}$. If there are no triangles marked for remeshing, the surface interaction process proceeds through step 314 to step 316 and is done remeshing the virtual surface. The surface interaction process repeats the steps illustrated by the flowchart in FIGS. 12A, 12B, and 12C until there are no triangles marked for remeshing.

If there is a triangle marked for remeshing ($Poly_{remesh}$), the surface interaction process determines if any of the edges of the triangle $Poly_{remesh}$ are shorter than a predetermined amount (COLLAPSE_LENGTH) (step 318). In one embodiment, this amount may be on the order of 0.25 mm. If any edge of $Poly_{remesh}$ is less than the predetermined amount, the triangle $Poly_{remesh}$ is collapsed (step 320) and a determination is made whether $Poly_{remesh}$ should be removed (step 321). For example, referring to FIG. 14G, vertex V1 would be moved to vertex V4 and combined as a single vertex to collapse triangles P1a and P1b in the event edge E4 had a length less than the predetermined collapse length. Edges E3 and E7 would be combined, as would edges E1 and E6. As will be discussed in greater detail below, these triangles would not be collapsed in the event any of edges E1, E3, E6, or E7 had any parent edges or child edges.

Figure 13A:
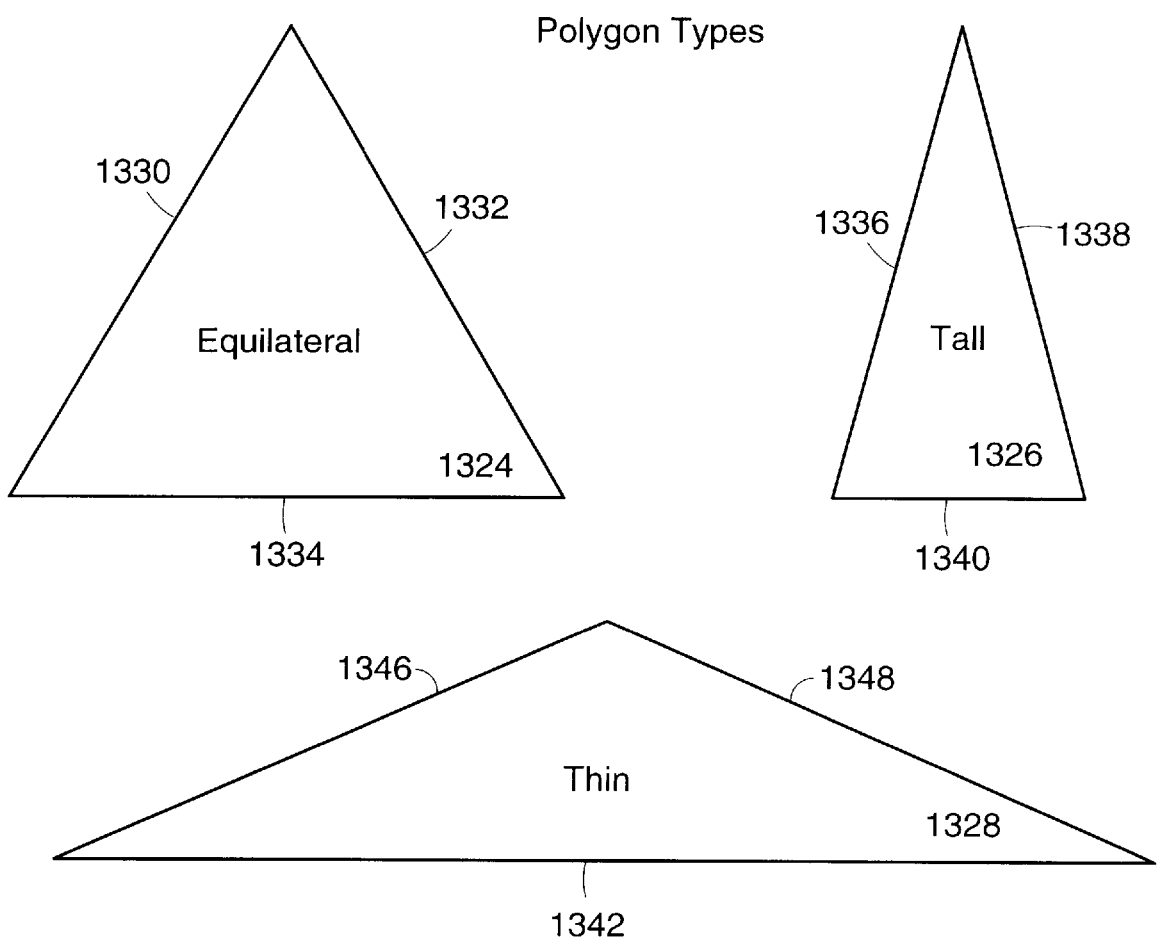
FIG. 13A is a schematic representation of three types of triangles.

If none of the edges of the triangle $Poly_{remesh}$ are shorter than the predetermined amount, the surface interaction process determines what type of triangle $Poly_{remesh}$ is (step 322). FIG. 13A illustrates the three types of triangles: equilateral 1324, tall 1326, and thin 1328. An equilateral triangle has three sides 1330, 1332, and 1334 which are approximately the same length. In one embodiment, the surface interaction process classifies $Poly_{remesh}$ as an equilateral triangle if all the sides 1330, 1332, and 1334 are within a certain range of each other. In another embodiment, the surface interaction process classifies $Poly_{remesh}$ as an equilateral triangle only if all the sides 1330, 1332, and 1334 are the same length. A tall triangle 1326 has two sides 1336 and 1338 which are longer than the third side 1340 by a predetermined factor. A thin triangle 1328 has one side 1342 which is longer than the other two sides 1346, 1348 by a predetermined factor.

FIG. 13B illustrates pseudocode for one embodiment of a method for classifying the triangle $Poly_{remesh}$. In the embodiment illustrated in FIG. 13B, the predetermined factor (GOLDEN_RATIO) is equal to 2. In other embodiments the predetermined factor may be equal to other values. In the pseudocode, squaredlength1 represents the square value of the length of the first side of the triangle $Poly_{remesh}$, squaredLength2 represents the square value of the length of the second side of the triangle $Poly_{remesh}$, and squaredLength3 represents the square value of the length of the third side of the triangle $Poly_{remesh}$.

If squaredLength2 divided by squaredLength1 is greater than the GOLDEN_RATIO and squaredLength3 divided by squaredLength1 is greater than GOLDEN_RATIO, $Poly_{remesh}$ is classified as a tall triangle with the first side being the short side of the triangle. If squaredLength1 divided by squaredLength2 is greater than the GOLDEN_RATIO and squaredLength3 divided by squaredLength2 is greater than GOLDEN_RATIO, $Poly_{remesh}$ is classified as a tall triangle with the second side being the short side of the triangle. If squaredLength1 divided by squaredLength3 is greater than the GOLDEN_RATIO and squaredLength2 divided by squaredLength3 is greater than GOLDEN_RATIO, $Poly_{remesh}$ is classified as a tall triangle with the third side being the short side of the triangle.

If squaredLength1 divided by squaredLength2 is greater than the GOLDEN_RATIO and squaredLength1 divided by squaredLength3 is greater than GOLDEN_RATIO, $Poly_{remesh}$ is classified as a thin triangle with the first side being the long side of the triangle. If squaredLength2 divided by squaredLength1 is greater than the GOLDEN_RATIO and squaredLength2 divided by squaredLength3 is greater than GOLDEN_RATIO, $Poly_{remesh}$ is classified as a thin triangle with the second side being the long side of the triangle. If squaredLength3 divided by squaredLength1 is greater than the GOLDEN_RATIO and squaredLength3 divided by squaredLength2 is greater than GOLDEN_RATIO, $Poly_{remesh}$ is classified as a thin triangle with the third side being the long side of the triangle. If $Poly_{remesh}$ does not satisfy any of the previous classifications, $Poly_{remesh}$ is classified as an equilateral triangle.

Figure 12D:
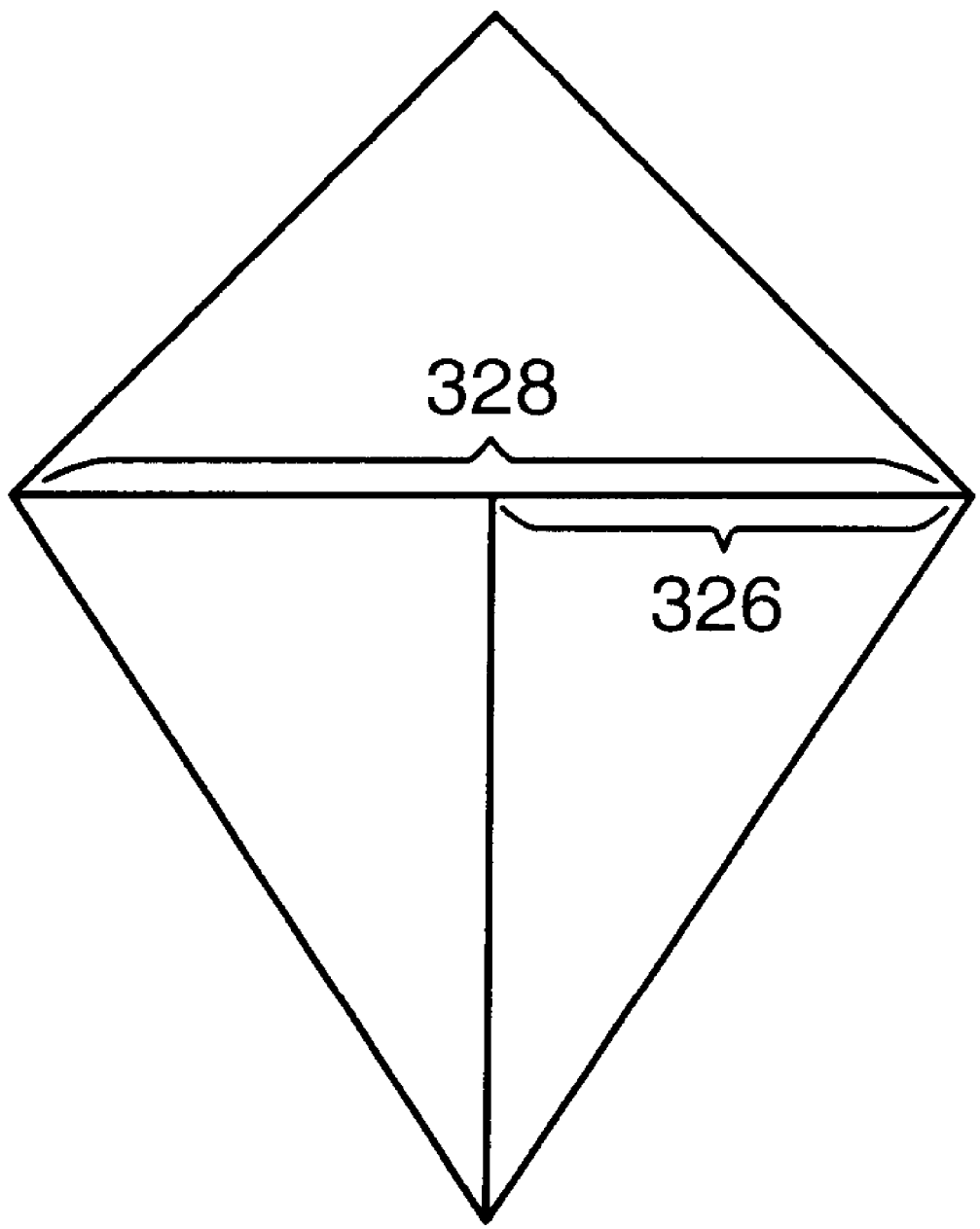
FIG. 12D is a schematic representation of parent and child edges of abutting triangles.

Referring again to FIG. 12B and to FIG. 12D, if the surface interaction process classifies the triangle as a thin triangle, the surface interaction process labels the longest edge of the triangle as E2 (step 323). Next the surface interaction process determines if the edge E2 has a parent edge (step 325). An edge has a parent edge if the edge forms part of a longer edge. For example, in FIG. 12D, the edge 326 forms part of the edge 328, therefore edge 328 is a parent edge to child edge 326. If the edge E2 does not have any parent edges, the surface interaction process determines if the edge E2 has any child edges (step 330). If the edge E2 has a child edge, the haptic interaction process splits the triangle $Poly_{remesh}$ one way into two triangles (step 332). A method for splitting the triangle $Poly_{remesh}$ one way into two triangles will be described in more detail below in the discussion of FIGS. 14A–14G.

If the edge E2 does not have any child edges, the surface interaction process determines if the other two edges (referred to as E1 and E3, respectively) of the triangle $Poly_{remesh}$ have child edges (step 334). If E1 has a child edge, the triangle $Poly_{remesh}$ is relabeled such that E1 is E2 and E2 is E1 (step 336) and the triangle $Poly_{remesh}$ is split one way into two triangles along the newly designated edge E2 (step 332). If E3 has a child edge, the triangle $Poly_{remesh}$ is relabeled such that E3 is E2 and E2 is E3 (step 338) and the triangle $Poly_{remesh}$ is split one way into two triangles along the newly designated edge E2 (step 332). If neither edge E1 or E2 has a child edge, the surface interaction process determines if the length of E2 is greater than a predetermined split length (step 340). The predetermined split length is the shortest length edge that the surface interaction process will split. In one embodiment the split length is 1.25 mm. By varying the split length and collapse length of the remeshing method at different areas of the virtual surface, different levels of detail of the virtual surface may be provided.

If the length of E2 is greater than the predetermined split length, the surface interaction process splits the triangle $Poly_{remesh}$ one way into two triangles along the edge E2 (step 332). If the length of E2 is less than the predetermined split length, the surface interaction process proceeds directly to step 342. The remaining steps of the flowchart of FIGS. 12A, 12B, and 12C will be discussed below after the discussion of one embodiment of a method for splitting the triangle $Poly_{remesh}$ one way into two triangles.

Figure 14B:
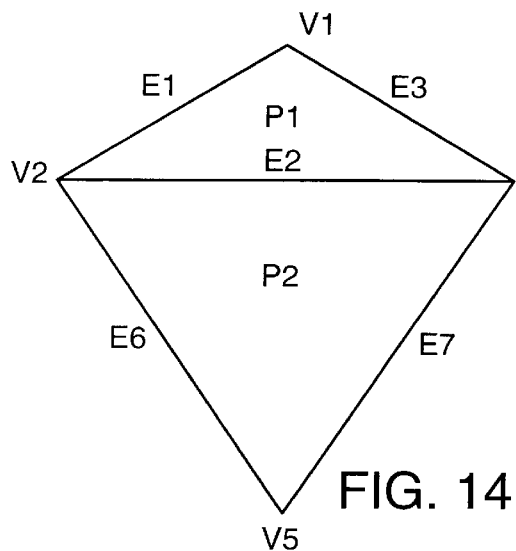
FIGS. 14B–14G are schematic representations of triangles being subdivided one way.
Figure 14C:
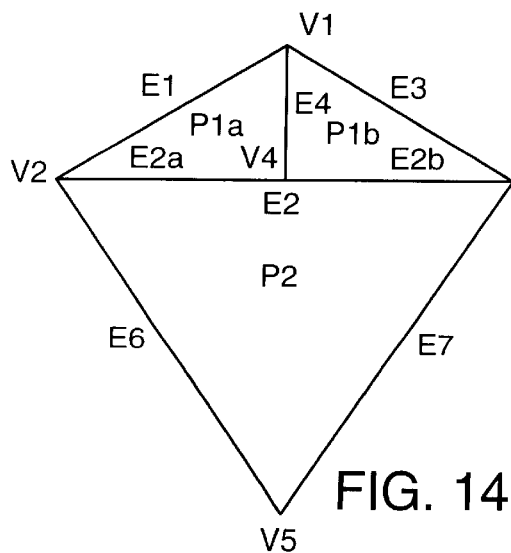
Figure 14D:
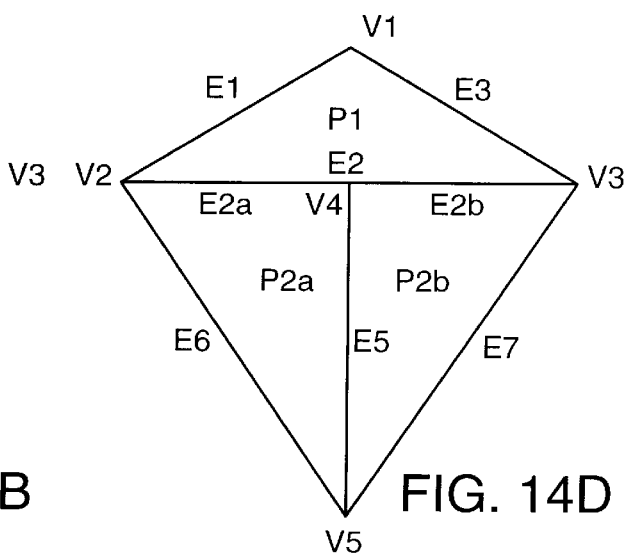
Figure 14E:
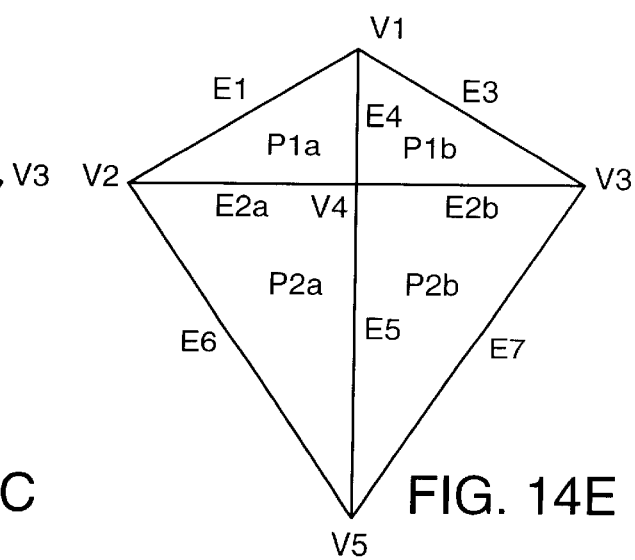
Figure 14F:
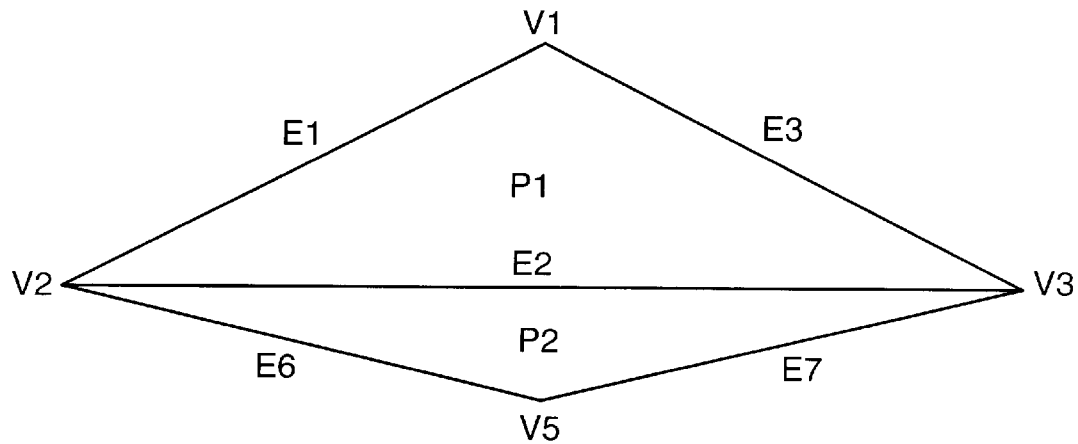
Figure 14G:
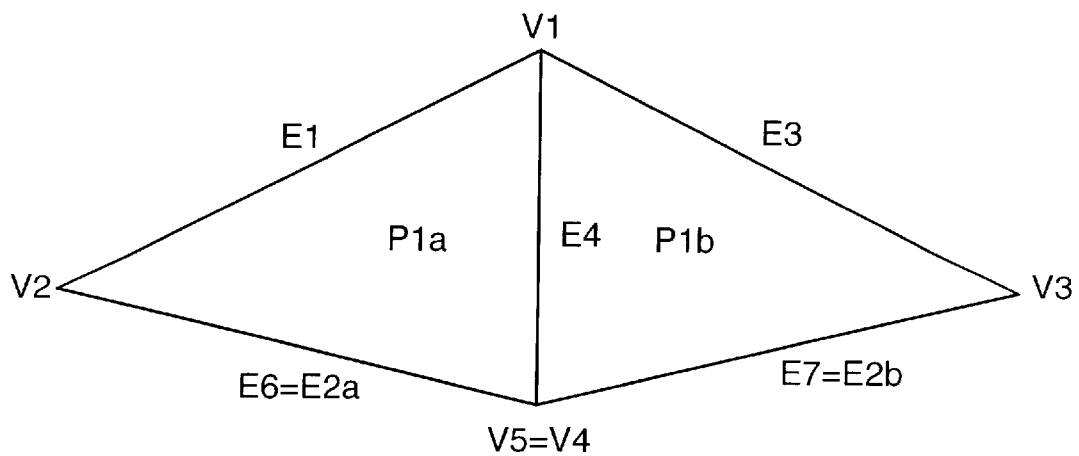

FIGS. 14A–G illustrate one embodiment of a method for splitting the triangle $Poly_{remesh}$ into two triangles. In the pseudocode of FIG. 14A and the illustrations of FIGS. 14B–G, P1 represents the triangle $Poly_{remesh}$ to be split. The surface interaction process first removes P1 from the list of triangles to be remeshed. Next, the surface interaction process determines a vertex V4 to be inserted along the edge E2 being split. If the edge E2 has no children, in one embodiment, V4 is placed along the edge E2 at a point halfway between the vertices V2 and V3. The surface interaction process next determines if the vertex V4 is sufficiently close to the vertex V5 such that the triangle P1 should not be split into two triangles, but rather the triangles P1 and P2 should be reshaped from the triangles P1 and P2 in FIG. 14F into the triangles P1a and P1b as shown in FIG. 14G. In one embodiment, the surface interaction process makes this determination by evaluating equations (18), (19), and (20) below. If each of the equations (18), (19), and (20) hold true, triangles P1 and P2 as shown in FIG. 14F will be reshaped into triangles P1a and P1b as shown in FIG. 14G.

$$|V4-V5| < \text{epsilon} \tag{18}$$

$$|V2-V5| < |V2-V3| \tag{19}$$

$$|V3-V5| < |V2-V3| \tag{20}$$

To reshape the triangles P1 and P2 shown in FIG. 14F into the triangles P1a and P1b shown in FIG. 14G, the vertex V4 is set equal to the vertex V5, new edge E2a is set equal to edge E6, new edge E2b is set equal to edge E7 and edge E2 is removed.

If the series of equations (18), (19), and (20) do not hold time, the surface interaction process will split the triangle P1 of FIG. 14B into the triangles P1a and P1b shown in FIG. 14C. The surface interaction process first marks the triangle P2 of FIG. 14B for remeshing. Next, the surface interaction process adds edge E2a defined by the vertices V2 and V4, adds edge E2b defined by the vertices V3 and V4, and adds edge E4 between the vertices V1 and V4.

If the edge E2 has children, the triangle P2 has previously been split, and, the case illustrated by FIG. 14D exists. The surface interaction process will split the triangle P1 shown in FIG. 14D into the triangles P1a and P1b shown in FIG. 14E. To do this, the surface interaction process removes the edge E2, adds the triangle P1a defined by the vertices V1, V2, and V4 and the edges E1, E2a, and E4, and adds the triangle P1b defined by the vertices V1, V4, V3 and the edges E4, E2b, and E3.

After the creation of the new triangles P1a and P1b as shown in FIGS. 14C, 14E or 14G, the surface interaction process determines if the new triangles P1a, P1b should be remeshed. If any of the edges of the newly created triangle P1a have children, triangle P1a is marked to be remeshed. Similarly, if any of the edges of the newly created triangle P1b have children, the triangle P1b is marked to be remeshed.

Referring again to FIG. 12B, once the triangle $Poly_{remesh}$ has been split one way into two triangles in step 332, the surface interaction process checks to see if the triangle $Poly_{remesh}$ was removed from the list of triangle to be remeshed during the splitting process. If the triangle $Poly_{remesh}$ was removed for the list of triangles to be remeshed, the surface interaction process proceeds to step 314 and determines if any other triangles are marked for remeshing. If the triangle $Poly_{remesh}$ has not been removed from the list of triangles to be remeshed, the surface interaction process determines if any of the edges of the triangle $Poly_{remesh}$, i.e. E1, E2, and E3 have child edges (step 344). If none of the edges of the triangle $Poly_{remesh}$ have child edges, the triangle $Poly_{remesh}$ is removed from the update list (step 346). If at least one of the edges of the triangle $Poly_{remesh}$ has a child, the triangle $Poly_{remesh}$ remains on the list of triangles marked for remeshing (step 348).

Referring again to FIG. 12B, if the triangle $Poly_{remesh}$ is classified as a tall triangle, the surface interaction process labels the middle length edge of the triangle as E2 (step 350). If two of the edges have identical lengths, one of these edges is labeled as E2. The surface interaction process then proceeds to step 325 and repeats the same series of steps described above in the discussion of the thin triangle.

Figure 15B:
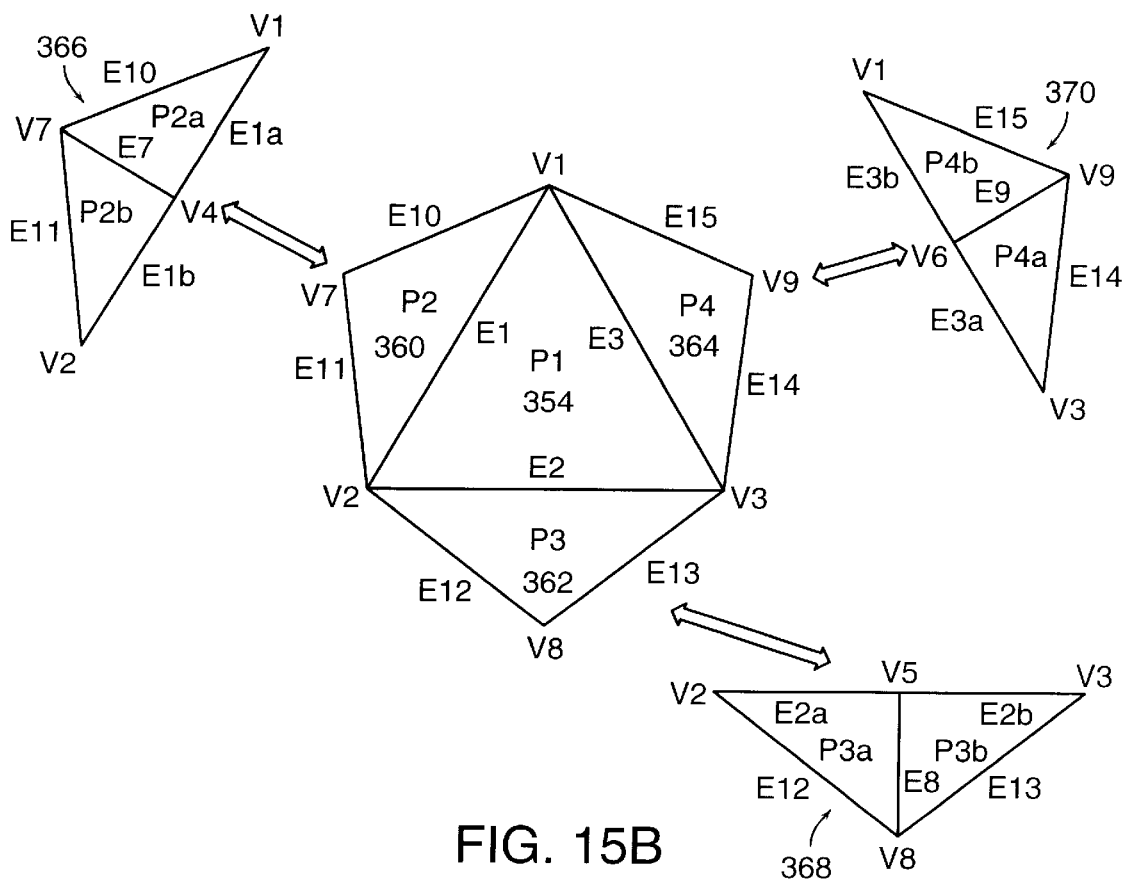
FIGS. 15B–15D are schematic representations of triangles being subdivided three ways.

If the triangle $Poly_{remesh}$ is classified as an equilateral triangle, the surface interaction process labels one of the edges as E2 (step 352). As the three edges are substantially the same length, if not exactly the same length, the surface interaction process may label any of the three edges as E2. The remaining two edges are labeled as E1 and E3 respectively. FIG. 15B shows an equilateral triangle P1 designated by reference number 354. The triangle P1 354 will be split into triangles P1a, P1b, P1c, and P1d shown in FIG. 15C.

After the surface interaction process has labeled the edges of the triangle $Poly_{remesh}$, the surface interaction process determines if any of the edges E1, E2, and E3 have parent edges (step 356). If at least one of the edges E1, E2, or E3 has a parent edge, the haptic interaction process proceeds to step 342 and executes steps 342, 344, 346, 348, and 314 as described above in the discussion of splitting the thin triangle. If none of the edges E1, E2, or E3 have parent edges, the surface interaction process determines if any of the edges E1, E2, or E3 have child edges (step 358). For example, referring to FIG. 15B, the triangle P1 354 is surrounded by triangles P2 360, P3 362 and P4 364. As shown none of the edges E1, E2, or E3 of the triangle 354 have child edges. However, if the triangle 366 comprising triangles P2a and P2b was located next to the triangle P1 354 rather than triangle P2 360, the edge E1 of the triangle P 354 would have child edges. Similarly, if the triangle 368 comprising the triangles P3a and P3b replaced the triangle P3 362, the edge E2 of the triangle P1 would have child edges, and if the triangle 370 comprising the triangles P4a and P4b replaced the triangle P4 364, the edge E3 of the triangle P1 would have child edges. If at least one of the edges E1, E2, E3 of the triangle P1 354 has child edges, the surface interaction process splits the triangle P1 three ways into four sub-triangles (step 372). An embodiment of a method for splitting the triangle P1 three ways into four subtriangles will be discussed in detail below in the discussion of FIGS. 15A, 15B, 15C, and 15D.

If none of the edges E1, E2, and E3 have child edges, the surface interaction process determines if any of the edges E1, E2, or E3 have a length greater than an predetermined amount (SPLIT_LENGTH) (step 374). If none of the edges E1, E2, or E3 have a length greater than the predetermined amount, the surface interaction process proceeds to step 342 and executes steps 342, 344, 346, 348, and 314 as described above in the discussion of splitting the thin triangle. If at least one of the edges E1, E2, or E3 has a length greater than the predetermined amount, the surface interaction process splits the triangle P1 three ways into four sub-triangles (step 372).

FIGS. 1A, 15B, 15C, and 15D illustrate one embodiment of a method for splitting the triangle P1 354 ($Poly_{remesh}$) three ways into four sub-triangles. In the pseudocode of FIG. 15A and the illustrations of FIGS. 15B and 15C, P1 represents the triangle $Poly_{remesh}$ to be split into the sub-triangles P1a, P1b, P1c and P1d.

Figure 15C:
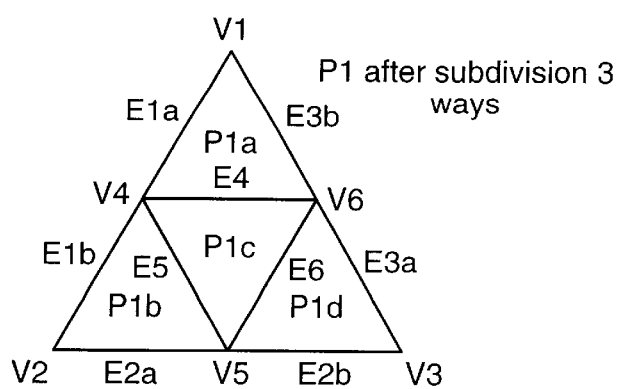
Figure 15D:
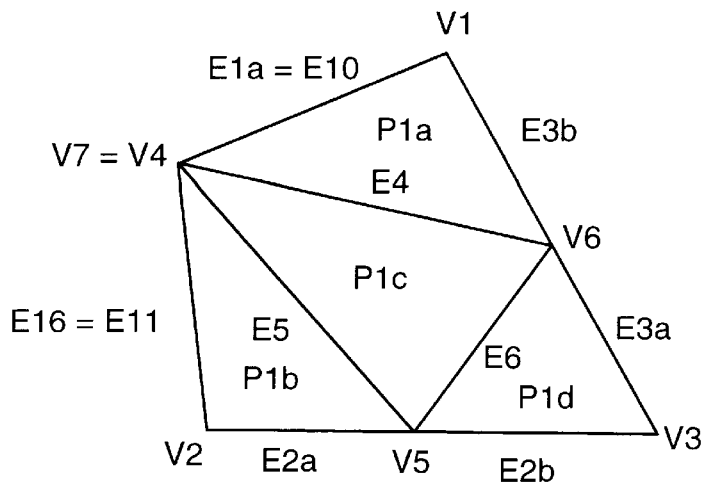

The surface interaction process first removes P1 from the list of triangles to be remeshed. Next if the edge E1 has no children, the surface interaction process determines a vertex V4 to be inserted along the edge E1 being split. If the edge E1 has no children, in one embodiment, V4 is placed along the edge E1 at a point halfway between the vertices V1 and V2. The surface interaction process next determines if the vertex V4 is sufficiently close to the vertex V7 such that the triangle P1 should not be split into four equilateral triangles as shown in FIG. 15C, but rather the triangles P1 and P2 should be reshaped from the triangles P1 and P2 in FIG. 15B into the triangles P1a, P1b, P1c and P1d as shown in FIG. 15D. In one embodiment, the surface interaction process makes this determination by evaluating equations (21), (22), and (23) below. If each of the equations (21), (22), and (23) hold true, triangles P1 and P2 as shown in FIG. 15B will be reshaped into triangles P1a, P1b, P1c and P1d as shown in FIG. 15D.

$$|V4-V7|<\text{epsilon} \tag{21}$$

$$|V1-V7|<|V1-V2| \tag{22}$$

$$|V2-V7|<|V1-V2| \tag{23}$$

To reshape the triangles P1 and P2 shown in FIG. 15B into the triangles P1a, P1b, P1c and P1d as shown in FIG. 15D, the vertex V4 is set equal to the vertex V7, new edge E1*a* is set equal to edge E10, new edge E1*b* is set equal to edge E11 and triangle P2 is removed. The surface interaction process also adds edge E4 defined by the vertices V4 and V6, the edge E5 defined by the vertices V4 and V5, the edge E6 defined by the vertices V5 and V6, the triangle P1*a* defined by the vertices V1, V4, V6 and the edges E1*a*, E4 and E3*b*, the triangle P1*b* defined by the vertices V4, V2, and V5 and the edges E1*b*, E2*a* and E5, and the triangle P1*c* defined by the vertices V4, V5, and V6 and the edges E5, E6 and E4, and the triangle P1*d* defined by the vertices V6, V5, and V3 and the edges E6, E2*b* and E3*a*.

If the series of equations (21), (22), and (23) do not hold true, the surface interaction process adds edges E1*a* and E1*b* shown in FIG. 15C. The surface interaction process also marks the triangle P2 of FIG. 15B for remeshing.

If the edge E1 has children, the triangle P2 has previously been split. The surface interaction process removes the edge E1.

The surface interaction process executes a similar series of steps for the edges E2 and E3 of the triangle P1 354. The details of these series of steps are outlined in the pseudocode of FIG. 15A. If none of the edges E1, E2, and E3 have child edges and none of the existing vertices V7, V8, and V9 are close enough to the proposed new vertices V4, V5, and V6 respectively such that the existing vertex should be used as the new vertex, the surface interaction process splits the triangle P1 354 of FIG. 15B three ways into four sub-triangles P1*a*, P1*b*, P1*c*, and P1*d* as shown in FIG. 15C. To split the triangle P1 354 of FIG. 15B three ways into four sub-triangles P1*a*, P1*b*, P1*c*, and P1*d* as shown in FIG. 15C, the surface interaction process adds edge E4 defined by the vertices V4 and V6, the edge E5 defined by the vertices V4 and V5, the edge E6 defined by the vertices V5 and V6, the triangle P1*a* defined by the vertices V1, V4, V6 and the edges E1*a*, E4, and E3*b*, the triangle P1*b* defined by the vertices V4, V2, and V5 and the edges E1*b*, E2*a*, and E5, and the triangle P1*c* defined by the vertices V4, V5, and V6 and the edges E5, E6, and E4, and the triangle P1*d* defined by the vertices V6, V5, and V3 and the edges E6, E2*b*, and E3*a* as described in the pseudocode of FIG. 15A and the diagram of FIG. 15C.

After the creation of the new triangles P1*a*, P1*b*, P1*c*, and P1*d* as shown in FIGS. 15C or 15D, the surface interaction process determines if the new triangles P1*a*, P1*b*, P1*c*, and P1*d* should be remeshed. If any of the edges of the newly created triangle P1*a* have children, triangle P1*a* is marked to be remeshed. Similarly, if any of the edges of the newly created triangles P1*b*, P1*c* and P1*d* have children, the triangle the respective triangle is marked to be remeshed.

Figure 16:
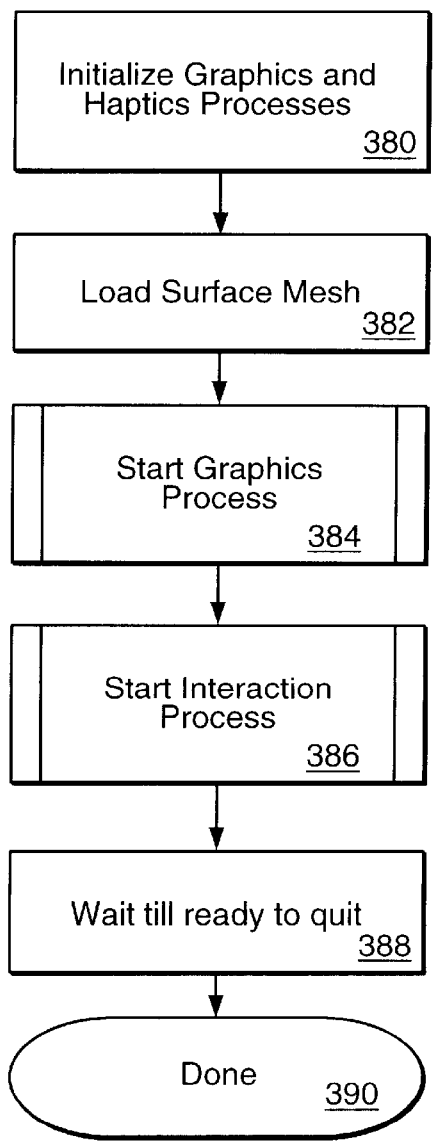
FIG. 16 is a flowchart of another embodiment of a method for generating a haptic interactive representation including a visco-elastically deformable surface.

Referring to FIG. 16, a flowchart shows the steps performed by one embodiment of the method of the present invention for generating a haptic interactive representation including a visco-elastically deformable surface and enabling a user to haptically interact with and deform the deformable surface. As described above, a visco-elastically deformable surface may return partially or entirely to its original shape after being deformed. In the embodiments described below, the virtual visco-elastically deformable surfaces are composed of a triangular mesh. In other embodiments, the virtual surfaces may be composed of other polygonal meshes or may be defined by algebraic equations. In embodiments in which the virtual surface is composed of a polygonal mesh, the vertices of the mesh are connected through edges which are modeled as springs and dashpots. For example, a vertex $V_1$ is connected to a vertex $V_2$ by a spring and a dashpot.

Also, in the embodiments described below, the user interacts with the virtual surfaces in the virtual environment volume referred to as a tool. The user may select any volume for the tool. The shape of the volume or tool determines how the virtual surface is deformed. The tool represents the user in the virtual environment. An example of a tool was described above in the discussion of FIG. 1D.

In the embodiment illustrated by the flow chart in FIG. 16, the steps are performed by application software running on a computer. Similar to the method for simulating plastically deformable surfaces described above in the discussion of FIG. 1B, the application software includes a graphics process and a haptic interaction process. These two processes run simultaneously on the computer. The graphics process generates a visual display of the VR environment to the user and updates the locations and states of the virtual objects on a display. The haptic interaction process may include processes similar to the haptic rendering process and the surface interaction process of FIGS. 1B and 1C. The haptic interaction process generates the haptic virtual environment and determines the forces to be applied to a user through a haptic interface device. The haptic interaction process also determines if the user collides with a deformable surface within the haptic interactive representation and determines how the surface should be deformed, if at all. An apparatus similar to the haptic interface system shown in FIG. 1C and described above may be used to implement the application illustrated by the flowchart in FIG. 16 and to enable a user to generate and interface with a deformable surface in a haptic virtual reality environment.

In step 380, the application software initializes the graphics process and the haptic interaction process. In step 382, the application software either creates a new virtual surface or loads a virtual surface for interaction with a user. The haptic interactive representation may include only one virtual surface or a plurality of virtual surfaces. The virtual surfaces may be combined to form a virtual object.

After the virtual surface composed of a triangular mesh is loaded, the application software initiates the graphics process (step 384). The graphics process will be discussed in more detail below in the discussion of FIG. 17. The application software also initiates the haptic interaction process (step 386). The haptic interaction process will be described in more detail below. The application software continues executing the graphics process and the haptic interaction process until the user selects to quit the application (step 388). Once the user selects to quit the application, the application software stops the graphics process and the haptic interaction process and exits (step 390).

Figure 17:
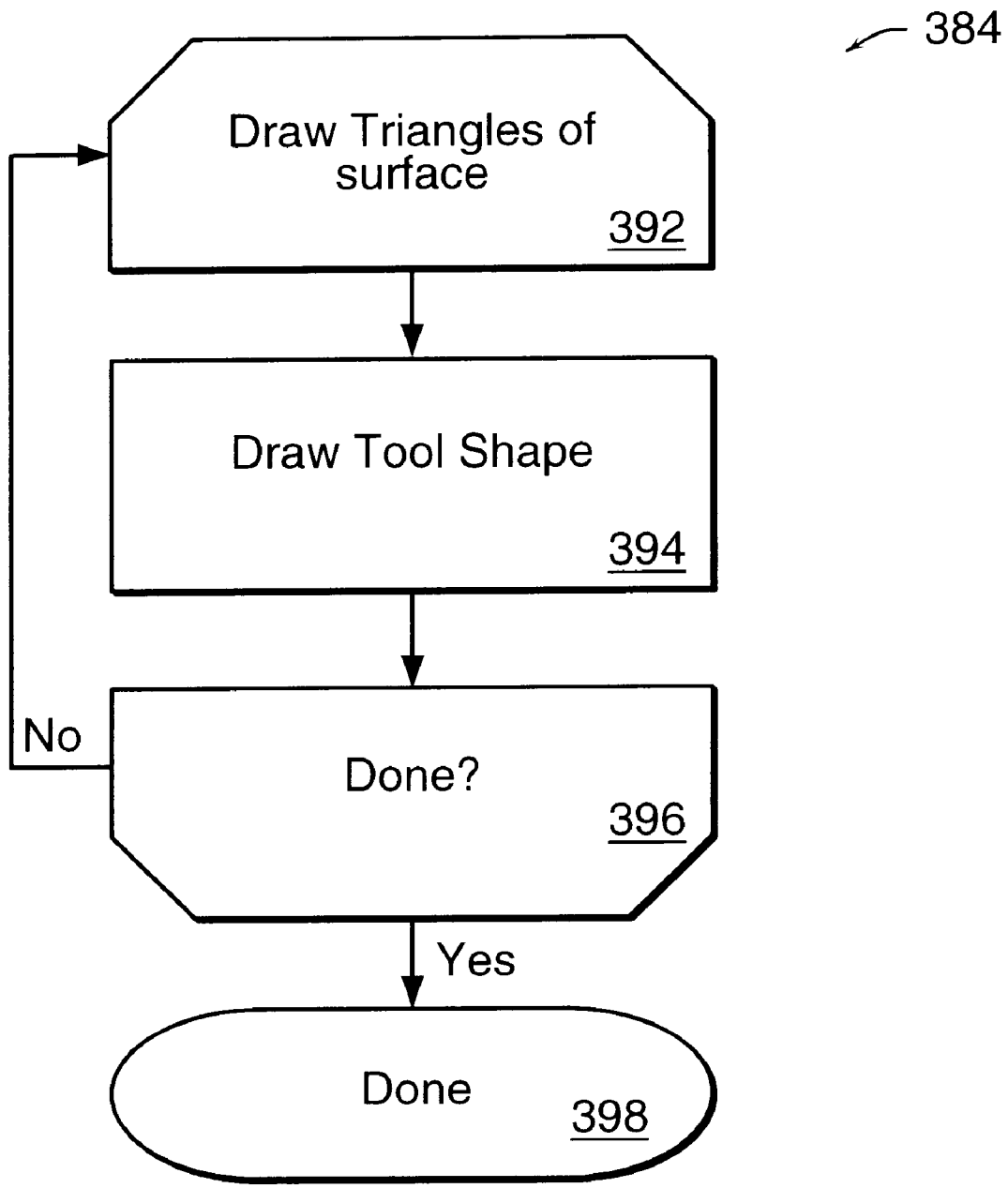
FIG. 17 is a flowchart of another embodiment of a graphics process for a visco-elastically deformable surface.

In more detail and referring to FIG. 17, a flowchart illustrates a more detailed sequence of steps performed by the graphics process 384 in one embodiment of the present invention to display to the user the interaction of the user with virtual surfaces in the haptic interactive representation. Similar to the method illustrated by the flowchart of FIG. 2 and described above, the graphics process draws a representation of the virtual surface (step 392) and a representation of the tool representing the user (step 394). In one embodiment in which the virtual surface is composed of a triangular mesh, the graphics process draws the triangles of the mesh. To draw the representations of the virtual surface and the virtual tool, the graphics process determines the current position, orientation, and shape of the virtual surface and the virtual tool. The graphics process displays these representations to a user on a display. In step 396 the graphics process determines if the user has selected to quit the application. The graphics process repeats steps 392, 394 and 396 until the application software stops the graphics process. The process then proceeds to step 398 and stops drawing representations of the virtual surface and the virtual tool (step 398). In one embodiment, the graphics process repeats steps 392, 394 and 396 at a rate of 30 Hz. In other embodiments, the graphics process may repeat these steps at faster or slower rates.

Figure 18A:
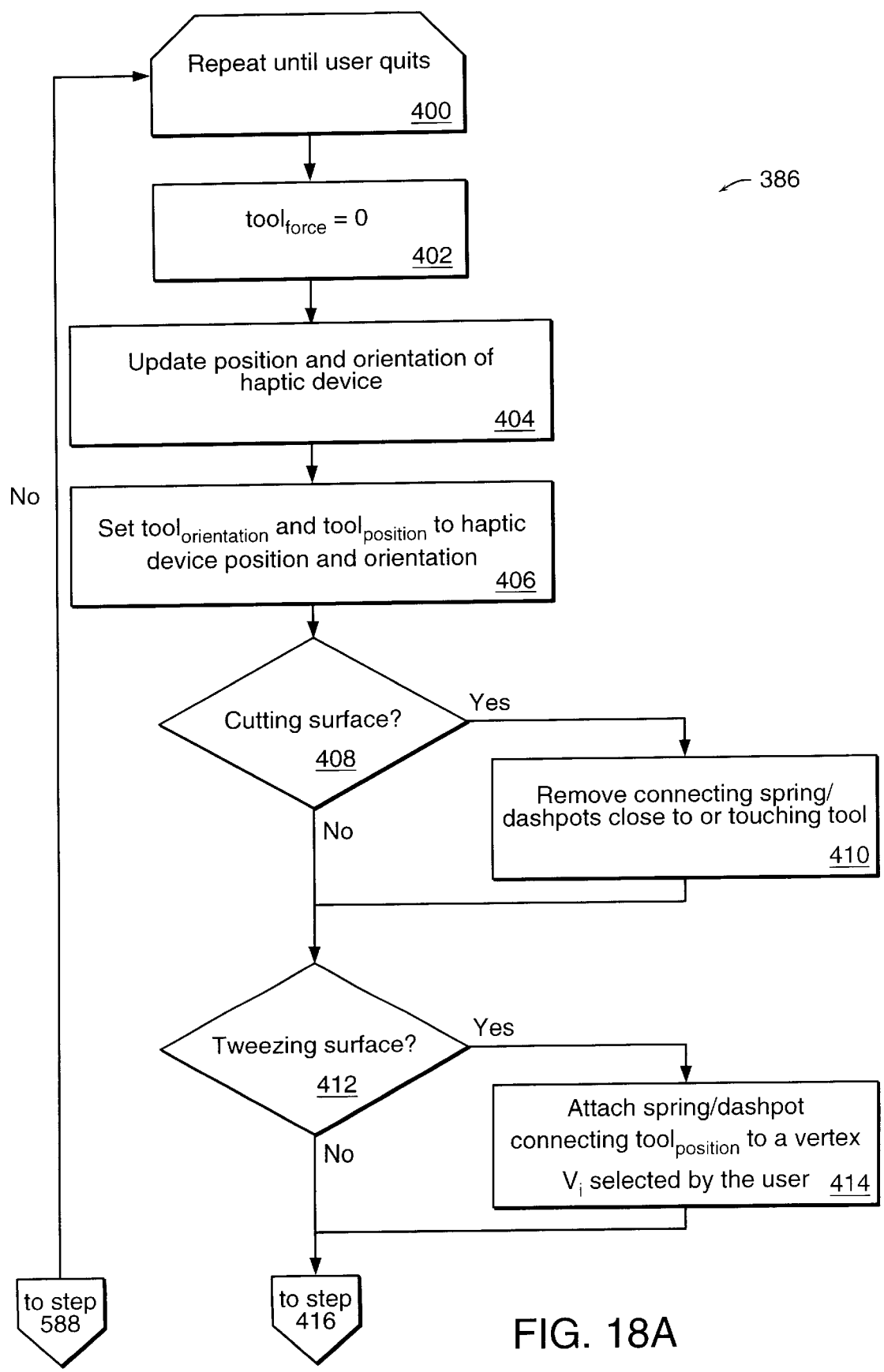
FIGS. 18A–18B are a flowchart of a haptic interaction process for a viscoelastically deformable surface.
Figure 18B:
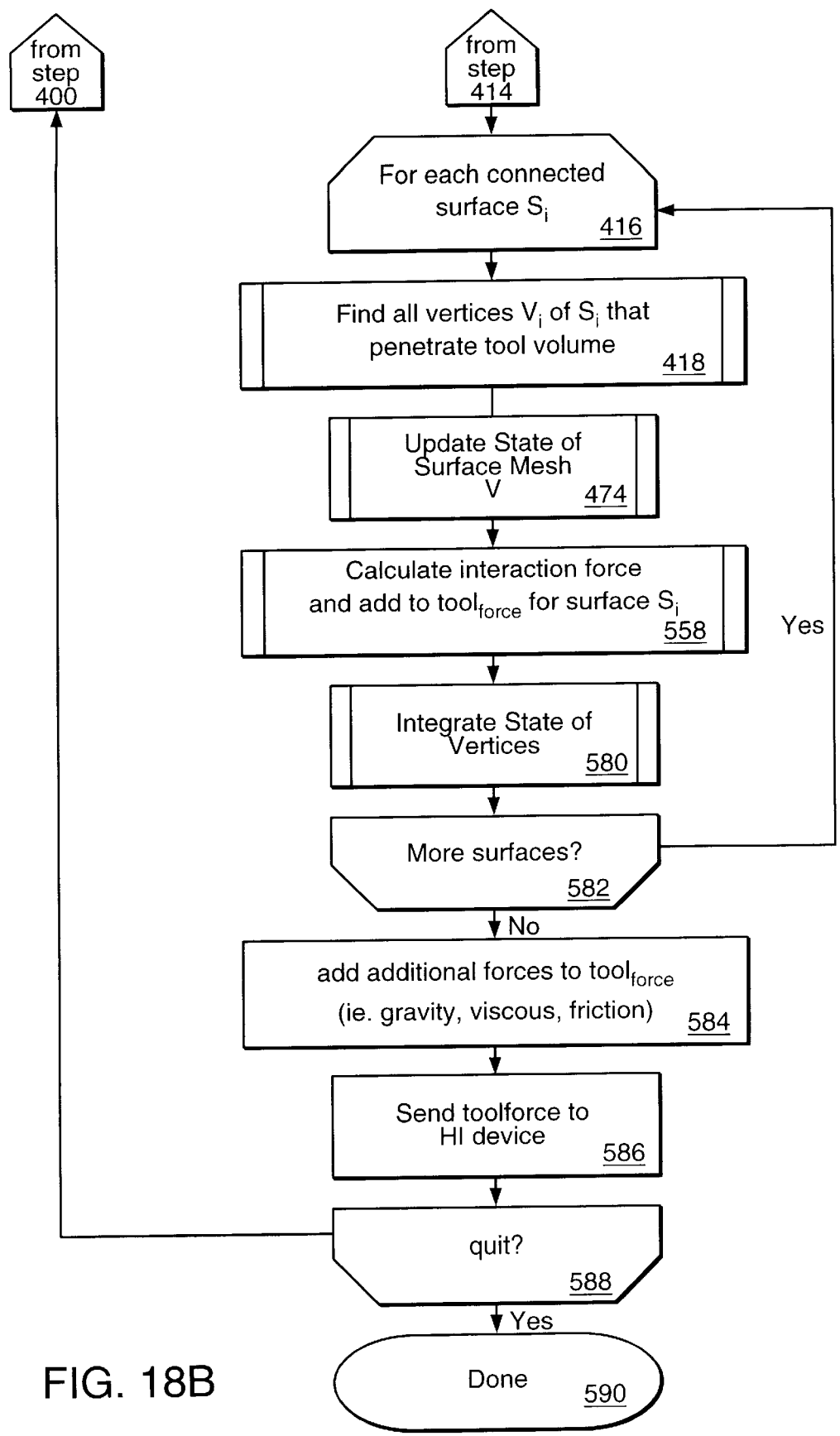

In more detail and referring to FIGS. 18A and 18B, a flowchart illustrates a more detailed sequence of steps performed by the haptic interaction process 386 in one embodiment of the present invention to determine the force to be applied to as the user through a haptic interface device and to deform the virtual surface in response to interactions with the virtual tool. For clarity, the embodiments discussed below only include one virtual surface. In other embodiments, the haptic interactive representation may include several virtual surfaces. The interaction process only executes if the user has not quit the application software (step 400). In step 402 the interaction process resets by setting the force the virtual tool is applying to the virtual surface equal to approximately zero Newtons. In step 404, the interaction process determines the current position and orientation of the haptic interface device and updates the position and orientation of the haptic interface. Next, the interaction process sets the position of the virtual tool ($tool_{position}$) and the orientation of the virtual tool ($tool_{orientation}$) equal to the position and orientation of the haptic interface (step 406).

In step 408, the interaction process determines if the user has selected to cut the virtual surface with the virtual tool. If the user is cutting the virtual surface, the interaction process removes the connecting springs and dashpots close to or touching the virtual tool (step 410). By removing the spring and dashpots, the connectors connecting the vertices of the triangular mesh are removed and the virtual surface is "cut."

The interaction process also determines if the user has selected to "tweeze" the virtual surface (step 412). As used herein, "tweeze" means to select a portion or point of the virtual surface and stretch the virtual surface in an outward direction. If the user selects to tweeze a point on the virtual surface, the interaction process adds a spring/dashpot which connects the virtual tool to the vertex ($V_i$) selected by the user (step 414). In other embodiments the user may select to tweeze a plurality of points on the virtual surface simultaneously.

As described above, in one embodiment, the virtual surface is composed of a triangular mesh. Each of the triangles in the mesh is considered to be a discrete surface ($S_i$) by the interaction process. The interaction process next determines each of the triangular surfaces $S_i$ which are still connected to the virtual surface, i.e. those surfaces which were not cut away by the user in steps 408 and 410. For each triangular surface $S_i$ which is connected, the interaction process proceeds through a series of steps to determine whether the triangular surface is affected by a collision with the virtual tool (repeat loop including steps 416, 418, 474, 558, 580 and 582).

Figure 19:
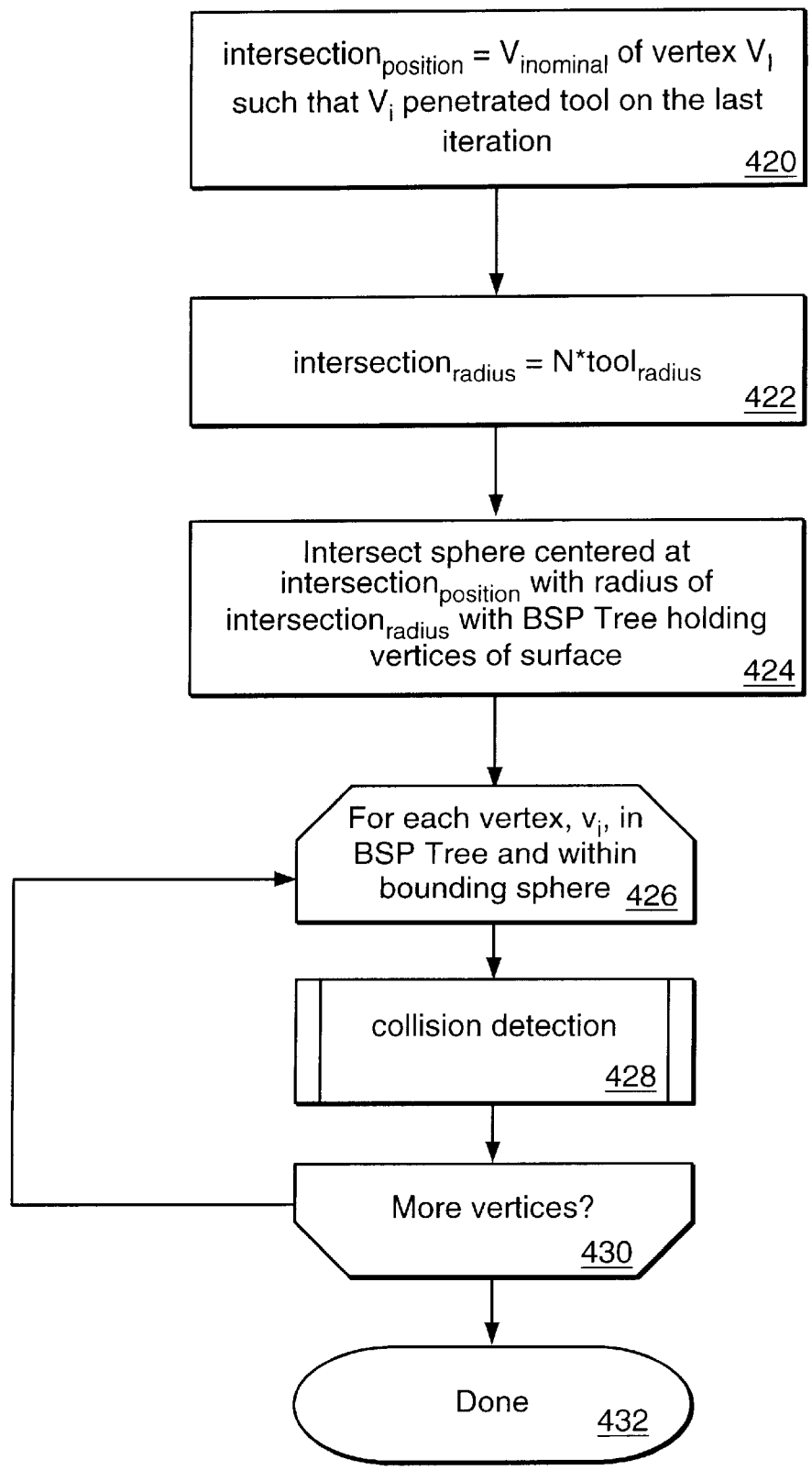
FIG. 19 is a flowchart of another embodiment of a method for determining all of the vertices of the virtual surface which penetrate the volume of the virtual tool.

In step 418, the interaction process determines all the vertices ($V_i$) of the triangular surface ($S_i$) that penetrates the volume of the virtual tool. FIG. 19 shows a sequence of steps performed by the interaction process in one embodiment of the present invention to find all of the vertices $V_i$ of a triangular surface $S_i$ which penetrate the volume of the virtual tool. In step 420, similar to the method illustrated by the flowchart of FIG. 10 for determining all of the vertices of the virtual surface which penetrate the virtual tool, in one embodiment, the interaction process creates a binary spatial partitioning (BSP) tree which holds the vertices of the triangular mesh forming the virtual surface. The interaction process also creates a bounding sphere around the virtual tool.

To determine the location of the bounding sphere, the interaction process determines a position ($intersection_{position}$) around which the sphere is centered. The interaction process sets the $intersection_{position}$ equal to the nominal position ($V_{inominal}$) of a vertex $V_i$ that penetrated the tool during the previous iteration of this process. The interaction process sets the radius of the bounding sphere ($intersection_{radius}$) equal to a constant (N) times the radius of the tool ($tool_{radius}$) (step 422). In one embodiment, $tool_{radius}$ may be equal to about 1 cm. The constant N is a predetermined value, for example, 2. In other embodiments, N may be equal to other values. If N is too small a number, some penetrating vertices may be missed; whereas, if N is too large a number, too large a domain will be searched and the process will slow down and be less efficient. In step 422, the interaction process intersects the bounding sphere with the BSP tree. The interaction process then checks each vertex $V_i$ which is in the BSP tree and within the bounding sphere to determine if the vertex collides with the virtual tool (repeat loop including steps 426, 428, and 430).

Figure 20:
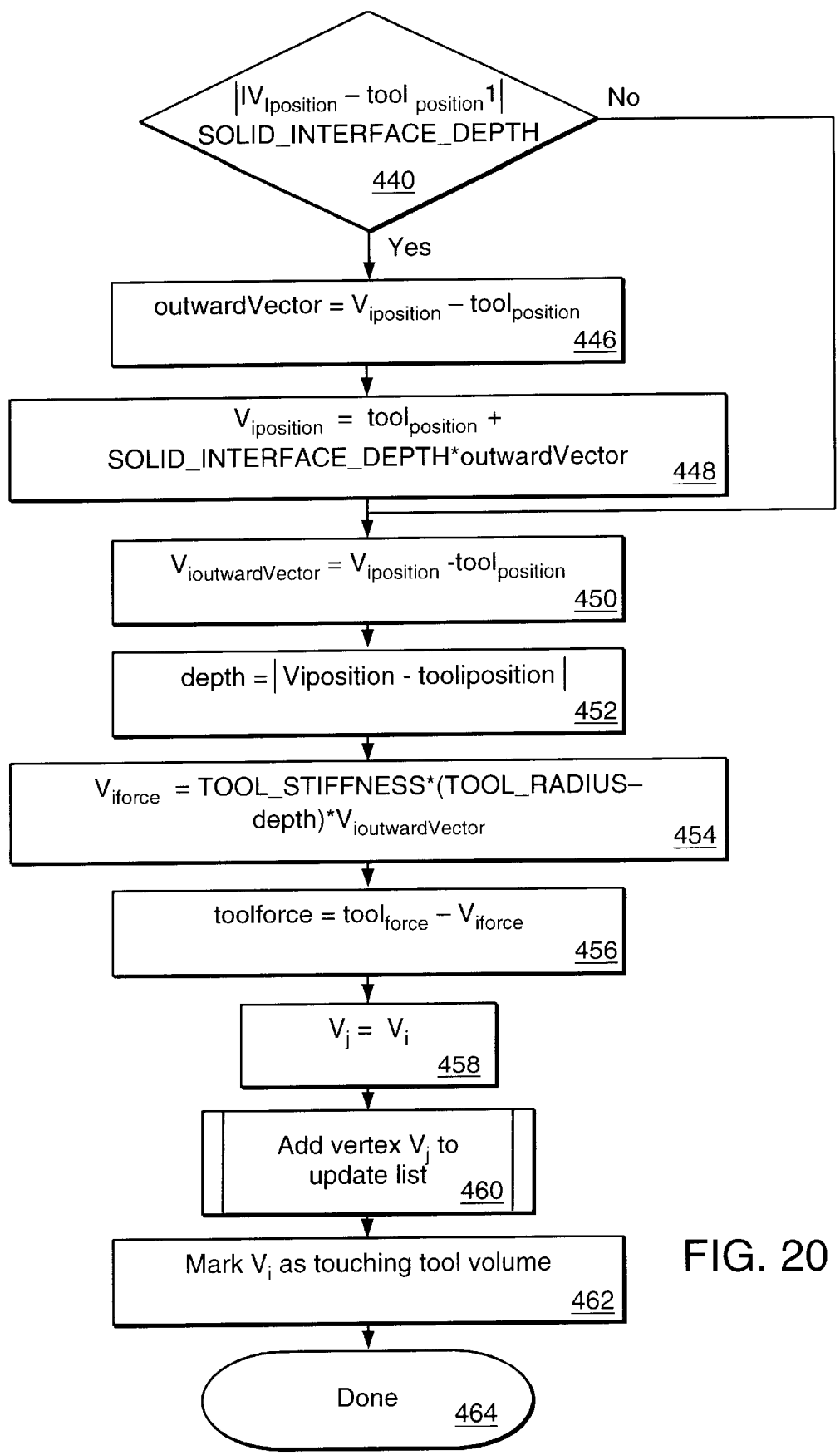
FIG. 20 is a flowchart of an embodiment of a method for determining if each vertex within a binary spatial partitioning (BSP) tree and within a bounding sphere around the virtual tool collides with the virtual tool.
Figure 21:
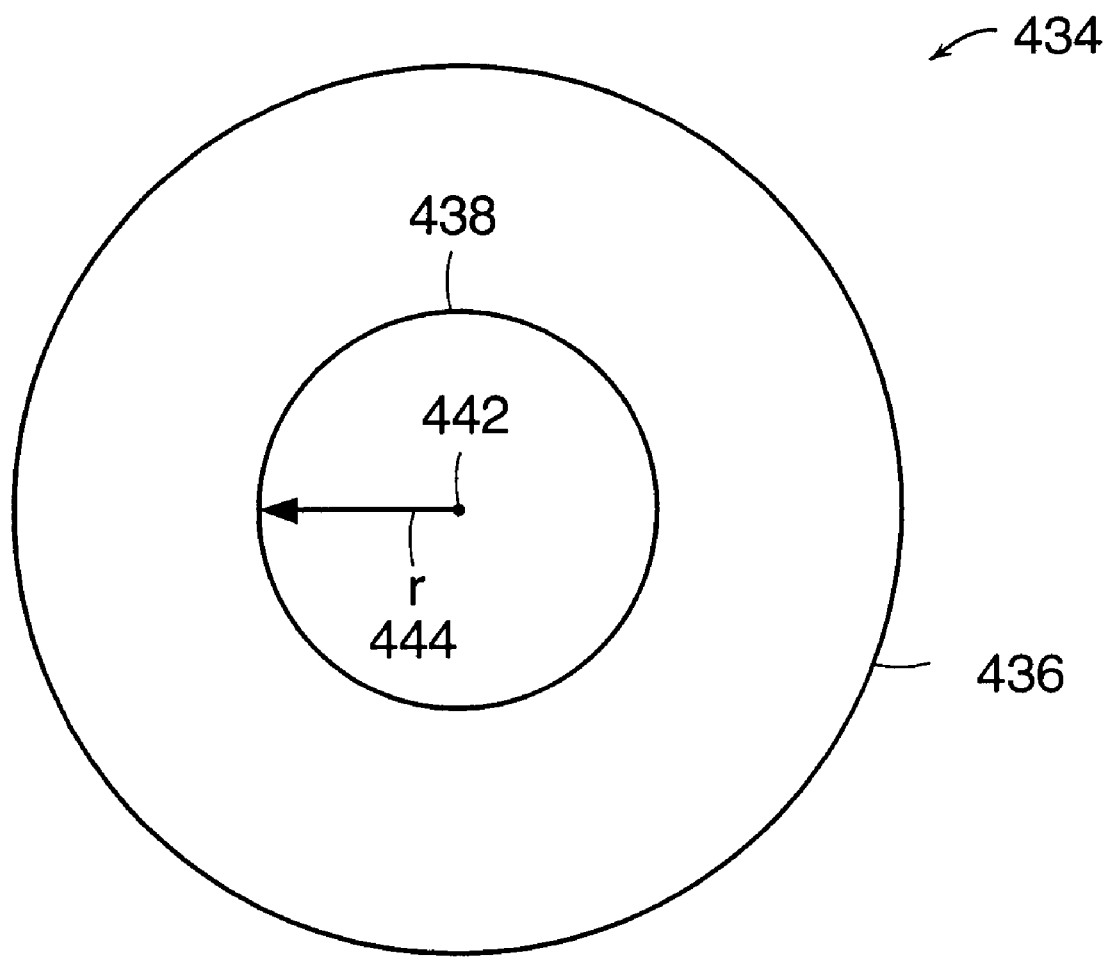
FIG. 21 is a schematic representation of the virtual tool modeled as a sphere with a penetrable outer core and a rigid inner core.

FIG. 20 illustrates one embodiment of the method of the present invention for determining if each vertex $V_i$ within the BSP tree and within the bounding sphere collides with the virtual tool. In the embodiment illustrated by the flowchart of FIG. 20, the tool is modeled as a sphere with an outer core which may be penetrated and an inner core which is rigid. FIG. 21 shows an example of a model of a tool 434 with a penetrable outer shell or core 436 and a rigid inner core 438. This model is desirable, since if the virtual tool were modeled as infinitely solid, instability problems may arise. Referring again to FIG. 20, in step 440, the interaction process determines if the vertex $V_i$ is within the inner core 438 of the virtual tool according to equation (24) below, in which $V_{iposition}$ represents the position of the vertex $V_i$, $tool_{position}$ represents the center 442 of the inner core 438, and SOLID_INTERFACE_DEPTH represents the radius, r, 444 of the inner core 438.

$$|V_{iposition} - tool_{position}| < \text{SOLID\_INTERFACE\_DEPTH} \quad (24)$$

If equation (24) above holds true, the vertex $V_i$ is within the inner core 438 and must be moved outside the inner core 438. In step 446, the interaction process calculates a unit vector (outwardVector) in a direction to move the vertex $V_i$ out of the inner core. In one embodiment, the unit vector outwardVector points toward the closest point on the outside of the inner core 438. In this embodiment the vector outwardVector is calculated according to equation (25) below.

$$\text{outwardVector} = V_{iposition} - tool_{position} \quad (25)$$

Next, in step 448, the interaction process calculates the position of the vertex $V_i$ is to be moved to according to equation (26) below.

$$V_{iposition} = tool_{position} + \text{SOLID\_INTERFACE\_DEPTH} * \text{outwardVector} \quad (26)$$

If equation (24) above, does not hold true, the vertex $V_i$ is not within the inner core 438 of the virtual tool, but may be within the outer core 436 of the virtual tool. The interaction process calculates a unit vector ($V_{ioutwardVector}$) in the direction of the vertex $V_i$ should be moved to be placed outside the outer core 436 of the virtual tool (step 450). The interaction process then calculates the distance or depth from the center of the virtual tool 434 to the vertex $V_i$ (step 452) as the magnitude of the difference between the position of the vertex ($V_{iposition}$) and the center 442 of the virtual tool (tool$_{position}$). The interaction process then calculates the force that the vertex $V_i$ is applying to the user according to equation (27) below, in which $V_{iforce}$ represents the force to be applied to the vertex by the tool, TOOL_STIFFNESS represents the stiffness value of the outer core 436, and TOOL_RADIUS represents the radius of the virtual tool (step 454).

$$V_{iforce} = \text{TOOL\_STIFFNESS (TOOL\_RADIUS-depth)} V_{ioutward\_Vector} \quad (27)$$

In one embodiment the value of TOOL_STIFFNESS is 0.6 Newtons. This method is applied to all vertices within the virtual tool so that all of these vertices contribute to the force calculation. The interaction process then determines the opposite reaction force by subtracting the force $V_{iforce}$ calculated in equation (27) from the force of the tool (step 456).

In step 458, the interaction process sets a vertex $V_j$ equal to the current position of the vertex $V_i$ and adds the vertex $V_j$ to the list of vertices to have its position updated (step 460). An embodiment of a method for adding the vertex $V_i$ to the list of vertices to be updated will be described in more detail below in the discussion of FIG. 27. In step 462 the interaction process marks the vertex $V_i$ as touching the volume of the virtual tool 434 and completes the collision detection process (step 464).

Figure 22:
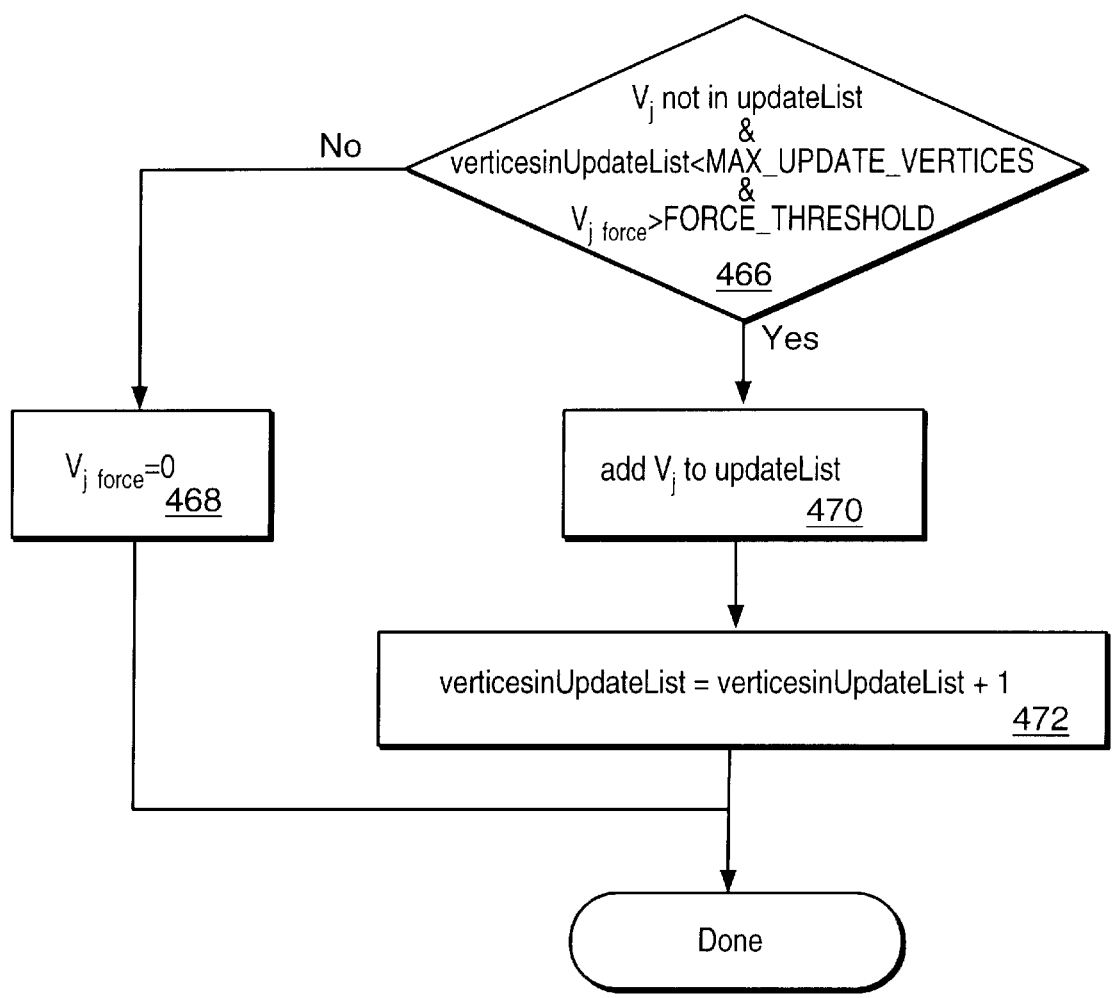
FIG. 22 is a flowchart of an embodiment of a method for adding a vertex to a list of vertices to be updated.

In more detail and referring to FIG. 22, a flow chart illustrates the steps performed by one embodiment of the method of the present invention for adding the vertex $V_i$ to the list of vertices to be updated. In step 466, the interaction process determines if the vertex $V_i$ should be added to the update list. In order for $V_i$ to be added to the update list three qualifications must be satisfied. First, $V_i$ must not already be on the update list. If $V_i$ is already on the update list, it does not need to be added. Second, the number of vertices in the update list must not exceed a predetermined maxim number of vertices. The purpose of limiting the number of vertices on the update list is to increase the speed of the application. Finally, the force exerted on the vertex by the virtual tool must exceed a force threshold. If these three qualifications are not met, $V_i$ is not added to the update list and the force being applied to the vertex $V_i$ by the virtual tool is set to zero (step 468). If these three qualifications are met, $V_i$ is added to the update list (step 470) and the number of vertices in the update list is incremented by one (step 472).

Once the interaction process has located all the vertices $V_i$ that penetrate the volume of the virtual tool, i.e., completed the steps of the flowchart illustrated in FIG. 19, the interaction process returns to the flowchart show in FIGS. 18A and 18B and updates the state of the triangular mesh composing the virtual surface (step 474).

Figure 23:
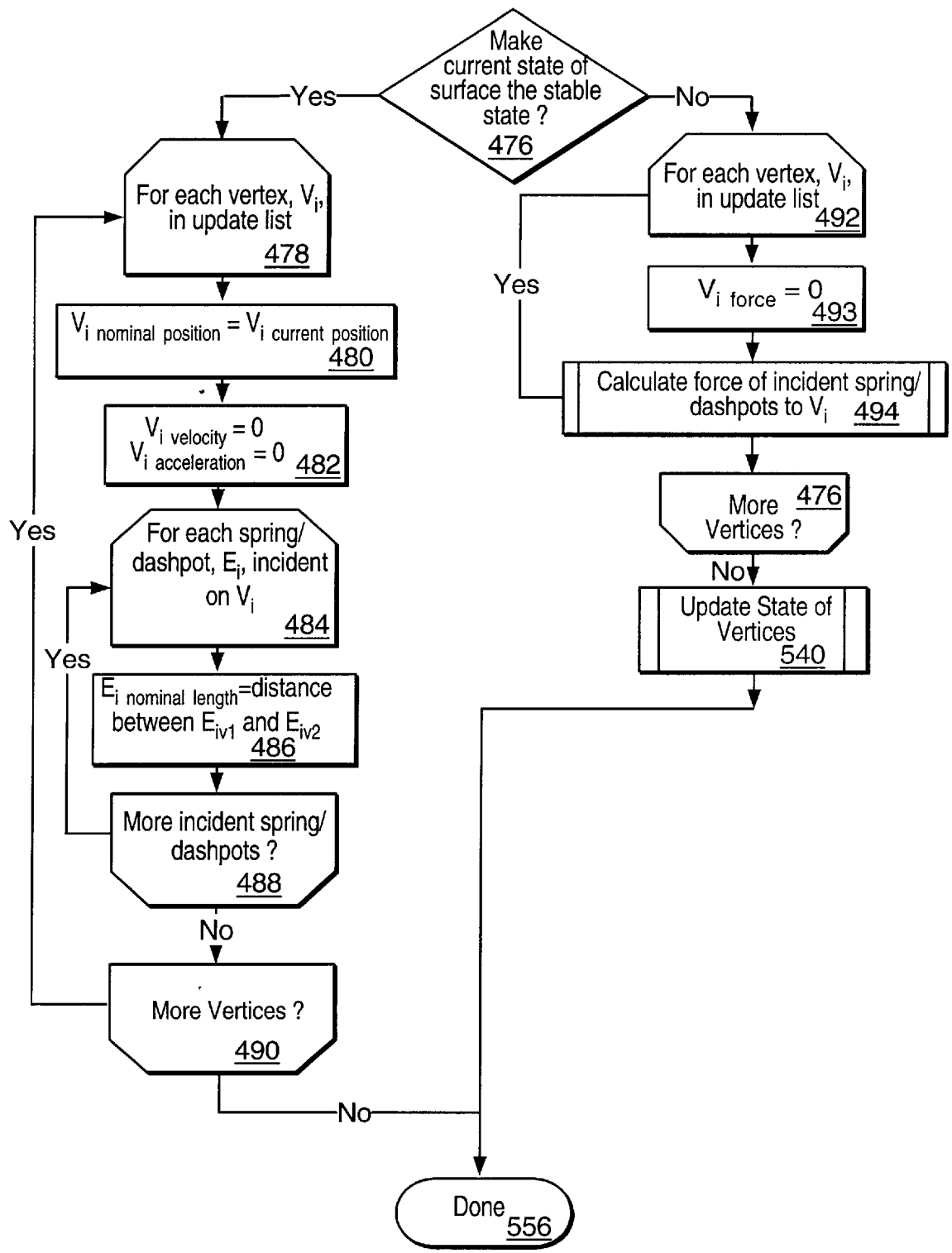
FIG. 23 is a flowchart of an embodiment of a method for updating the state of the virtual surface mesh.

FIG. 23 shows one embodiment of a method according to the present invention for updating the state of the virtual surface mesh. In step 476, the interaction process determines if the current state of the virtual surface should be made the stable state of the surface. For example, if the user has deformed the virtual surface, the interaction process determines if the deformed state should be made the stable state. In one embodiment, the user may select whether the deformed state should be made the stable state. If the deformed state is to be made the stable state, the virtual surface will not return to its original state before it was deformed and the interaction process proceeds to step 478 to make the current deformed state of the virtual surface into the stable state.

For each vertex $V_i$ in the update list, the interaction process updates the position of the vertex. The interaction process sets the nominal position of the vertex equal to the current position of the vertex (step 480). The interaction process also sets the velocity of the vertex and the acceleration of the vertex equal to zero (step 482). As described above, each of the vertices of the virtual surface are connected to the other vertices of the virtual surface. These connections are modeled by a spring/dashpot model. For each spring/dashpot ($E_i$) incident on the vertex $V_i$, the interaction process resets the nominal length of $E_i$ so that the resultant force on the vertex $V_i$ is equal to zero (repeat loop including steps 484, 486 and 488). The interaction process sets the nominal length of $E_i$ to the current distance between the vertices on each end of $E_i$ (step 486). The interaction process repeats steps 484, 486, 488 until all of the spring/dashpots $E_i$ incident on the vertex $V_i$ have had their nominal length adjusted. The interaction process then proceeds to step 490 and determines if there are more vertices on the update list. The interaction process repeats steps 478, 480, 482, 484, 486, 488, and 490 until all the vertices in the update list have been updated.

Referring again to step 476, if the current state of the virtual surface is not to be made the stable state, for each vertex $V_i$ in the update list, the interaction process calculates the forces of the spring/dashpots incident on the vertex $V_i$ (repeat loop including steps 492, 493, 494, 496).

Figure 24A:
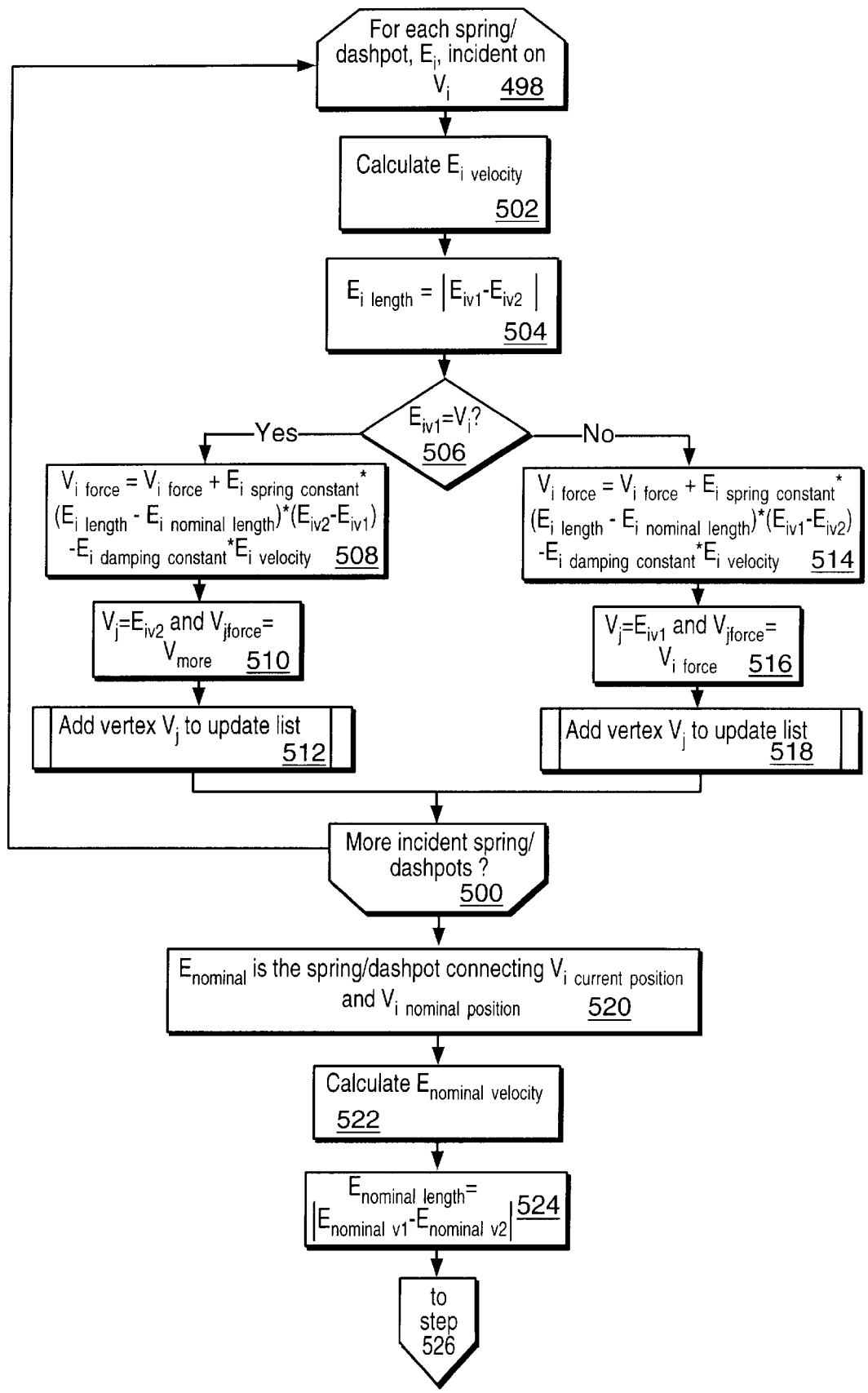
FIGS. 24A–24B are a flowchart of an embodiment of a method for calculating the forces on a vertex due to the spring/dashpots incident on the vertex.
Figure 24B:
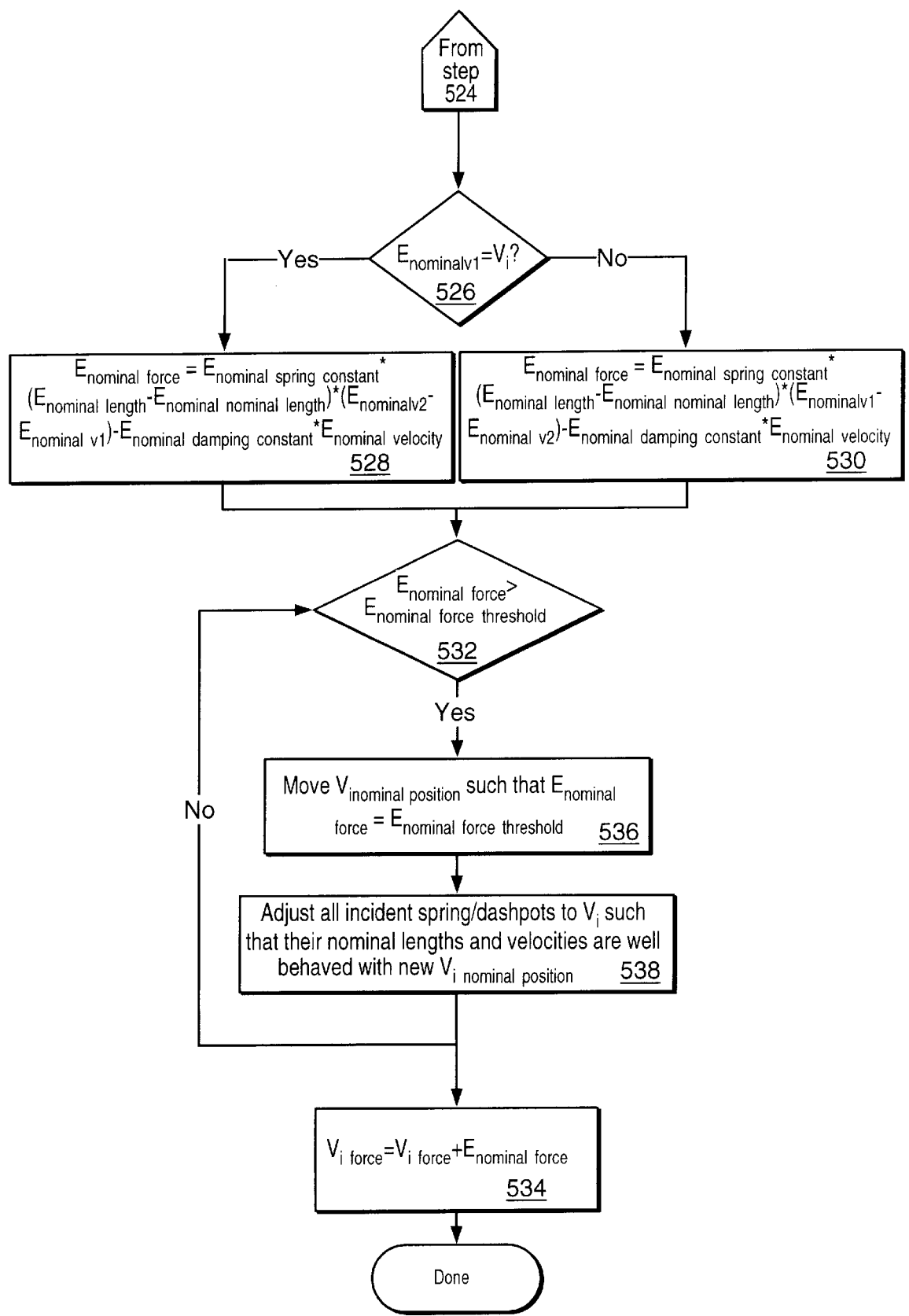

FIGS. 24A and 24B show one embodiment of a method of the present invention for calculating the forces on a vertex $V_i$ due to the spring/dashpots incident on the vertex $V_i$. For each spring/dashpot $E_i$ connected to the vertex $V_i$, the surface interaction process executes the repeat loop beginning with step 498 and ending with step 500. In step 502 the interaction process calculates the velocity of the spring/dashpot $E_i$. $E_{iv1}$ and $E_{iv2}$ are the vertices at each end of the spring/dashpot. The interaction process uses the velocities of the vertices $E_{iv1}$ and $E_{iv2}$ to calculate the velocity with which the vertices are moving away from or toward each other. This velocity is referred to herein as $E_{ivelocity}$. If $E_{ivelocity}$ is a positive value, the spring/dashpot $E_i$ is extending. The interaction process determines the current length of the spring/dashpot ($E_{ilength}$) by calculating the magnitude of the displacement between the two end vertices $E_{iv1}$ and $E_{iv2}$ of the spring/dashpot (step 504). Next the interaction process determines if the end vertex $E_{iv1}$ of the spring/dashpot $E_i$ is co-located with the vertex $V_i$ (step 506).

If these two points are co-located, the interaction process calculates the force on the vertex $V_i$ due to the spring/dashpot $E_i$ according to equation (28) below (step 508).

$$V_{iforce} = V_{iforce} + E_{ispringconstant} * (E_{ilength} - E_{inominallength})(E_{iv2} - E_{iv1}) - E_{idampingconstant} * E_{ivelocity} \quad (28)$$

Equation (28) sums the forces due to the spring model and due to the dashpot model. In equation (28), $E_{ispringconstant}$ represents the spring constant of the spring model and $E_{idampingconstant}$ represents the damping constant of the damping model. These values are determined by the stiffness of the virtual surface. In step 510, the interaction process sets a vertex $V_j$ equal to the end vertex $E_{iv2}$ and sets the force incident on the vertex $V_j$ ($V_{jforce}$) equal to a force equal in magnitude, but opposite in direction to the force on $V_i$. The interaction process then adds the vertex $V_j$ to the list of vertices to be updated. In one embodiment, the interaction process executes the series of steps illustrated in the flowchart of FIG. 22 and described above to add the vertex $V_j$ to the list of vertices to be updated (step 512).

If the vertex $V_i$ is not collocated with the end vertex $E_{iv1}$ of the spring/dashpot $E_i$, the interaction process calculates the force on the vertex $V_i$ due to the spring/dashpot $E_i$ according to equation (29) below (step 514).

$$V_{iforce} = V_{iforce} + E_{ispringconstant} * (E_{ilength} - E_{inominallength})(E_{iv1} - E_{iv2}) - E_{idampingconstant} * E_{ivelocity} \quad (29)$$

The interaction process sets a vertex $V_j$ equal to the end vertex $E_{iv1}$ and sets the force incident on the vertex $V_j$ ($V_{jforce}$) equal to a force equal in magnitude, but opposite in direction to the force on $V_i$ (step 516). The interaction process then adds the vertex $V_j$ to the list of vertices to be updated. In one embodiment, the interaction process executes the series of steps illustrated in the flowchart of FIG. 22 and described above to add the vertex $V_j$ to the list of vertices to be updated (step 518).

After the interaction process calculates the forces on the vertices $V_i$ and $V_j$ and, if necessary, add the vertex $V_j$ to the list of vertices to be updated, the interaction process determines if there are more spring/dashpots incident on the vertex $V_i$. If there are, the interaction process returns to step 506 and repeats the series of steps described above. If not, the interaction process proceeds to step 520.

In step 520, the interaction process determines the spring/dashpot connecting the current position of the vertex $V_i$ to the nominal position of $V_i$. This spring/dashpot is referred to the homespring/homedashpost ($E_{nominal}$). The purpose of the $E_{nominal}$ is to cause the vertex $V_i$ to return to its nominal (or "home") position when no outside forces due to other spring/dashpots or the user are executed on the vertex $V_i$. The interaction process calculates the velocity of $E_{nominal}$ (step 522) and the length of $E_{nominal}$ (step 524) using a method similar to the method described above for finding the velocity and length of $E_i$ (steps 502 and 504). Next, the interaction process determines if the end vertex ($E_{nominalv1}$) of the spring/dashpot $E_{nominal}$ is collocated with the vertex $V_i$ (step 526). If these two points are collocated, the interaction process calculates the force on the vertex $V_i$ due to the spring/dashpot $E_{nominal}$ according to equation 30 below (step 528).

$$E_{nominalforce} = E_{nominalspringconstant} * (E_{nominallength} - E_{nominalnominal\ length}) (E_{nominalv2} - E_{nominalv1}) - E_{nominaldampingconstant} * E_{nominalve\ locity} \quad (30)$$

Similar to equation (28) above, equation (30) sums the forces due to the spring model and dashpost model of the homespring/dashpot. In equation (30), $E_{nominalspringconstant}$ represents the spring constant of the homespring model and $E_{nominaldampingconstant}$ represents the damping constant of the homedashpot model. These values are determined by the stiffness of the virtual surface.

If the vertex $V_i$ is not collocated with the end vertex $E_{nominalv1}$, it is collocated with the end vertex $E_{nominalv2}$ and the interaction process calculates the force on the vertex $V_i$ due to the homespring/homedashpot $E_{nominal}$ according to equation (31) below (step 530).

$$E_{nominalforce} = E_{nominalspringconstant} * (E_{nominallength} - E_{nominalnominal\ length}) (E_{nominalv1} - E_{nominalv2}) - E_{nominaldampingconstant} * E_{nominalve\ locity} \quad (31)$$

After the interaction process calculates the force on the vertex $V_i$ due to the homespring/homedashpot $E_{nominal}$, the interaction process determines if the nominal force is greater than a predetermined threshold force (step 532). The purpose of this step is to determine if the virtual surface should be plastically deformed rather than visco-elastically deformed. If the threshold nominal force approaches infinity, the virtual surface will only be viscoelastically deformed. If the nominal force calculated in step 528 or 530 is less than the threshold nominal force, the virtual surface is viscoelastically deformed and the interaction process proceeds to step 534 and calculates the total force on the vertex $V_i$. The total force on the vertex $V_i$ is the sum of the forces due to the spring/dashpots $E_i$ incident on the vertex $V_i$ and the nominal force due to the spring/homedashpot $E_{nominal}$.

If the nominal force calculated in step 528 or 530 is greater than the threshold nominal force, the nominal position of the vertex $V_i$ is updated (step 536). The nominal position of the vertex $V_i$ is moved to a position such that the nominal force is approximately equal to the threshold nominal force (step 536). All of the spring/dashpots $E_i$ incident to $V_i$ are also adjusted such that their nominal lengths and velocities are well-behaved with the new nominal position of $V_i$ (step 538). The interaction process then calculates the total force on $V_i$ in step 534 as described above.

Figure 25:
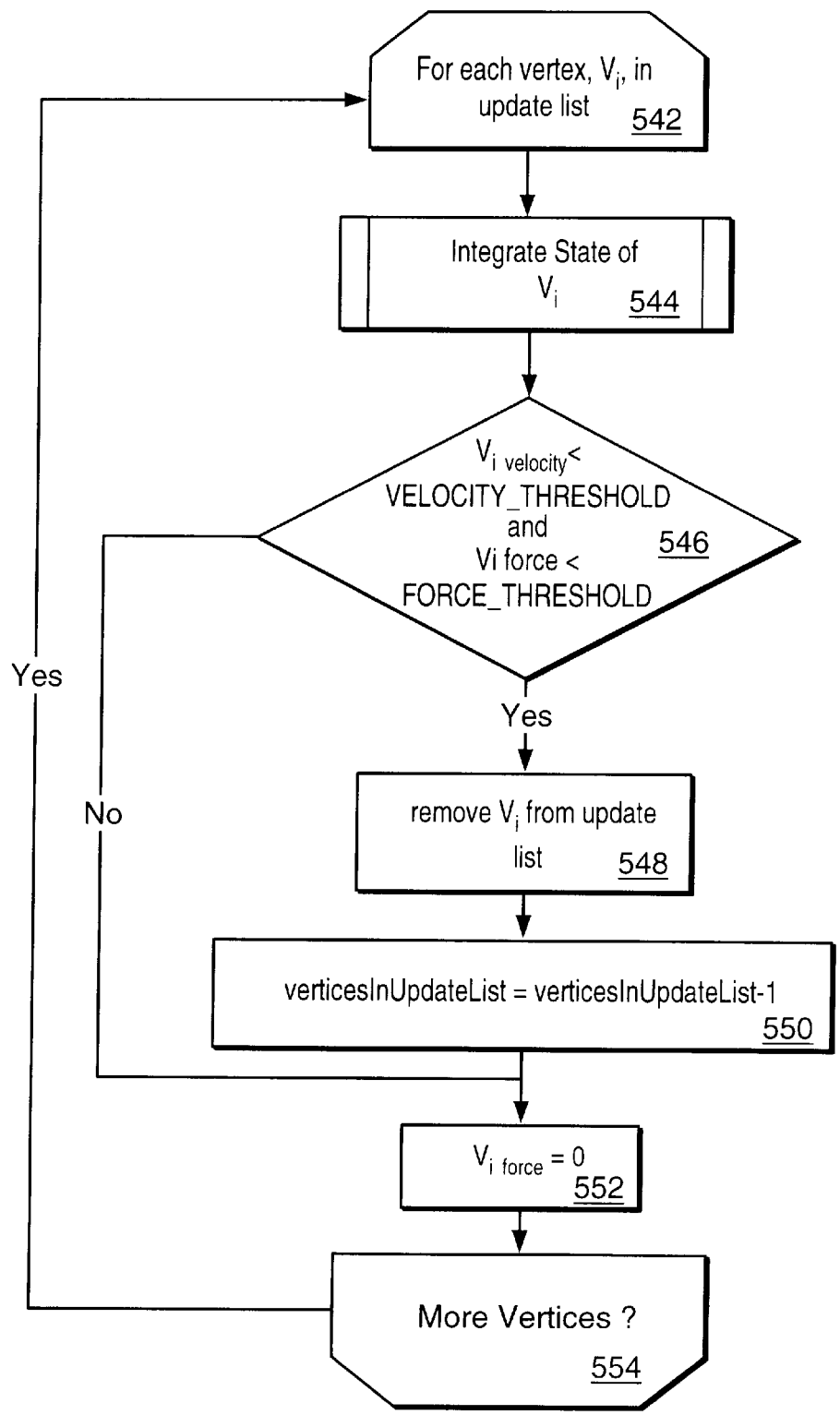
FIG. 25 is a flowchart of a method for updating the state of the vertices.

Referring again to FIG. 23, after the interaction process has calculated the total force on each of the vertices $V_i$, the interaction process updates the states of the vertices (step 540). FIG. 25 shows one embodiment of a method according to the invention for updating the state of the vertices $V_i$. The interaction process repeats steps 542, 544, 546, 548, 550, 552, and 554 for each vertex $V_i$ that is to be updated. First, in step 544, the interaction process integrates the state of $V_i$ according to the acceleration, velocity, and position equations (32), (33), and (34), as follows.

$$V_{iacceleration} = V_{iforce} / V_{imass} \quad (32)$$

$$V_{ivelocity} = V_{ivelocity} + (\text{delta } t)(V_{iacceleration}) \quad (33)$$

$$V_{iposition} = V_{iposition} + (\text{delta } t)(V_{ivelocity}) \quad (34)$$

Once the interaction process has integrated the state of the vertex $V_i$, the interaction process determines if the velocity $V_i$velocity of the vertex $V_i$ is less than a predetermined threshold velocity VELOCITY-THRESHOLD) and if the force on the vertex ($V_{iforce}$) is less than a predetermined threshold force (FORCE_THRESHOLD) (step 546). If $V_{ivelocity}$ is less than VELOCITY-THRESHOLD and $V_{iforce}$ is less than FORCE_THRESHOLD, the interaction process removes the vertex $V_i$ from the update list (step 548). The interaction process also decrements the number of vertices in the update list by one (step 550) and sets the force on the vertex $V_i$ to zero. If $V_{ivelocity}$ is not less than VELOCITY_THRESHOLD or if $V_{iforce}$ is not less than FORCE_THRESHOLD, $V_i$ is not removed from the update list and the force on the vertex $V_i$ is set to zero (step 552). The interaction process then determines if there are more vertices on the update list (step 554). If there are additional vertices on the update list, the interaction process returns to step 542. If not, the interaction process returns to the flow chart of FIG. 23.

After the states of the vertices are updated (step 540), the surface updating process is complete (step 556). Referring against to FIG. 18B, after the virtual surface mesh is updated (step 474), the interaction process calculates the force to be applied to the user through a haptic interface device due to the triangular surface $S_i$ (step 558).

Figure 26:
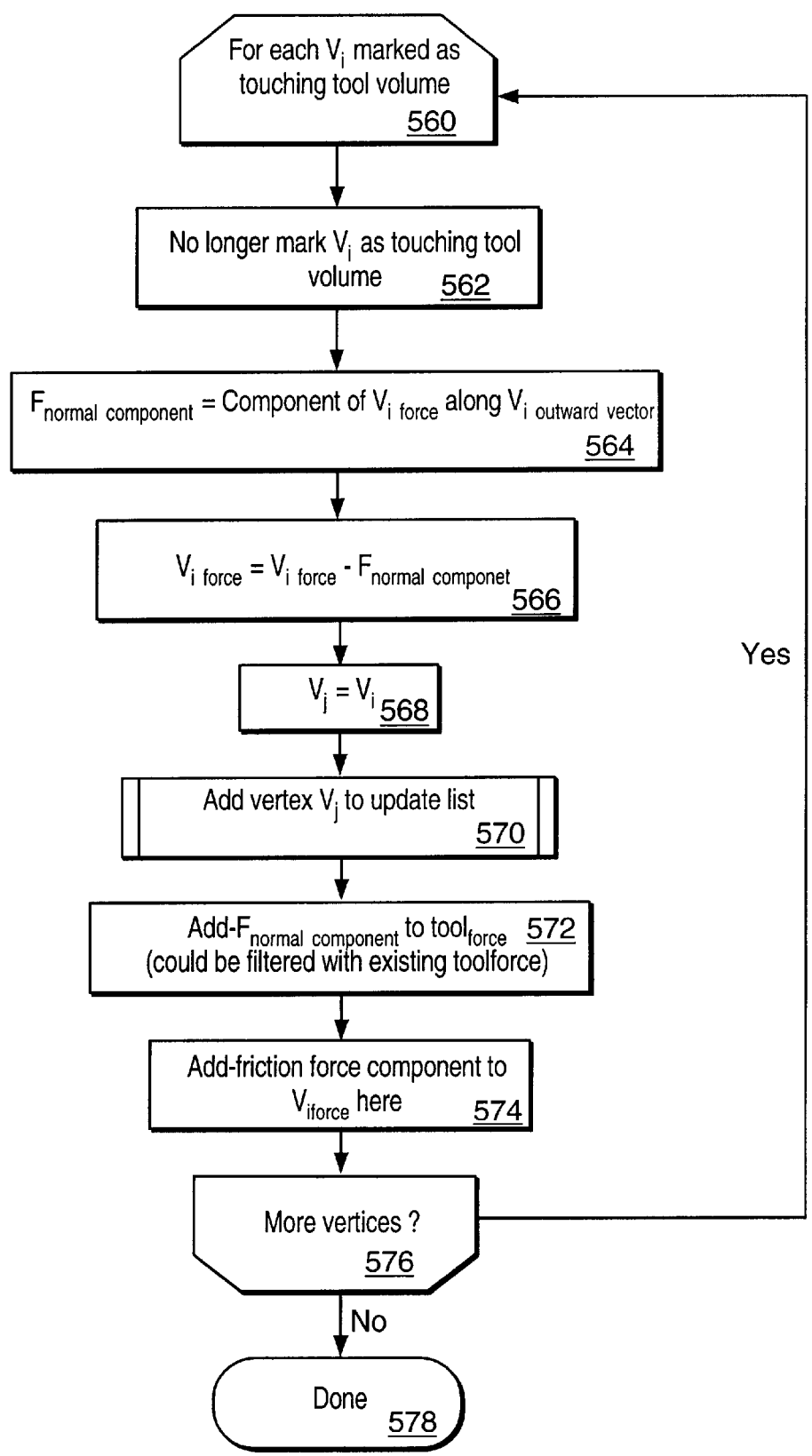
FIG. 26 is a flowchart of a method for calculating the force to be applied to a user.

FIG. 26 shows one embodiment of a method of the present invention for calculating the force to be applied to a user due to a triangular surface $S_i$. The interaction process repeats the steps illustrated by the flow chart of FIG. 26 for each vertex $V_i$ of the surface $S_i$ marked as touching the tool volume (repeat loop including steps 560, 562, 564, 566, 568, 570, 572, 574 and 576). For a vertex $V_i$ marked as touching the volume of the virtual tool, the interaction process unmarks the vertex $V_i$ as touching the volume of the virtual tool (step 562). Next, in step 564 the interaction process determines the component of the force normal to the surface $S_i$ which the vertex $V_i$ is applying to the user. The normal component $F_{normalcomponent}$ of its force is equal to the component of the vector $V_{iforce}$ calculated in step 534 of FIG. 24B along the vector $V_{ioutwardVector}$ calculated in step 450 of FIG. 20. The interaction process then sets the force on the vertex $V_i$ ($V_{iforce}$) equal to the previous $V_{iforce}$ calculated above minus the normal component $F_{normalcomponent}$ (step 566). The interaction process sets a vertex $V_j$ equal to the vertex $V_i$ (step 568) and adds the vertex $V_j$ to the update list. In one embodiment, the interaction process executes the steps of the flowchart shown in FIG. 22 to add the vertex $V_j$ to the list of vertices to be updated.

In step 572, the interaction process adds a vector equal in magnitude and opposite in direction to the vector $F_{normalcomponent}$ to the tool force calculated in step 456 of FIG. 20. In one embodiment this vector may be added by being filtered with the existing tool force. In step 574, the interaction process adds a friction component to the force $V_{iforce}$ on the vertex $V_i$. The interaction process then determines if there are more vertices $V_i$ of the surface $S_i$ that are marked as touching the tool volume. If there are, the interaction process returns to step 560. If there are none, the interaction process returns to the flowchart of FIG. 18B (step 558).

Referring again to FIG. 18B, the interaction process next integrates the state of the vertices (step 580) as discussed above. In step 582, the interaction process determines if there are more connected surfaces $S_i$. If there are, the interaction process returns to step 416 and repeats steps 416, 418, 474, 558, 580 and 582. If there are none, the interaction force proceeds to step 584 and adds additional forces to the force to be applied to the user ($tool_{force}$). These additional forces may include gravity, viscous forces, and friction forces. After these additional forces are added, the force to be applied to the user ($tool_{force}$) is sent to the haptic interface device (step 586). The interaction process then determines if the user has selected to quit the application (step 588). If the user has not quit, the interaction process returns to step 400. If the user has quit, the application ends (step 590).

Figure 27A:
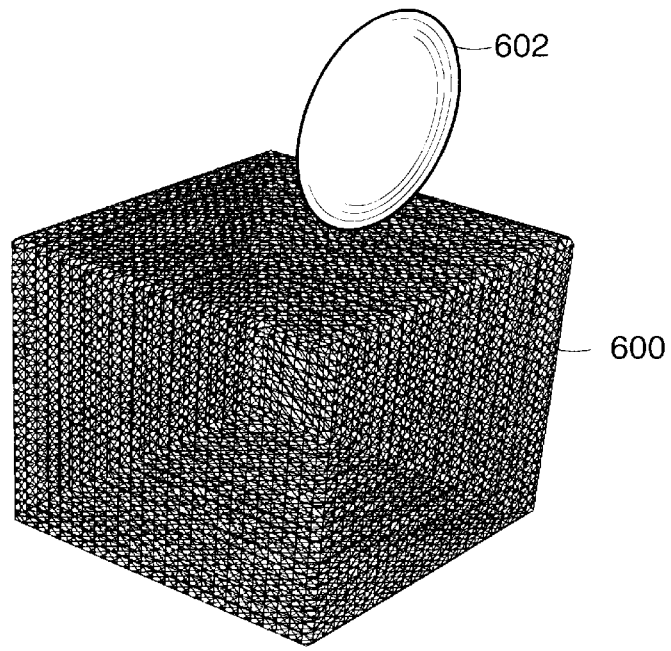
FIGS. 27A–27B depict graphical representations of a virtual object in the form of a cube and an ellipsoidal virtual tool prior to and after plastic deformation of the cube.
Figure 27B:
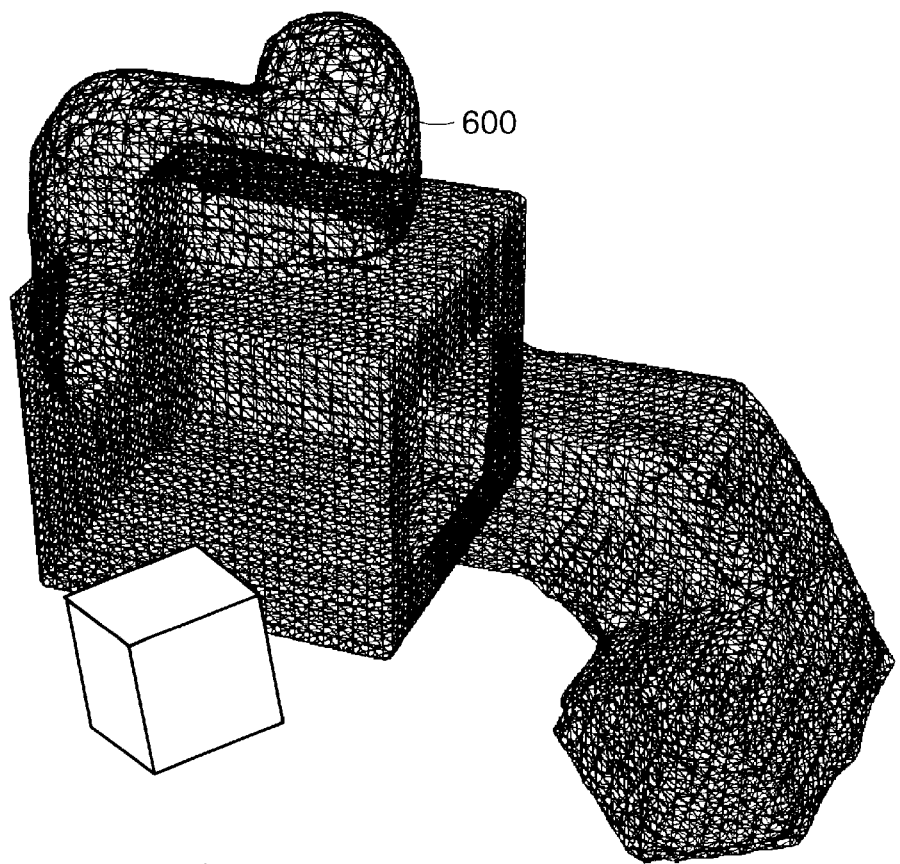
Figure 28A:
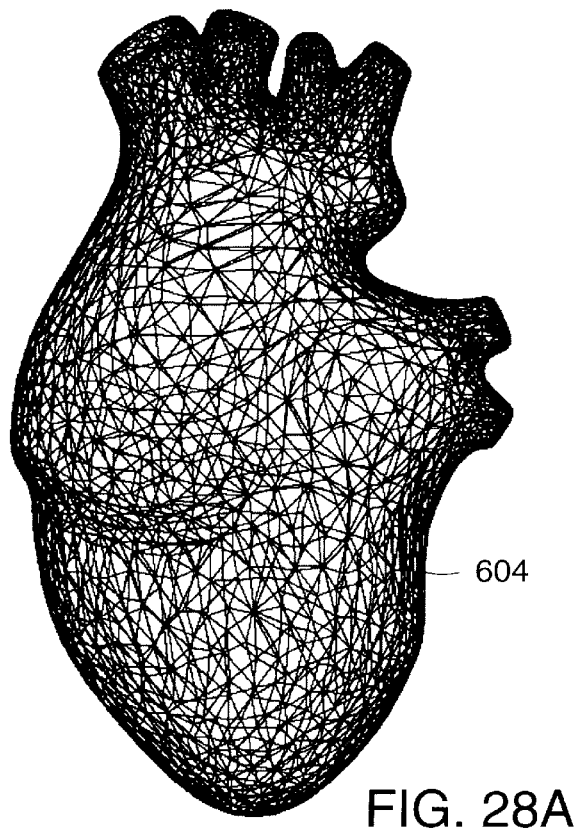
FIGS. 28A–28B depict graphical representations of a virtual object in the form of a human heart and a spherical virtual tool prior to and during visco-elastic deformation of the heart.
Figure 28B:
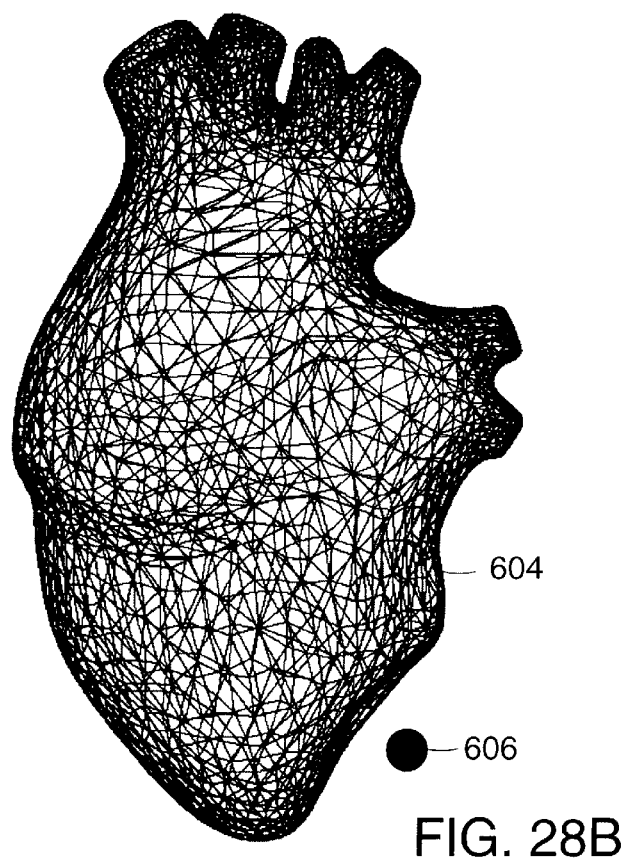

FIGS. 27A and 27B depict graphical representations of a virtual object in the form of a cube 600, showing the polygonal mesh surface structure, and an ellipsoidal virtual tool 602 prior to and after plastic deformation of the cube 600, respectively. FIGS. 28A and 28B depict graphical representations of a virtual object in the form of a human heart 604, showing the polygonal mesh surface structure, and a spherical virtual tool 606 prior to and during visco-elastic deformation of the heart 604, respectively.

The tool interaction defined in the rigid and plastic deformation embodiments may be a hybrid fiducial object as that term is defined in U.S. patent application Ser. No. 08/627,432 filed Apr. 4, 1996, entitled Method and Apparatus for Determining Forces to be Applied to a User Through a Haptic Interface, the disclosure of which is incorporated herein by reference. The virtual tool is an object that is kept on the interacted surface and compelled toward the haptic interface by a spring and dashpot element connected to the center of the tool. The tool, however, is not defined as a point. Instead, the tool occupies a volume and the center of the tool may be regarded as the fiducial center. Additionally, the tool is guided out of and is tangent to the surface through a gradient vector field defined above and below the surface of the tool. The gradient field interacts with the vertices of the surface by means of a distributed spring wall method; however, the vertices are part of the surface and the tool is the haptic interaction object. In the case of plastic deformation, instead of the tool moving out of the surface, the gradient field guides the vertices of the surface out of the tool.

Having described preferred embodiments of the invention, it will be apparent to one of skill in the art that other embodiments incorporating the concepts may be used. For example, a visco-elastically deformable virtual object may include several layers or sub-surfaces, each with differing visco-elastic characteristics to represent a subdural tumorous growth. Accordingly, the invention should not be limited to the disclosed embodiments, but rather should be limited only by the spirit and scope of the following claims.

What is claimed is:

1. A method for haptically deforming a virtual surface within a haptic virtual environment, comprising the steps of:
   generating a haptic interactive representation comprising a virtual deformable surface in a haptic interaction space, the virtual deformable surface comprising a triangular mesh;
   sensing a position of a user in real space;
   determining a haptic interface location in the haptic interaction space in response to the position of the user in real space; and
   deforming the virtual surface in response to the haptic interface location.

2. The method of claim 1 wherein the step of generating a haptic interactive representation further comprises the step of generating a haptic interactive representation comprising a virtual plastically deformable surface.

3. The method of claim 1 wherein the step of generating a haptic interactive representation further comprises the step of generating a haptic interactive representation comprising a virtual visco-elastically deformable surface.

4. The method of claim 1 wherein the step of generating a haptic interactive representation further comprises the step of generating a haptic interactive representation comprising a virtual visco-elastically and plastically deformable surface.

5. The method of claim 1 wherein the step of deforming the virtual surface further comprises the steps of:
   determining whether the virtual surface collides with the haptic interface location; and
   if the virtual surface collides with the haptic interface location, performing the steps of:
      (i) calculating an interaction force between the virtual surface and the user; and
      (ii) if the calculated interaction force exceeds a predetermined threshold force, deforming the virtual surface.

6. The method of claim 5 further comprising the step of calculating a force to be applied to the user in real space in response to the interaction force after the step of calculating the interaction force.

7. The method of claim 1 wherein the triangular mesh has a predetermined density of vertices and wherein the step of deforming the virtual surface further comprises the step of updating the triangular mesh to maintain the predetermined density of vertices substantially constant.

8. The method of claim 1 wherein the step of generating a haptic interactive representation further comprises the step of generating a virtual deformable surface comprising a single-layer triangular mesh.

9. The method of claim 1 wherein the step of generating a haptic interactive representation further comprises the step of generating a three-dimensional virtual deformable surface.

10. The method of claim 1 wherein the the step of determining the haptic interface location in the haptic interaction space comprises determining the haptic interface location in response to the position of the haptic interactive representation.

11. The method of claim 1 wherein the step of generating the haptic interactive representation comprises generating a plurality of haptic interactive representations comprising a plurality of virtual deformable surfaces and the step of deforming the virtual surface comprises deforming at least one of the plurality of virtual deformable surfaces.

12. The method of claim 1, wherein
the step of determining a haptic interface location further comprises determining a location of a virtual tool in response to the position of the user in real space and the position of the haptic interactive representation; and
the step of deforming tho virtual surface further comprises deforming the virtual surface in response to the virtual tool.

13. A method for haptically deforming a virtual surface within a haptic virtual reality environment, comprising the steps of:
generating a haptic interactive representation comprising a plastically deformable virtual surface in a haptic interaction space;
sensing a position of a user in real space;
determining a haptic interface location in the haptic interaction space in response to the position of the user in real space; and
plastically deforming the plastically deformable virtual surface in response to the haptic interface location.

14. The method of claim 13 wherein the step of generating a haptic interactive representation further comprises the step of generating a plastically deformable virtual surface comprising a single-layer triangular mesh.

15. The method of claim 14 wherein the step of plastically deforming the virtual surface further comprises the step of adding triangles to the triangular mesh.

16. The method of claim 13 wherein the step of generating a haptic interactive representation further comprises the step of generating a three-dimensional plastically deformable virtual surface.

17. The method of claim 13 wherein the step of plastically deforming the plastically deformable virtual surface further comprises the steps of:
determining whether the virtual surface collides with the haptic interface location; and
if the virtual surface collides with the haptic interface location, performing the steps of:
(i) calculating an interaction force between the virtual surface and the user; and
(ii) if the calculated interaction force exceeds a predetermined threshold force, deforming the virtual surface.

18. The method of claim 17 further comprising the step of calculating a force to be applied to the user in real space in response to the interaction force after the step of calculating an interaction force.

19. A method for determining forces to be applied to a user through a haptic interface, comprising the steps of:
generating a haptic interactive representation comprising a virtual surface in a haptic interaction space;
sensing a position of a user in real space;
determining a haptic interface location in the haptic interaction space in response to the position of the user in real space and the position of the haptic interactive representation;
representing the haptic interface location as a sphere comprising a penetrable outer layer and a substantially rigid inner core; and
determining a force to be applied to the user in real space in response to an intersection between the sphere and the virtual surface.

20. A system for generating and interfacing with a virtual deformable surface in a virtual reality environment, comprising:
a sensor for sensing a position of a user in real space;
a haptic rendering processor in electrical communication with the sensor, the haptic rendering processor executing an algorithm to determine feedback forces to be applied to the user in real space, the algorithm comprising:
a module generating a haptic interactive representation in a haptic interaction space comprising a virtual deformable surface comprising a triangular mesh;
a module determining a haptic interface in the haptic interaction space;
a module determining a haptic interface location in the haptic interaction space in response to the position of the user in real space and the position of the haptic interactive representation; and
a module determining a force to be applied to the user in real space in response to the haptic interface location; and
a surface interaction processor in electrical communication with the haptic rendering processor, the surface interaction processor determining deformations of the virtual surface.

21. The system of claim 20 wherein
the haptic rendering processor determines whether the virtual surface collides with the haptic interface location and calculates an interaction force between the virtual surface and the user if the virtual surface collides with the haptic interface location;
if the calculated interaction force exceeds a predetermined threshold force, the surface interaction processor deforms the virtual surface; and
if the calculated interaction force does not exceed a predetermined threshold force, the surface interaction processor slides the haptic interface location across the virtual surface.

22. The system of claim 21 wherein the haptic rendering processor calculates the force to be applied to the user in real space in response to the interaction force.

23. The system of claim 20 wherein the haptic rendering processor and the surface interaction processor are a single processor.

24. The system of claim 20 wherein the haptic interface is a virtual tool.

25. The system of claim 20 wherein the algorithm further comprises a module generating a plurality of haptic interactive representations comprising a plurality of virtual surfaces, and the surface interaction processor determines at least one deformation of at least one of the plurality of virtual surfaces.

26. A system for generating and interfacing with a virtual deformable surface in a virtual reality environment, comprising:

a sensor for sensing a position of a user in real space;

a haptic rendering processor in electrical communication with the sensor, the haptic rendering processor generating a haptic interaction space comprising a haptic interactive representation and a virtual tool, the haptic interactive representation comprising a virtual deformable surface comprising a triangular mesh wherein the haptic rendering processor determines (i) a virtual tool location in response to the position of the user in real space and the position of the haptic interactive representation and (ii) a force to be applied to the user in real space in response to the virtual tool location; and a surface interaction processor in electrical communication with the haptic rendering processor, the surface interaction processor determining deformations of the virtual surface in response to the virtual tool.

27. The system of claim 26 wherein the haptic rendering processor determines whether the virtual surface collides with the virtual tool and calculates an interaction force between the virtual surface and the user if the virtual surface collides with the virtual tool;

if the calculated interaction force exceeds a predetermined threshold force, the surface interaction processor deforms the virtual surface; and if the calculated interaction force does not exceed a predetermined threshold force, the surface interaction processor slides the virtual tool across the virtual surface.

28. The system of claim 26 wherein the haptic rendering processor calculates the force to be applied to the user in real space in response to the interaction force.

29. The system of claim 26 wherein the haptic rendering processor and the surface interaction processor are a single processor.

30. The system of claim 26 wherein the haptic rendering processor generates a plurality of haptic interactive representations comprising a plurality of virtual surfaces and the surface interaction processor determines at least one deformation of at least one of the plurality of virtual surfaces.

31. A method for haptically deforming a virtual surface within a haptic virtual reality environment, comprising the steps of:

generating a haptic interactive representation comprising a virtual surface in a haptic interaction space;

determining a state of the virtual surface;

sensing a position of a user in real space;

determining a virtual tool for use by the user in the haptic interaction space;

determining a haptic interface position in the haptic interaction space in response to the position of the user in real space;

determining a position of the virtual tool in the haptic interaction space in comparison to the haptic interface position; and calculating an interaction force between the virtual surface and the user in response to the step of determining the position of the virtual tool.

32. The method of claim 31 wherein the step of determining the position of the virtual tool further comprises moving the position of the virtual tool to coincide with the haptic interface position.

33. The method of claim 31 further comprising the step of determining an orientation of the virtual tool in the haptic interaction space, and wherein the step of calculating the interaction force between the virtual surface and the user further comprises calculating the interaction force in response to the step of determining the orientation of the virtual tool.

34. The method of claim 31 wherein the step of determining the state of the virtual surface further comprises determining the state of the viral surface to be a rigid state and the step of determining a position of the virtual tool in haptic interaction-space further comprises sliding the virtual tool across the virtual surface.

35. The method of claim 31 further comprising the steps of determining whether the virtual surface collides with the vial tool; and if the virtual surface collides with the virtual tool, preventing any movement of the virtual tool into the virtual surface.

36. The method of claim 35 further comprising the step of:

if the calculated inaction force does not exceed a predetermined threshold force, treating the virtual surface as a rigid surface.

37. The method of claim 35 further comprising the step of:

if the calculated interaction force exceeds a predetermined threshold force, deforming the virtual surface.

38. The method of claim 31 wherein the step of determining the state of the virtual surface further comprises the step of determining the state of the virtual surface to be a deformable state.

39. The method of claim 38 further comprising the step of deforming the virtual surface in response to the virtual tool.

40. The method of claim 39 wherein the step of deforming the virtual surface further comprises the steps of determining whether the virtual surface collides with the virtual tool; and if the virtual surface collides with the virtual tool and the calculated interaction force exceeds a predetermined threshold force, deforming the virtual surface.

41. The method of claim 39 wherein the step of deforming the virtual surface further comprises the step of plastically deforming the virtual surface in response to the virtual tool.

42. The method of claim 39 wherein the virtual surface comprises a triangular mesh and the step of deforming the virtual surface further comprises the step of visco-elastically deforming the virtual surface in response to the virtual tool.

43. The method of claim 39 wherein the virtual surface comprises a triangular mesh and the step of deforming the virtual surface further comprises the step of visco-elastically and plastically deforming the virtual surface in response to the virtual tool.

44. A system for haptically deforming a virtual surface within a haptic virtual reality environment, comprising:

a sensor for sensing a position of a user in real space;

a haptic rendering processor in electrical communication with the sensor, the haptic rendering processor generating a haptic interaction space comprising a haptic interactive representation and a virtual tool, the haptic interactive representation comprising a virtual surface, wherein the haptic rendering processor determines (i) a haptic interface position in the haptic interaction space in response to the position of the user in real space, and (ii) a position of the virtual tool in the haptic interaction space in comparison to the haptic interface position; and a surface interaction processor in electrical communication with the haptic rendering processor, wherein the surface interaction processor determines a state of the virtual surface and the haptic rendering processor calculates an interaction force between the virtual surface and the user based on the position of the virtual tool and the state of the virtual surface.

45. The system of claim 44 wherein the haptic rendering processor determines the position of the virtual tool by moving the position of the virtual tool to coincide with the haptic interface position.

46. The system of claim 44 wherein the haptic rendering processor determines an orientation of the virtual tool in the haptic interaction space, and calculates the interaction force between the virtual surface and the user in response to the orientation of the virtual tool.

47. The system of claim 44 wherein the surface interaction processor determines the state of the virtual surface to be a rigid state, and the haptic rendering processor slides the virtual tool across the virtual surface.

48. The system of claim 44 wherein the haptic rendering processor determines whether the virtual surface collides with the virtual tool, and, if the virtual surface collides with the virtual tool, prevents any movement of the virtual tool into the virtual surface.

49. The system of claim 48 wherein, if the calculated interaction force does not exceed a predetermined threshold force, the surface interaction processor determines the state of the virtual surface to be a rigid state.

50. The system of claim 48 wherein, if the calculated interaction force exceeds a predetermined threshold force, the surface interaction processor deforms the virtual surface.

51. The system of claim 44 wherein the surface interaction processor determines the state of the virtual surface to be a deformable state.

52. The system of claim 51 wherein the surface interaction processor deforms the virtual surface in response to the virtual tool.

53. The system of claim 52 wherein the haptic rendering processor determines whether the virtual surface collides with the virtual tool, and, if the virtual surface collides with the virtual tool and the calculated interaction force exceeds a predetermined threshold force, the surface interaction processor deforms the virtual surface.

54. The system of claim 52 wherein the surface interaction processor plastically deforms the virtual surface in response to the virtual tool.

55. The system of claim 52 wherein the virtual surface comprises a triangular mesh and wherein the surface interaction processor visco-elastically deforms the virtual surface in response to the virtual tool.

56. The system of claim 52 wherein the virtual surface comprises a triangular mesh and wherein the surface interaction processor viscoelastically and plastically deforms the virtual surface in response to the virtual tool.

57. The system of claim 44 wherein the haptic interactive representation is defined by a volumetric representation.

58. The system of claim 44 wherein the haptic interactive representation comprises a triangular mesh.

59. The system of claim 44 wherein the haptic interactive representation is defined by at least one implicit equation.

60. The system of claim 44 wherein the virtual tool is defined by a volumetric representation.

61. The system of claim 44 wherein the virtual tool is defined by at least one implicit equation.

62. The system of claim 44 wherein the virtual tool comprises a triangular mesh.

63. The system of claim 44 wherein the virtual tool is defined by a series of discrete points.

* * * * *